(12) United States Patent
Takamizawa et al.

(10) Patent No.: US 8,578,446 B2
(45) Date of Patent: Nov. 5, 2013

(54) AUTHENTICATION APPARATUS AND ENTITY DEVICE

(75) Inventors: Hidehisa Takamizawa, Fuchu (JP); Koji Okada, Tokyo (JP); Tomoaki Morijiri, Chofu (JP); Tatsuro Ikeda, Fuchu (JP); Minoru Nishizawa, Fuchu (JP); Yoshihiro Fujii, Fuchu (JP); Asahiko Yamada, Tokorozawa (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 1336 days.

(21) Appl. No.: 11/969,046

(22) Filed: Jan. 3, 2008

(65) Prior Publication Data

US 2008/0168534 A1 Jul. 10, 2008

(30) Foreign Application Priority Data

Jan. 5, 2007 (JP) ................................ 2007-000706

(51) Int. Cl.
*H04L 29/06* (2006.01)

(52) U.S. Cl.
USPC ................................ 726/2; 713/170; 382/115

(58) Field of Classification Search
USPC ................................ 726/2; 713/170; 382/115
See application file for complete search history.

(56) References Cited

U.S. PATENT DOCUMENTS

| 2002/0026582 | A1* | 2/2002 | Futamura et al. | 713/170 |
| 2003/0154406 | A1* | 8/2003 | Honarvar et al. | 713/201 |
| 2003/0163374 | A1* | 8/2003 | Akiyama | 705/14 |
| 2006/0177108 | A1* | 8/2006 | Yashiki | 382/115 |
| 2008/0189099 | A1* | 8/2008 | Friedman et al. | 704/8 |

FOREIGN PATENT DOCUMENTS

JP 2006-11768 1/2006

OTHER PUBLICATIONS

Dimmock, "Using Trust and Risk in Role-Based Access Control Policies", 2004, University of Cambridge Computer Laboratory, p. 1-7.*

* cited by examiner

*Primary Examiner* — Thanhnga B Truong
*Assistant Examiner* — Gregory Lane
(74) *Attorney, Agent, or Firm* — Finnegan, Henderson, Farabow, Garrett & Dunner, LLP

(57) ABSTRACT

A configuration including, in authentication contexts, function unit identification information unique to the function unit that has executed an authentication subprocess in entity devices permits an authentication apparatus to specify the function unit that has executed the authentication subprocess in the entity devices. The verifier, therefore, can verify the legitimacy of the authentication subprocess from the authentication context even in the presence of a plurality of function units capable of executing the same authentication subprocess in the entity devices.

9 Claims, 24 Drawing Sheets

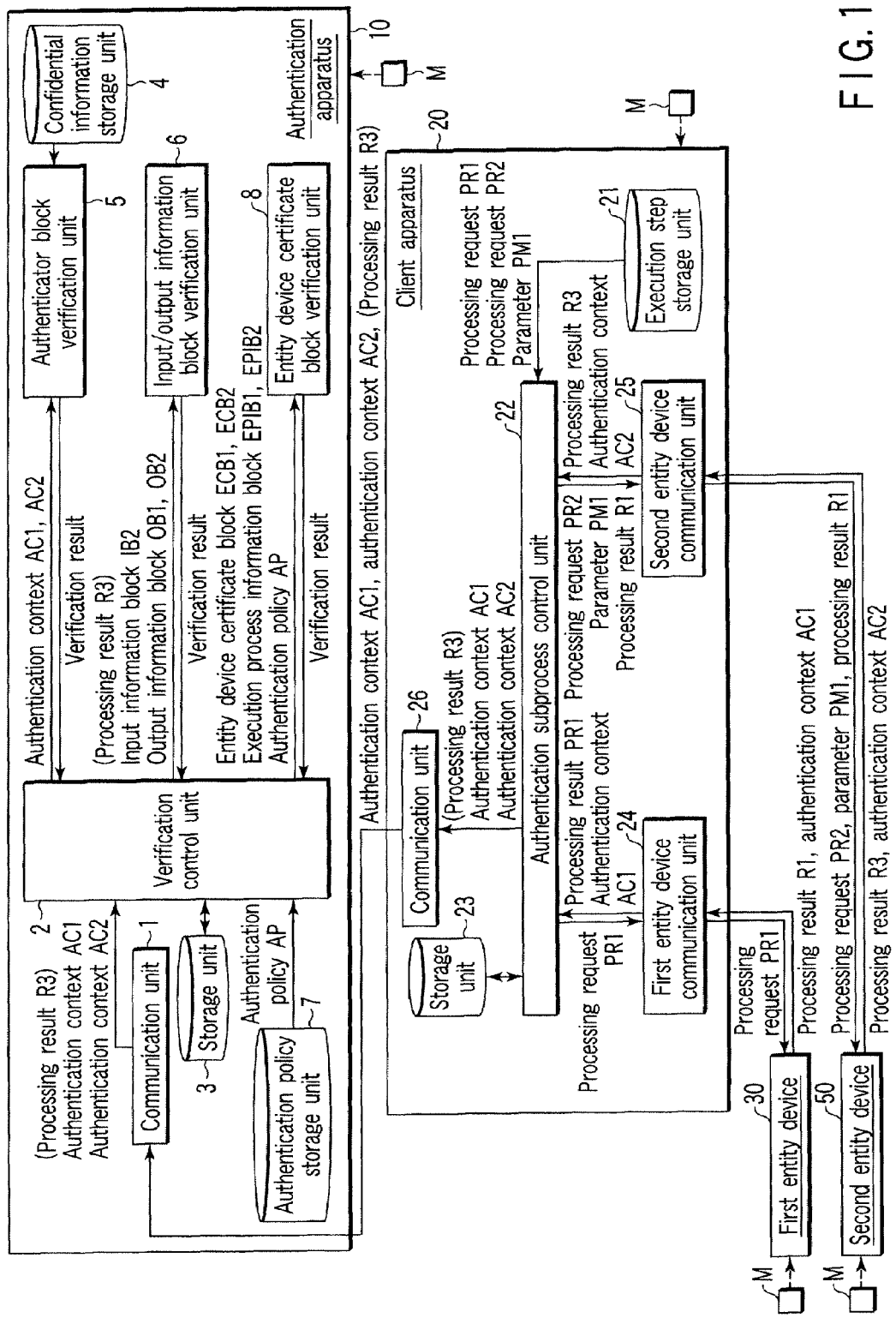
F I G. 1

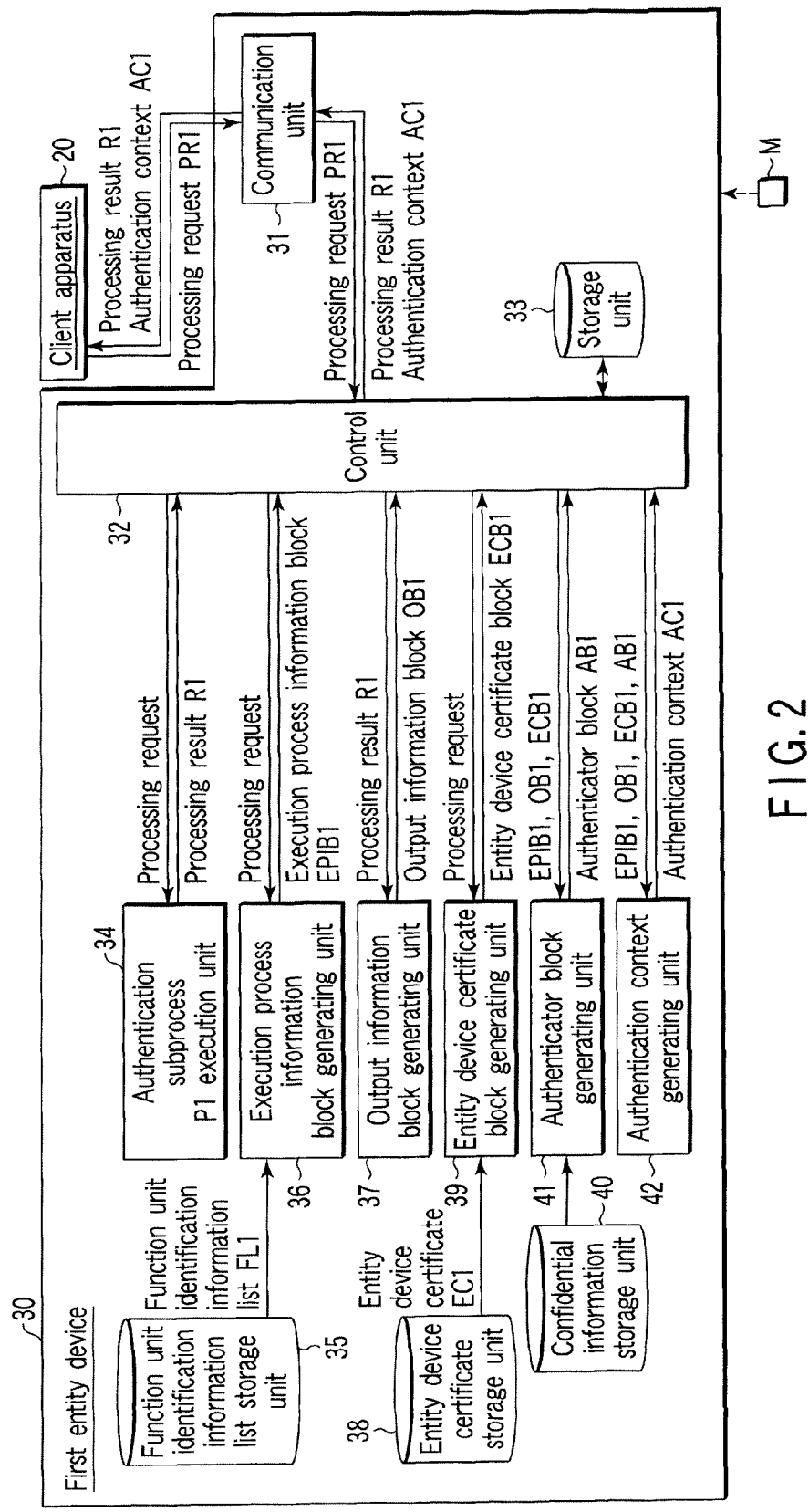
F I G. 2

Function information FI1
Capturing sensor quality: 90 points

Function information FI2
Quality of biometric template: 95 points

Function information FI3-1
Matching accuracy: 99%

Function information FI3-2
Matching accuracy: 80%

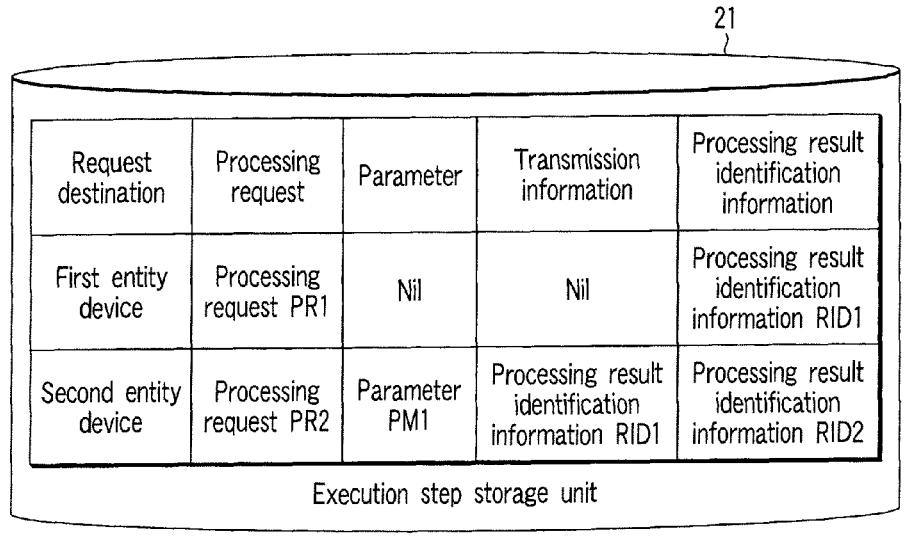
F I G. 10
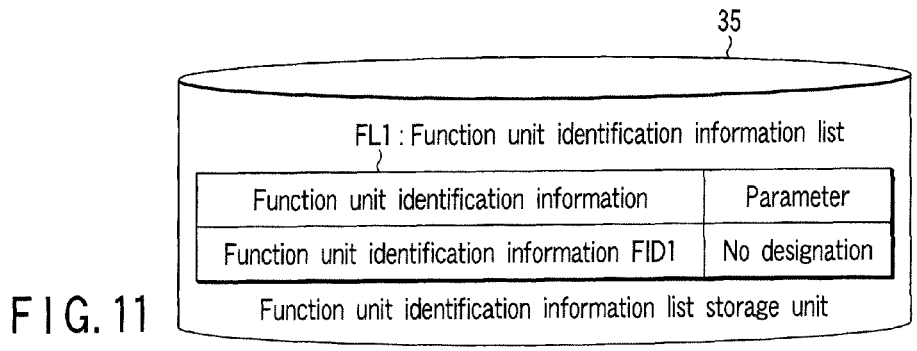
F I G. 11
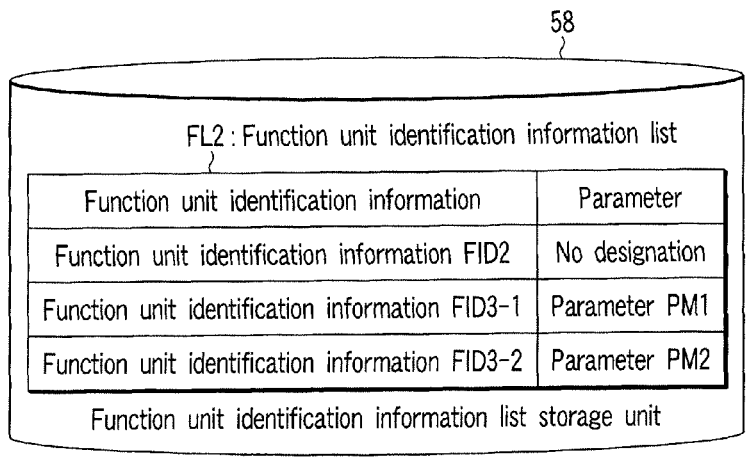
F I G. 12

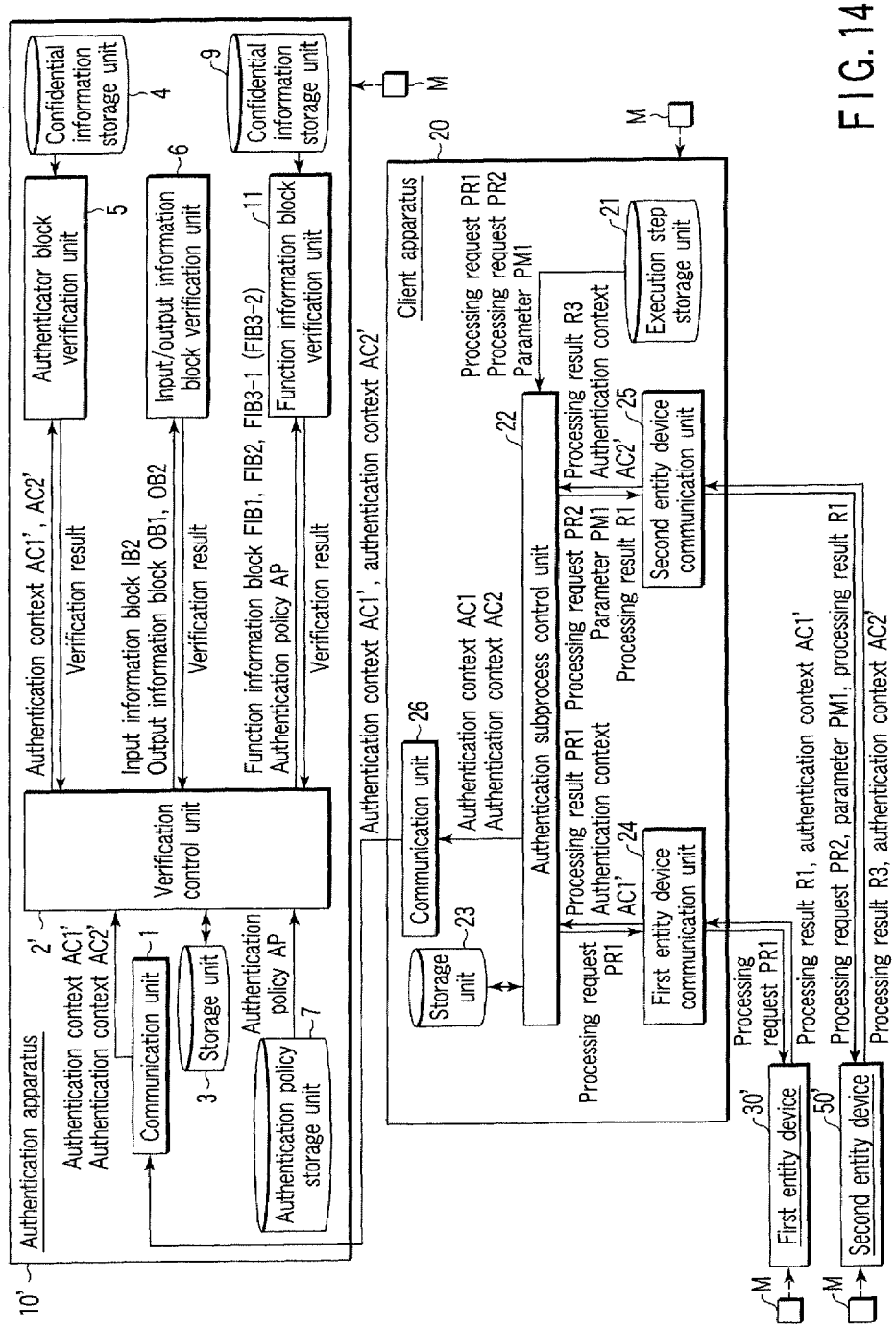
F I G. 14

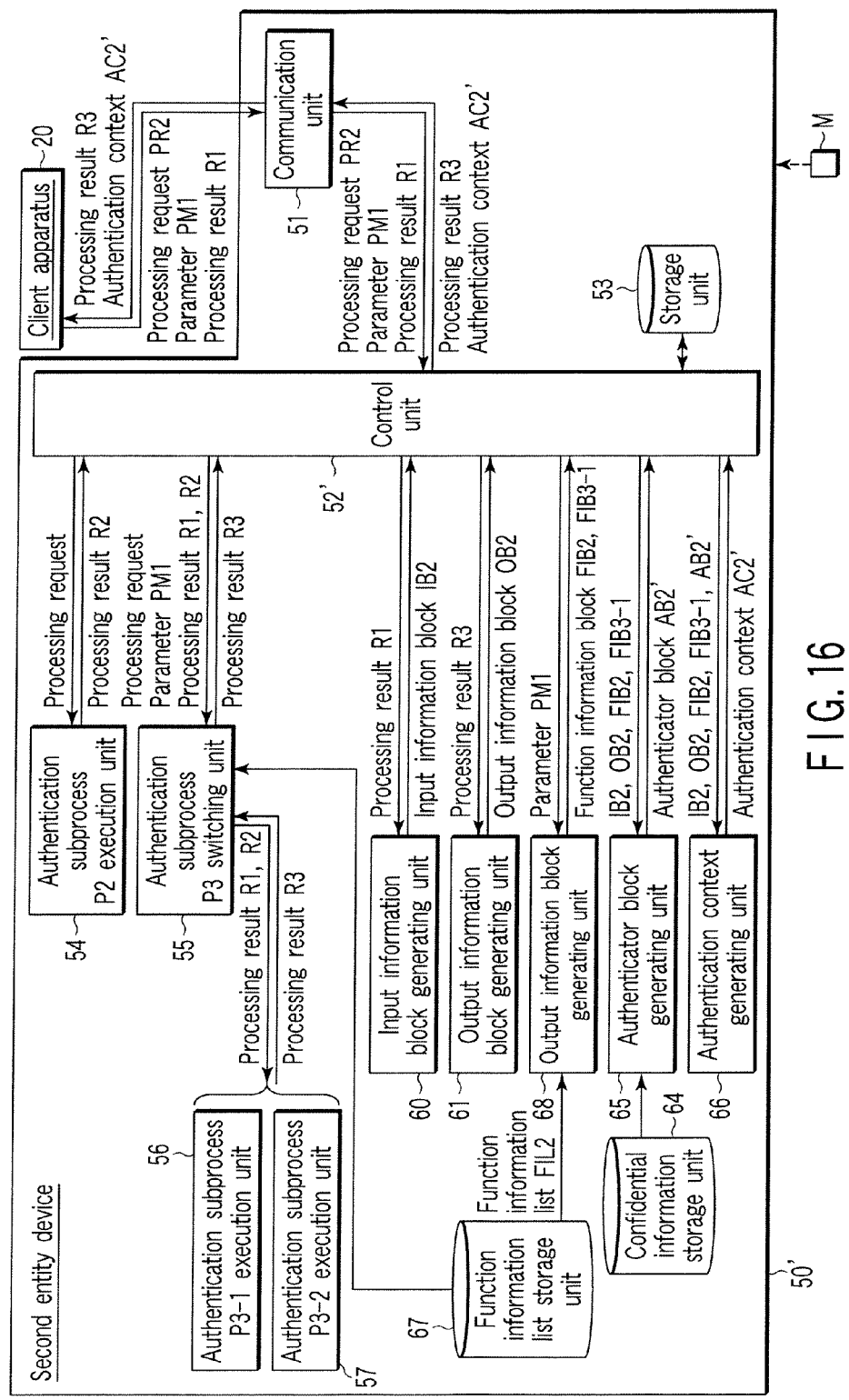
F I G. 16

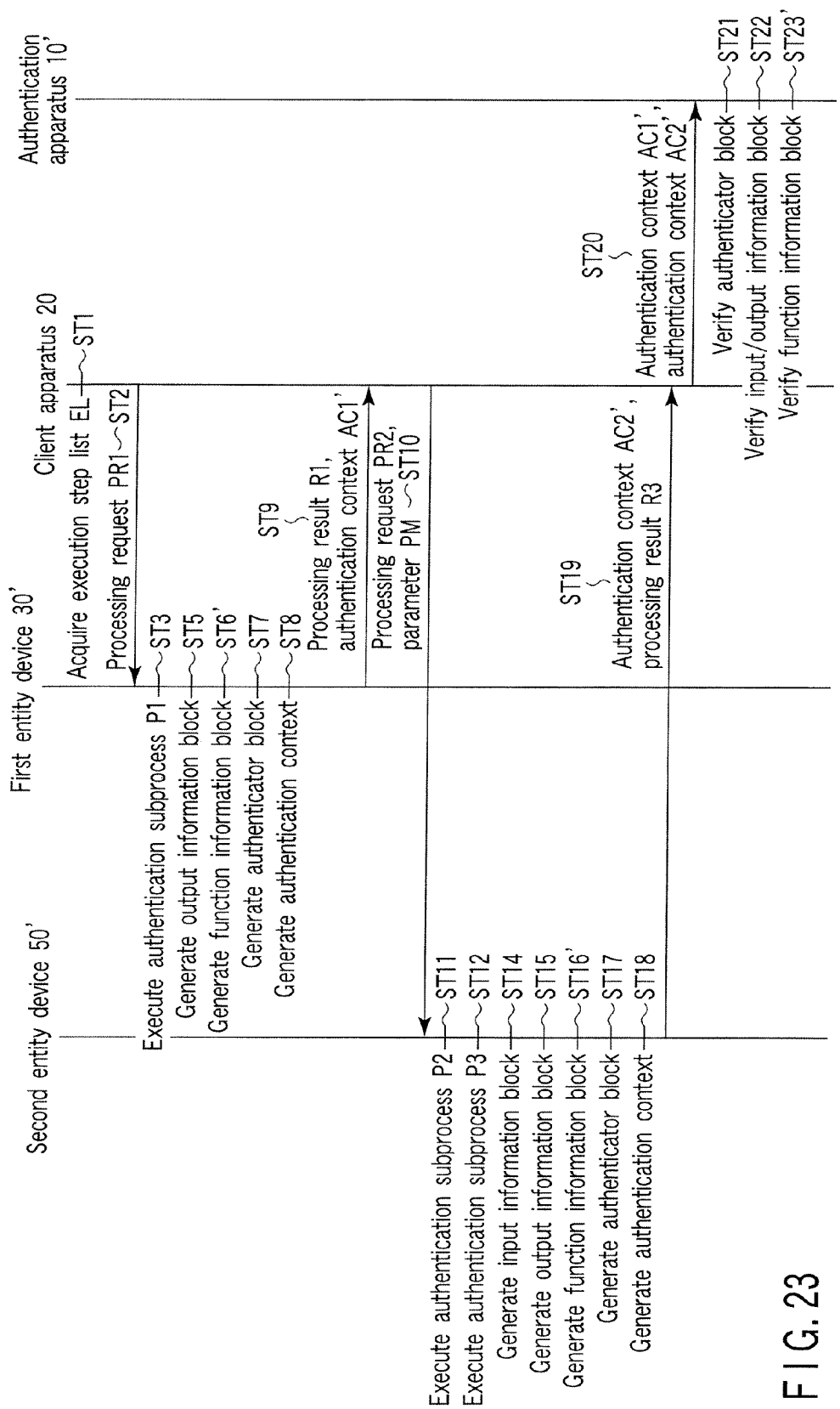
F I G. 23

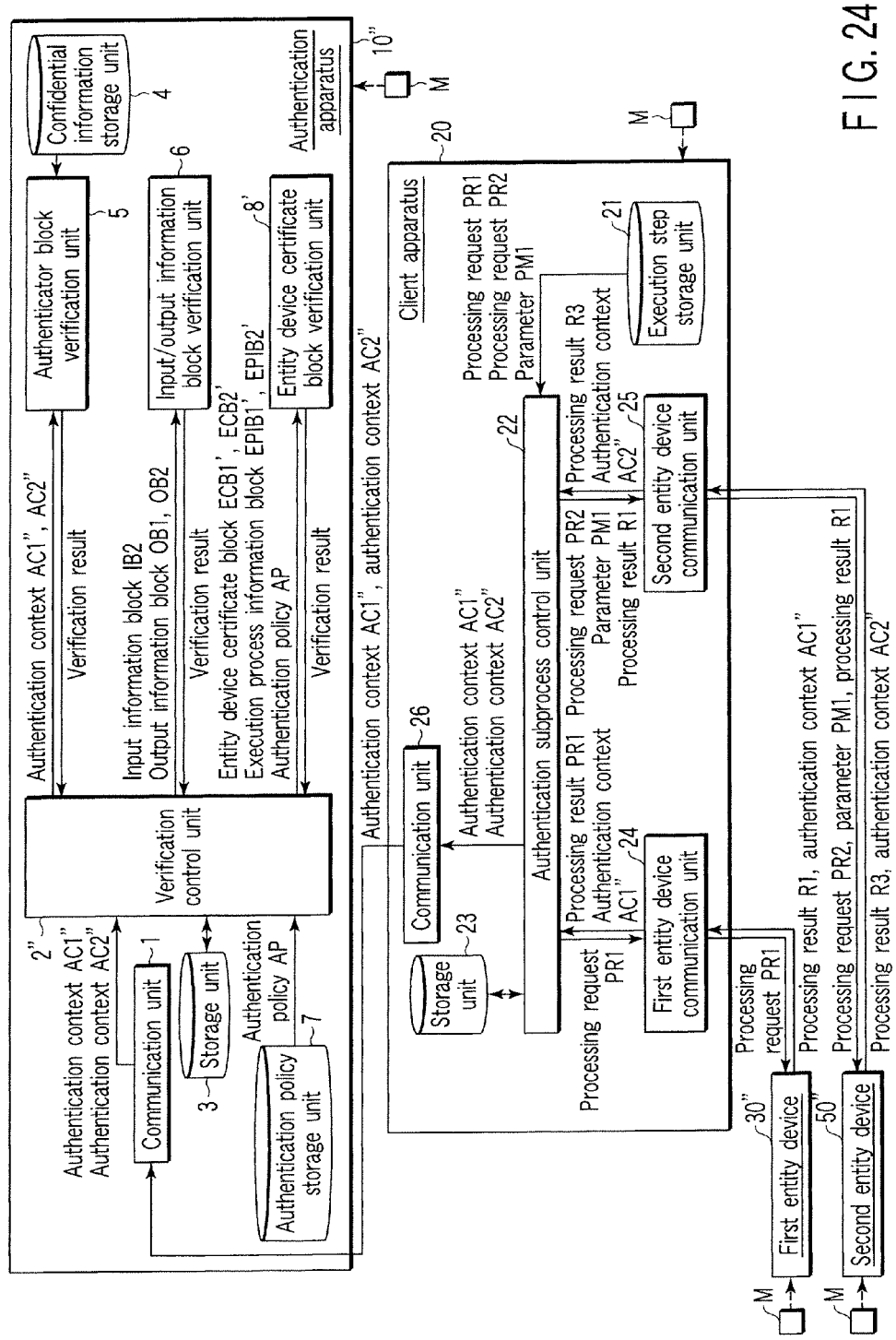
F I G. 24

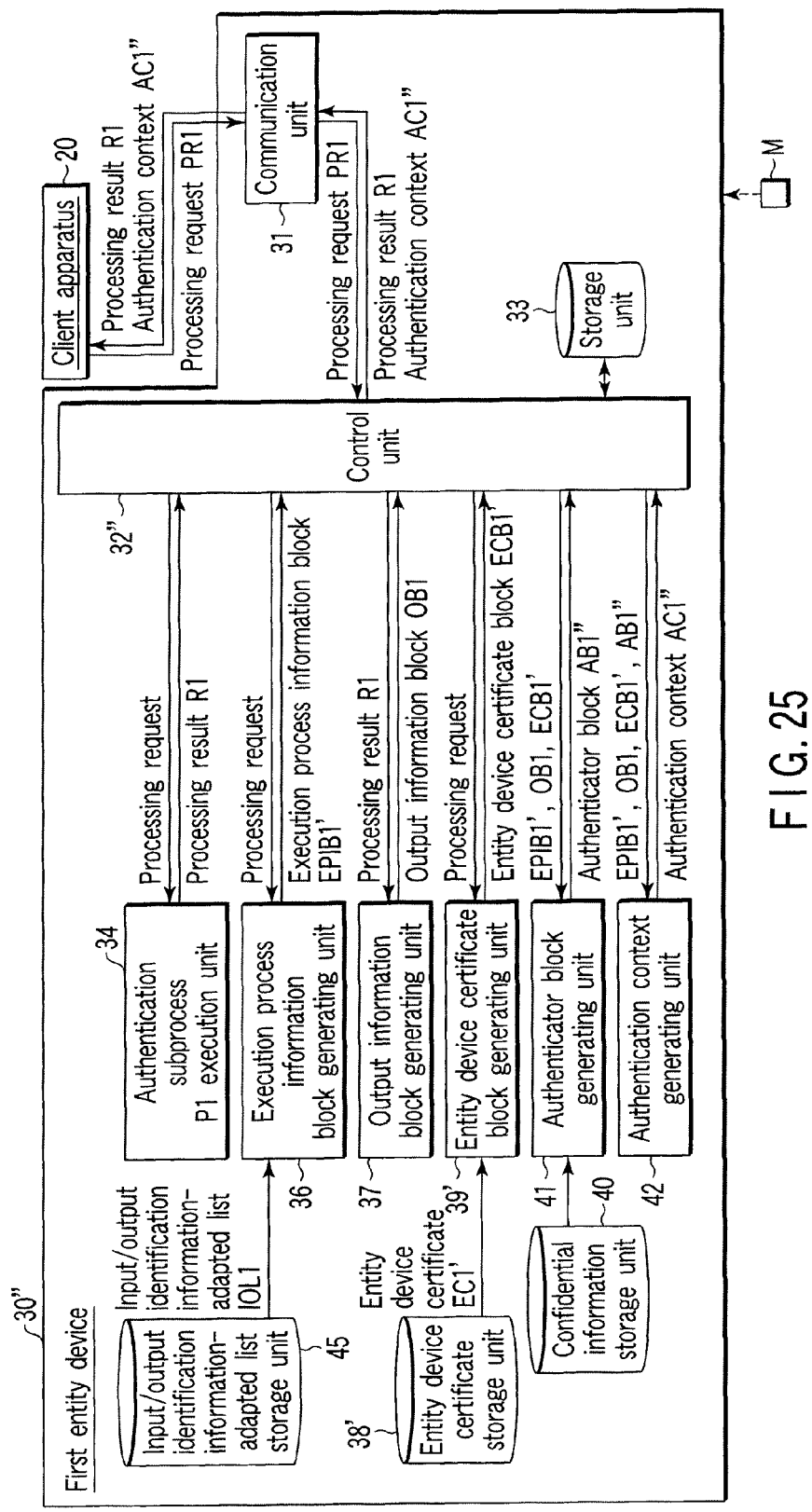
F I G. 25

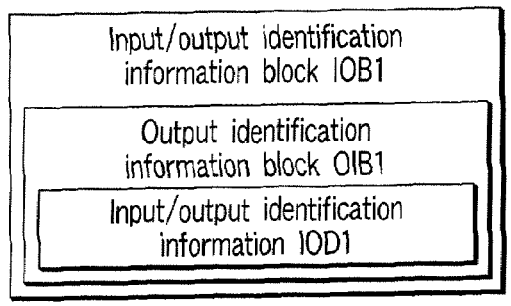
F I G. 29
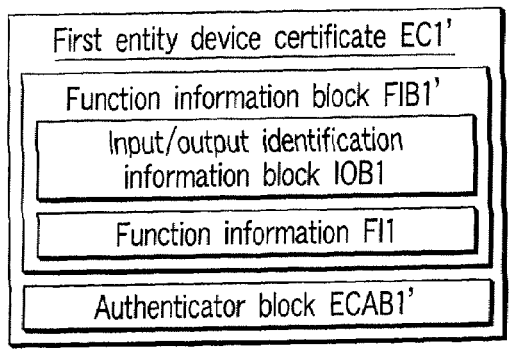
F I G. 30
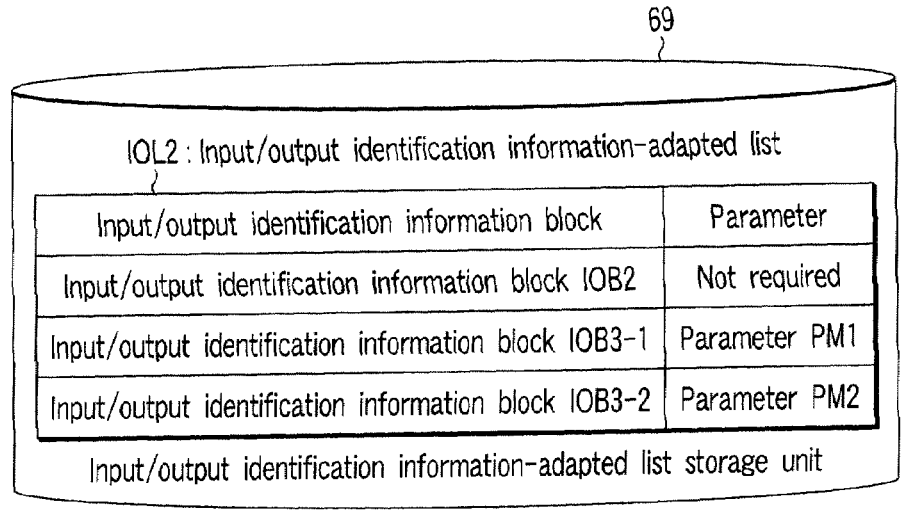
F I G. 31

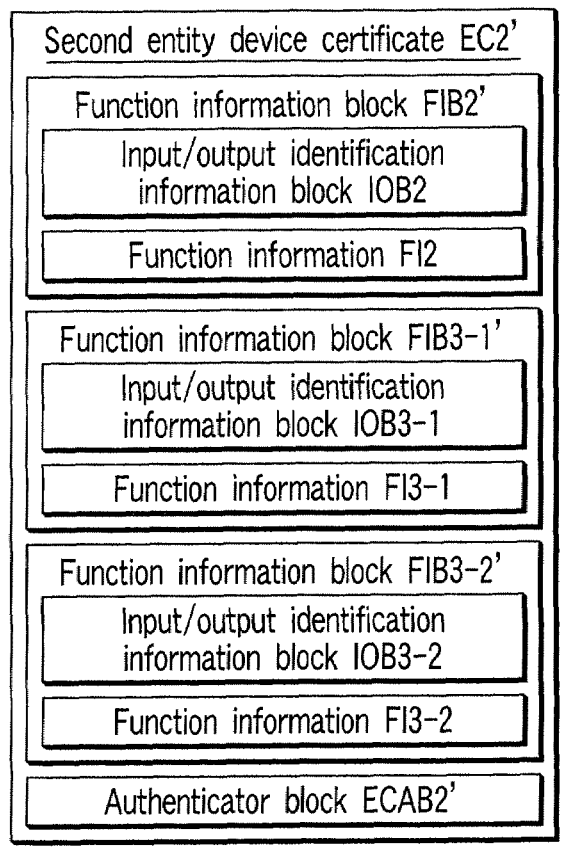
F I G. 34

AUTHENTICATION APPARATUS AND ENTITY DEVICE

CROSS-REFERENCE TO RELATED APPLICATIONS

This application is based upon and claims the benefit of priority from prior Japanese Patent Application No. 2007-000706, filed Jan. 5, 2007, the entire contents of which are incorporated herein by reference.

BACKGROUND OF THE INVENTION

1. Field of the Invention

The present invention relates to an authentication apparatus and an entity device.

2. Description of the Related Art

In recent years, biometric authentication (biological authentication) has been vigorously introduced as a technique for strict principal confirmation. In biometric authentication, the information indicating the physical or behavioral features unique to an individual are sampled, and by comparing the sampled biometric information (biometric sample information) with the biometric information (biometric template) sampled and registered in advance, whether the individual is the principal or not is confirmed. As compared with the existing authentication methods such as the password authentication, therefore, the "principal" can be confirmed more strictly in the biometric authentication. Biometric information refers to fingerprints, iris pattern, retina pattern, face, voice, key strokes and handwriting. These kinds of biometric information, unlike the password or the IC card used in the existing authentication methods, has the advantage that there is little chance of loss or oblivion, and therefore, the burden on the user is reduced. Biometric authentication, which has been introduced in a fixed system such as the bank ATM (Automatic Teller Machine), is now under study for principal confirmation through the internet in electronic commercial transactions.

Biometric authentication, unlike the existing authentication methods such as password authentication, decides whether the principal confirmation is required or not according to the similarity between the biometric sample information and the biometric template. The similarity is dependent to a large extent on the devices and the algorithm for executing each process making up the biometric authentication (hereinafter referred to as the authentication subprocess) such as "the process of sampling the biometric information (the process of extracting the biometric characteristic amount", "the matching process" or "the process of determining the similarity (the process of making comparison with a predetermined threshold value)". In the biometrics for the fixed system such as the bank ATM, the legitimacy of the operation of the bank ATM executing each authentication subprocess can be assured by the verifier (bank, etc.), and therefore, no problem is posed.

Biometric authentication through the internet, however, poses the problem that the legitimacy of each authentication subprocess executed on the part of the user cannot be assured by the verifier.

As a technique for solving this problem, an authentication system using an authentication context for biometric authentication is known (see, for example, Jpn. Pat. Appln. KOKAI Publication No. 2006-11768). An authentication context is the information for permitting the device executing each authentication subprocess to assure the result of execution and the verifier to verify the legitimacy of each process.

This authentication system using the authentication context poses no problem as long as only one function module capable of executing a given authentication subprocess exists in the same device.

For example, the verifier verifies the authentication context generated in the device for executing the authentication subprocess (hereinafter referred to as the entity device) and thereby can confirm the legitimacy of the authentication subprocess executed by the entity device. Incidentally, the authentication context includes information on the functions of the entity device that has generated the particular authentication context.

The study of the present inventor, however, indicates that the inconveniences described below develop in the case where the same entity device has a plurality of function modules capable of executing a given authentication subprocess.

Specifically, in the case where the principal confirmation process is executed by selecting a given one of a plurality of function modules in the entity device, the verifier cannot determine from the authentication context which function module has executed the authentication subprocess.

In the case where a plurality of function modules have different matching accuracy, therefore, the verifier inconveniently cannot decide the legitimacy of the authentication subprocess and hence cannot decide the success or failure of the authentication.

BRIEF SUMMARY OF THE INVENTION

An object of the invention is to provide an authentication apparatus and an entity device capable of verifying the legitimacy of an authentication subprocess from the authentication context even in the case where there exist a plurality of function units capable of executing the same authentication subprocess.

According to a first aspect of the invention, there is provided an authentication apparatus capable of communicating with a client apparatus capable of transmitting each authentication context received from a plurality of entity devices which generate, based on confidential information, a plurality of authentication contexts each including a processing result of a plurality of authentication subprocesses making up a biometric authentication process, the authentication apparatus comprising: an authentication apparatus confidential information storage device configured to store confidential information identical with or corresponding to the aforementioned confidential information; an authenticator verification device configured to verify an authenticator of each authentication context based on the confidential information in the authentication apparatus confidential information storage device upon receipt, from the client apparatus, of the authentication context configured of "an entity device certificate including execution device performance information and execution device identification information on a plurality of authentication subprocess execution devices of the entity device", "the execution device identification information indicating the authentication subprocess execution device that has executed the authentication subprocess", "the processing result of the authentication subprocess", and "the authenticator generated based on the confidential information"; a performance information extraction device configured to extract, for each authentication context received, the corresponding execution device performance information in the entity device certificate based on the execution device identification information used for generating the authenticator; a performance criteria information storage device configured to store, in advance, performance criteria information indicating the performance to be satisfied by the authentication subprocess execution device; and a performance information verification device configured to verify, based on the performance criteria information, the execution device performance information extracted by the performance information extraction device.

According to a second aspect of the invention, there is provided at least one entity device among a plurality of entity devices, used for an authentication system comprising an authentication apparatus capable of verifying a plurality of authentication contexts each including a processing result of a plurality of authentication subprocesses making up a biometric authentication process, a client apparatus capable of transmitting said each authentication context to the authentication apparatus, and a plurality of entity devices capable of individually generating and transmitting said each authentication context to the client apparatus, the entity device comprising: a confidential information storage device configured to store confidential information for verification by the authentication apparatus; a plurality of authentication subprocess execution devices having different performances and capable of generating a processing result by executing the same authentication subprocess; an entity device certificate storage device configured to store an entity device certificate including execution device performance information and execution device identification information on said each authentication subprocess execution device; an execution device identification information storage device configured to store the execution device identification information and a parameter related to each other for each authentication subprocess execution device; an execution device switching device configured to execute, upon receipt of a processing request and a parameter from the client apparatus, the authentication subprocess by accessing the execution device identification information storage device and switching to the authentication subprocess execution device corresponding to the parameter; an authenticator generating device configured to generate an authenticator based on the confidential information in the confidential information storage device from the entity device certificate, the processing result of the authentication subprocess and the execution device identification information indicating the authentication subprocess execution device that has executed the authentication subprocess; an authentication context generating device configured to generate an authentication context including the authenticator, the execution device identification information used for generating the authenticator, the processing result and the entity device certificate; and an authentication context transmission device configured to transmit the authentication context to the client apparatus, wherein the authentication context transmitted by the authentication context transmission device is such that the authentication apparatus is capable of verifying the authenticator based on the confidential information identical with or corresponding to the aforementioned confidential information, the corresponding execution device performance information in the entity device certificate is extracted based on the execution device identification information used for generating the authenticator, and the execution device performance information is capable of being verified based on predetermined performance criteria information.

According to a third aspect of the invention, there is provided an authentication apparatus of the first aspect or an entity device of the second aspect, wherein input/output identification information on said each authentication subprocess execution device is used in place of the execution device identification information.

According to a fourth aspect of the invention, there is provided at least one entity device among a plurality of entity devices, used for an authentication system comprising an authentication apparatus capable of verifying a plurality of authentication contexts each including a processing result of a plurality of authentication subprocesses making up a biometric authentication process, a client apparatus capable of transmitting said each authentication context to the authentication apparatus, and a plurality of entity devices capable of individually generating and transmitting said each authentication context to the client apparatus, the entity device comprising: a confidential information storage device configured to store confidential information for verification by the authentication apparatus; a plurality of authentication subprocess execution devices having different performances and capable of generating a processing result by executing the same authentication subprocess; a function information storage device configured to store "a function information certificate including the execution device performance information" and a parameter as related to each other, for each authentication subprocess execution device; an execution device switching device configured to execute, upon receipt of a processing request and a parameter from the client apparatus, the authentication subprocess by accessing the execution device identification information storage device and switching to the authentication subprocess execution device corresponding to the parameter; an authenticator generating device configured to generate an authenticator based on the confidential information in the confidential information storage device from the function information certificate corresponding to the authentication subprocess execution device that has executed the authentication subprocess and the processing result of the authentication subprocess; an authentication context generating device configured to generate an authentication context including the authenticator, the function information certificate used for generating the authenticator and the processing result; and an authentication context transmission device configured to transmit the authentication context to the client apparatus, wherein the authentication context transmitted by the authentication context transmission device is such that the authentication apparatus is capable of verifying the authenticator based on the confidential information identical with or corresponding to the aforementioned confidential information, the execution device performance information is extracted from the function information certificate used for generating the authenticator, and the execution device performance information is capable of being verified based on predetermined performance criteria information.

In the first to third aspects, each entity device is such that the execution device identification information indicating the authentication subprocess execution device that has executed the authentication subprocess or the input/output identification information is included in the authentication context, thereby making it possible to specify the function unit (authentication subprocess execution device) that has executed the authentication subprocess in each entity device.

Also, in the fourth aspect, each entity device is such that the function information certificate corresponding to the authentication subprocess execution device that has executed the authentication subprocess is included in the authentication context, thereby making it possible to specify the function unit (authentication subprocess execution device) that has executed the authentication subprocess in each entity device.

In the first to fourth aspects, therefore, the function unit that has executed the authentication subprocess can be specified and the legitimacy of the authentication subprocess can be verified from the authentication context even in the case where the entity device has therein a plurality of function units capable of executing the same authentication subprocess.

BRIEF DESCRIPTION OF THE SEVERAL VIEWS OF THE DRAWING

FIG. 1 is a schematic diagram showing the configuration of an authentication system according to a first embodiment of the invention;

FIG. 2 is a schematic diagram showing the configuration of a first entity device according to the same embodiment;

FIG. 10 is a schematic diagram showing an example of execution steps stored in an execution step storage unit according to the same embodiment;

FIG. 11 is a schematic diagram showing an example of a function unit identification information list stored in a function unit identification information list storage unit according to the same embodiment;

FIG. 12 is a schematic diagram showing another example of the function unit identification information list stored in the function unit identification information list storage unit according to the same embodiment;

FIG. 14 is a schematic diagram showing the configuration of an authentication system according to a second embodiment of the invention;

FIG. 16 is a schematic diagram showing the configuration of a second entity device according to the same embodiment;

FIG. 23 is a sequence chart for explaining the operation according to the same embodiment;

FIG. 24 is a schematic diagram showing the configuration of an authentication system according to a third embodiment of the invention;

FIG. 25 is a schematic diagram showing the configuration of a first entity device according to the same embodiment;

FIG. 29 is a schematic diagram showing the configuration of an input/output identification information block according to the same embodiment;

FIG. 30 is a schematic diagram showing the configuration of a first entity device certificate according to the same embodiment;

FIG. 31 is a schematic diagram showing the configuration of an input/output identification information-adapted list storage unit according to the same embodiment;

FIG. 34 is a schematic diagram showing the configuration of a second entity device certificate according to the same embodiment.

DETAILED DESCRIPTION OF THE INVENTION

Each embodiment of this invention will be explained below with reference to the drawings. Each device described below can be implemented separately with a hardware configuration or a combined configuration of hardware resources and software. The software in the combined configuration, as shown in FIG. 1, 2, 3, 14, 15, 16, 24, 25 or 26, includes a program installed beforehand in the computer of a corresponding device 10, 20, 30, 50, 10', 30' or 50' from the internet or a storage medium M for realizing the function of the corresponding device.

(First Embodiment)

Figure 3:
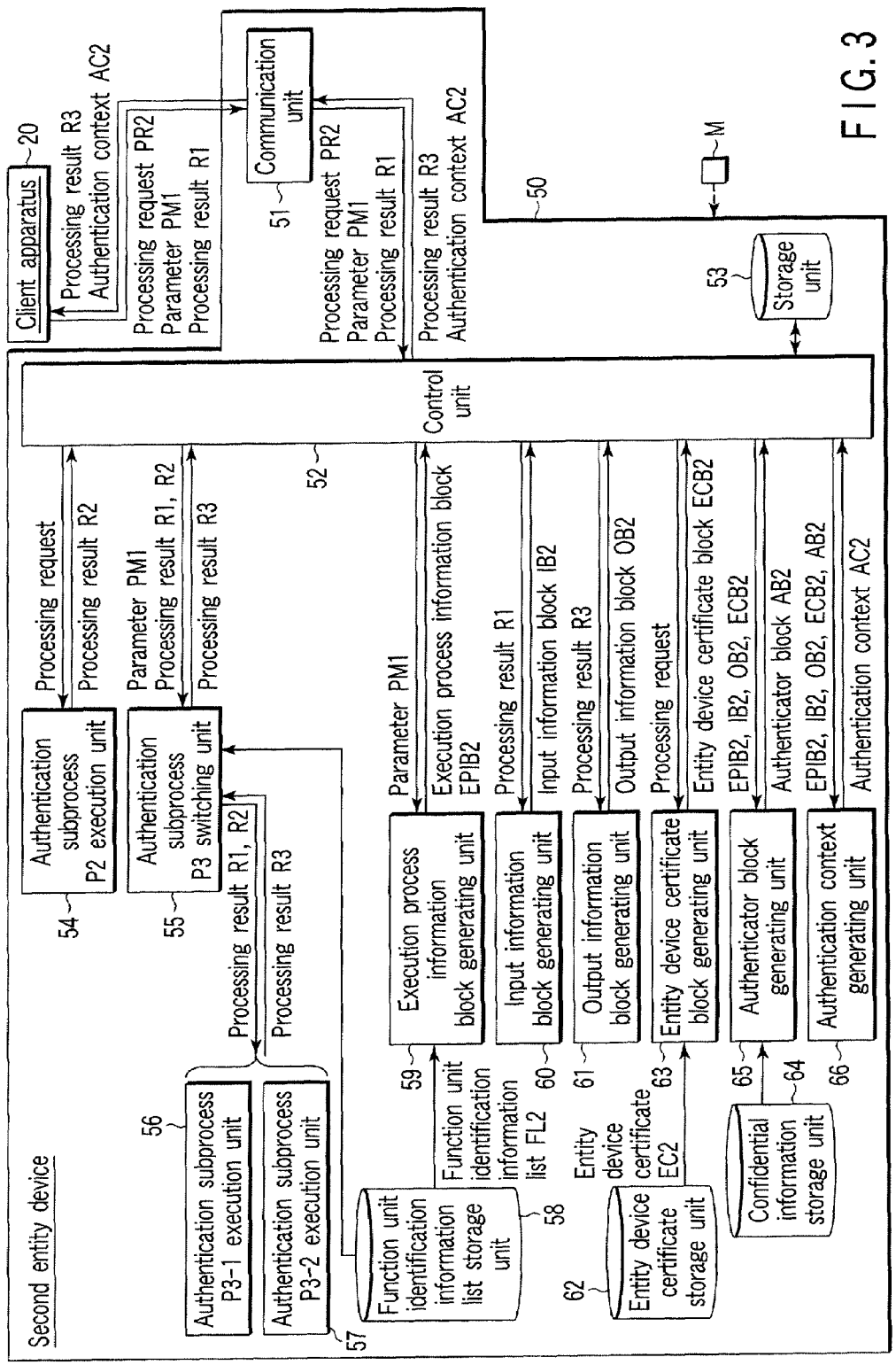
FIG. 3 is a schematic diagram showing the configuration of a second entity device according to the same embodiment.

FIG. 1 is a schematic diagram showing the configuration of an authentication system according to a first embodiment of the invention. FIG. 2 is a schematic diagram showing the configuration of a first entity device of the system, and FIG. 3 is a schematic diagram showing the configuration of a second entity device of the system. In this authentication system, an authentication apparatus 10 and a client apparatus 20 are communicable with each other, and so are the client apparatus 20 and the first and second entity devices 30, 50.

Specifically, this authentication system is configured of a biometric authentication process executed by the first and second entity devices 30, 50 through the client apparatus 20, and an authentication process of an authentication context executed by the authentication apparatus 10 through the client apparatus 20. The authentication context is the information for certifying the execution environment of the biometric authentication process.

Figure 4:
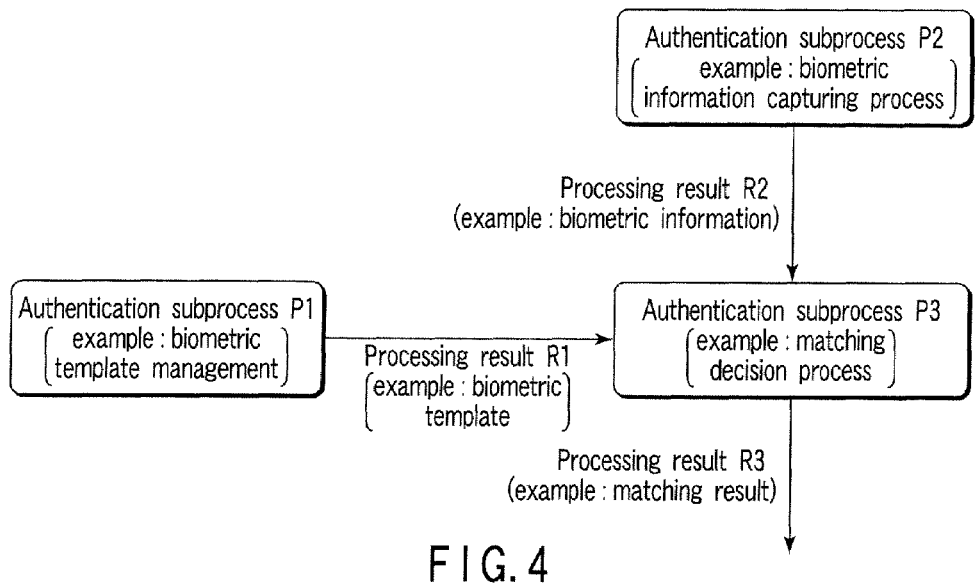
FIG. 4 is a schematic diagram showing an example of a biometric authentication process according to the same embodiment.
Figure 5:
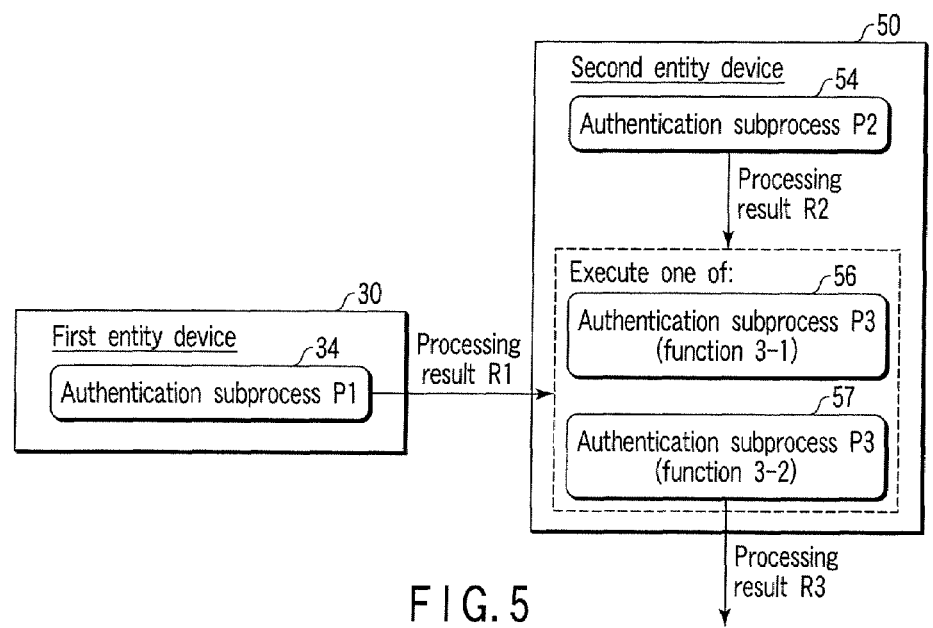
FIG. 5 is a schematic diagram for explaining an authentication subprocess according to the same embodiment.

The biometric authentication process, as an example thereof is shown in FIG. 4, is configured of a plurality of authentication subprocesses. FIG. 4 shows an example in which three authentication subprocesses P1 to P3 make up a biometric authentication process. Each authentication subprocess is executed by the first or second entity device 30 or 50. In the example shown in FIG. 5, the authentication subprocess P1 is executed in the first entity device 30, and the authentication subprocesses P2, P3 by the second entity device 50. Also, the second entity device 50 has functions 3-1 and 3-2 capable of executing the authentication subprocess P3. In other words, according to this embodiment, an example will be explained in which the second entity device 50 selects any one of the functions 3-1 and 3-2 and executes the authentication subprocess P3.

The authentication subprocesses P1, P2, P3 are the processes making up the component elements of the authentication process, or specifically, the processes into which the whole authentication process is separated. In an easy-to-understand case of the biometric authentication, for example, the authentication subprocess P1 is a process for managing the biometric information (biometric template) of the user registered in advance, the authentication subprocess P2 is a process for capturing the biometric information (biometric sample information) from the user, and the authentication subprocess P3 is a process for comparing the biometric information acquired from the authentication subprocesses P1, P2 and deciding whether they coincide with each other or not. Also, the number of the authentication subprocesses of the authentication process is not limited to three, and the authentication process may be separated into four or more or less than three, each of which may be executed in a different entity device.

The authentication contexts AC1, AC2 will be described later.

(Authentication Apparatus 10)

The authentication apparatus 10 includes a communication unit 1, a verification control unit 2, a storage unit 3, a confidential information storage unit 4, an authenticator block verification unit 5, an input/output information block verification unit 6, an authentication policy storage unit 7 and an entity device certificate block verification unit 8.

The communication unit 1 conducts the communication between the client apparatus 20 and the authentication apparatus 10, and includes the following functions (f1-1) and (f1-2):

(f1-1): The function of receiving the authentication context AC1 and the authentication context AC2 from the client apparatus 20.

(f1-2): The function of sending out the authentication context AC1 and the authentication context AC2 received to the verification control unit 2.

The format of the authentication context receivable by the communication unit 1 is not necessarily fixed, and any format discriminable from the authentication context can be used.

Figure 6A:
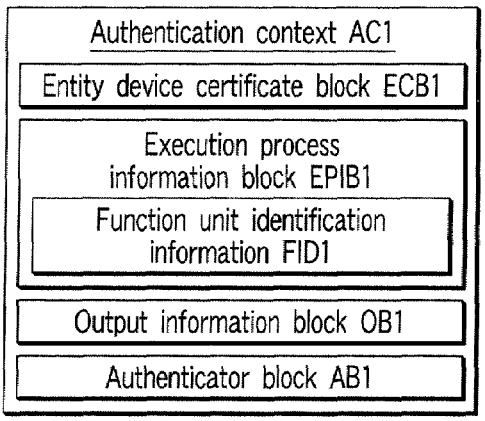
FIGS. 6A and 6B are schematic diagrams showing the format of an authentication context according to the same embodiment.
Figure 6B:
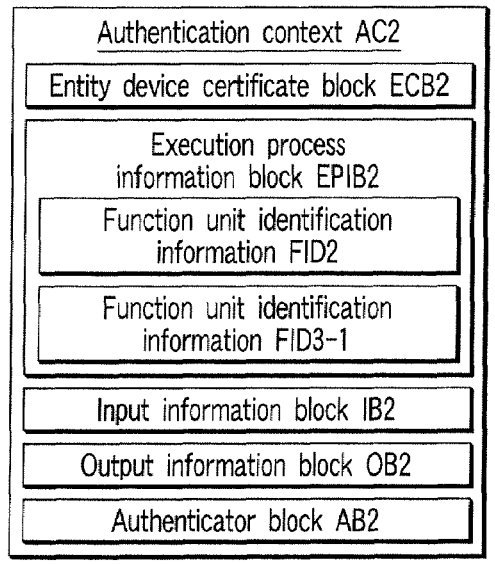

The authentication contexts AC1, AC2 are generated by the entity devices 30, 50 that have executed the authentication subprocesses P1, P2, P3. The formats of the authentication contexts AC1, AC2, as shown in FIGS. 6A and 6B, are configured of entity device certificate blocks ECB1, ECB2, execution process information blocks EPIB1, EPIB2, an input information block IB2, output information blocks OB1, OB2 and authenticator blocks AB1, AB2, respectively.

Figure 7A:
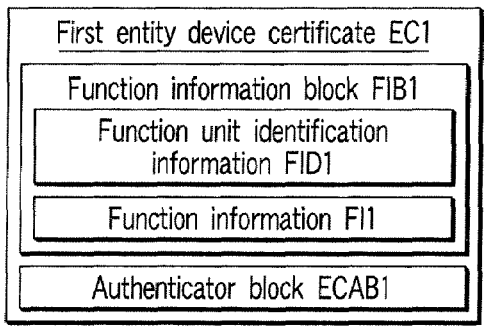
FIGS. 7A and 7B are schematic diagrams showing an examples of entity device certificates according to the same embodiment.
Figure 7B:
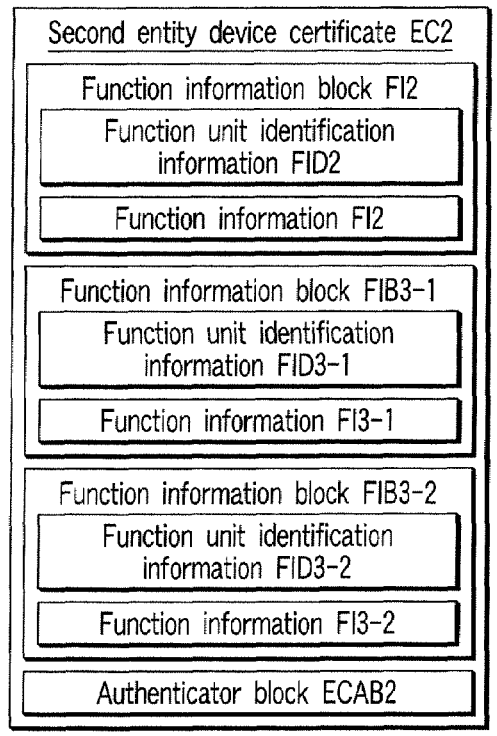

The entity device certificate blocks ECB1, ECB2 include entity device certificates EC1, EC2, respectively, constituting the information on the functions of the entity device that has generated the authentication contexts. As shown in FIGS. 7A, 7B, the entity device certificates EC1, EC2 are configured of function information blocks FIB1, FIB2, FIB3-1, FIB3-2, and authenticators generated for the function information blocks FIB1, FIB2, FIB3-1, FIB3-2, respectively. The function information blocks FIB1, FIB2, FIB3-1, FIB3-2 contain the description of the information relating to the functions of the corresponding entity devices, respectively. The authenticator is generated using the confidential information held by the organization that has issued the corresponding entity device certificate.

The function information blocks FIB1, FIB2, FIB3 are the information relating to each function unit executing the authentication subprocess in the corresponding entity devices 30, 50, and contain the function unit identification information (the execution device identification information or the execution process identification information) FID1, FID2, FID3-1, FID3-2 capable of identifying the function units, and the function information (the execution device performance information or the execution process performance information) FI1, FI2, FI3-1, FI3-2 indicating the performance of the function units. The function information FI1, FI2, FI3-1, FI3-2 contains the description of the evaluation items for each function unit and the evaluation result in correspondence with each other. As shown in FIGS. 8A, 8B, 8C and 8D, for example, arbitrary information such as the quality (resolution, for example) of the sensor to capture the biometric information, the quality of the biometric template or the matching accuracy can be described as evaluation items. For each evaluation item, the corresponding evaluation result is described.

The entity device certificate block need not necessarily contain the description of the entity device certificate, but the entity certificate specifying information for specifying the entity device certificate. The "entity certificate specifying information for specifying the entity device certificate" may be rewritten to read "entity certificate acquisition information for acquiring the entity device certificate".

The execution process information block includes the function unit identification information FID1, FID2, FID3-1, FID3-2 of all those function units adapted to uniquely specify the function units of the entity devices 30, 50 capable of executing the authentication subprocess which have executed the authentication subprocesses in the entity devices 30, 50.

The input information block IB2 includes the processing result of the authentication subprocesses executed by the other entity device 30 that is input to the entity device 50. In the case where the input information block is not included in the authentication context AC1 in the entity device 30 as shown in FIG. 6A, the authentication subprocess of the entity device 30 fails to follow the order dependent on the authentication subprocess for the other entity device 50, and indicates the status as the initial process (first authentication subprocess).

The output information blocks OB1, OB2 include the processing result generated by the authentication subprocesses executed in and output from the entity devices 30, 50.

The input information block and the output information block contained in each authentication context is not limited to one in number, and in the case where a plurality of processing results are input to or output from the entity device, as many input information blocks or output information blocks as the processing results may be contained. Further, the processing result contained in the input information block and the output information block may contain the description of the biometric information. From the viewpoint of privacy protection, therefore, a unidirectional function process such as the hash function may be executed. In the case where the unidirectional function process is executed, however, such a process is required to be executed for all the processing results having the same value. Also, in the case where the processing result not subjected to the unidirectional function process is accessed in the authentication apparatus 10, the processing result is required to be transmitted to the authentication apparatus 10 apart from the authentication context. Nevertheless, the presence or absence of such a function is not specifically defined here.

The authenticator blocks AB1, AB2 contain the authenticators generated using the confidential information held by the entity devices 30, 50 for all the information blocks generated in the entity devices 30, 50. The authenticator in this case is a digital signature or a message authentication code (MAC). Incidentally, the entity devices 30, 50 hold a private key of the public key encryption system in the case where a digital signature is used as an authenticator, and a common key shared with the authentication apparatus 10 in the case where the message authentication code is used as an authenticator. The authentication apparatus 10, on the other hand, holds a public key of the entity devices 30, 50 for the public key encryption system in the case where a digital signature is used as an authenticator, and a common key shared with the entity devices 30, 50 in the case where the message authentication code is used as an authenticator.

The attribute of each block can be identified by the name thereof. With regard to the output information block OB1, for example, the attribute "output information block" can be identified by "OB" of the name OB1. In a similar fashion, the attribute "input information block" of the input information block IB1 can be identified by "IB" of the name IB1. As for the authenticator block AB1, the attribute "authenticator block" can be identified by "AB". This is also the case with each embodiment described below.

The format of the authentication context is not necessarily fixed, and any format identifiable as an authentication context can be used. Specifically, for example, any of the authentication context not including the input information block, the authentication context not including the output information block and the authentication context including both the input information block and the output information block may be used. Further, the format including the information block other than those described above may be handled as an "authentication context" regardless of the contents of the authentication context.

The verification control unit 2 is for controlling the steps of verifying the legitimacy of each authentication subprocess making up the authentication process from the authentication context generated in the entity devices 30, 50. The verification control unit 2 has the following functions (f2-1) to (f2-8):

(f2-1): The function of acquiring the authentication context AC1 and the authentication context AC2 from the communication unit 1.

(f2-2): The function of sending out the authentication context AC1 and the authentication context AC2 acquired to the authenticator block verification unit 5.

(f2-3): The function of acquiring the result of verifying the authenticators included in the authentication contexts AC1, AC2 from the authenticator block verification unit 5.

(f2-4): The function of extracting all of the input information block IB2 and the output information blocks OB1, OB2 included in the authentication contexts AC1, AC2 and sending them out to the input/output information block verification unit 6.

(f2-5): The function of acquiring the result of verifying the input information block IB2 and the output information blocks OB1, OB2 from the input/output information block verification unit 6.

(f2-6): The function of acquiring the authentication policy AP from the authentication policy storage unit 7.

(f2-7): The function of extracting the entity device certificate blocks ECB1, ECB2 and the execution process information blocks EPIB1, EPIB2 included in the authentication contexts AC1, AC2 and sending them out to the entity device certificate block verification unit 8 together with the authentication policy AP.

(f2-8): The function of acquiring the result of verifying the legitimacy of the executed authentication process from the entity device certificate block verification unit 8.

The storage unit 3 is readable and writable by the verification control unit 2.

The confidential information storage unit 4 is readable and writable by the verification control unit 2, and holds the confidential information for verifying the authenticator blocks AB1, AB2. In the case where the authenticators AB1, AB2 are digital signatures of the entity devices 30, 50, the public key of the entity devices 30, 50 for the public key encryption system is held as the confidential information, while in the case where the authenticators AB1, AB2 are message authentication codes, on the other hand, a common key shared by the entity devices 30, 50 is held.

The authenticator block verification unit 5 has the following functions (f5-1) to (f5-3):

(f5-1): The function of acquiring the authentication contexts AC1, AC2 from the verification control unit 2.

(f5-2): The function of verifying, using the confidential information in the confidential information storage unit 4, the authenticator blocks AB1, AB2 included in the authentication contexts AC1, AC2 acquired.

(f5-3): The function of sending out the result of verifying the authenticator blocks AB1, AB2 to the verification control unit 2.

The input/output information block verification unit 6 has the following functions (f6-1) to (f6-3):

(f6-1): The function of acquiring the input information block IB2 and the output information blocks OB1, OB2 from the verification control unit 2.

(f6-2): The function of verifying that the processing result R1 included in all the input information block IB2 acquired coincides with any one of the processing results R1, R2 included in the output information blocks OB1, OB2.

(f6-3): The function of sending out the verification result to the verification control unit 2.

Figures 8A, 8B, 8C, 8D, 9:
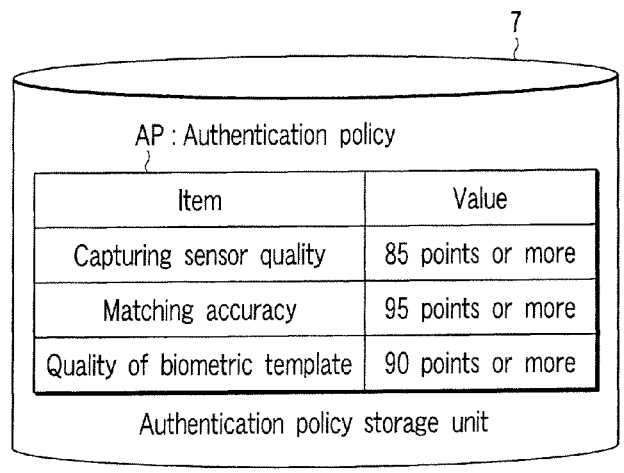
FIGS. 8A, 8B, 8C and 8D are schematic diagrams showing examples of function information according to the same embodiment.
FIG. 9 is a schematic diagram showing an example of an authentication policy stored in an authentication policy storage unit according to the same embodiment.

The authentication policy storage unit 7 has the function of storing the authentication policy AP. The authentication policy AP (performance criteria information), as shown in FIG. 9, for example, is expressed by a verification item and a criterion value to be met by the item as a set.

The entity device certificate block verification unit 8 has the following functions (f8-1) to (f8-7):

(f8-1): The function of acquiring the entity device certificate blocks ECB1, ECB2, the execution process information blocks EPIB1, EPIB2 and the authentication policy AP from the verification control unit 2.

(f8-2): The function of extracting all the function unit identification information (the execution device identification information or the execution process identification information used for generating the authenticator) included in all the execution process information blocks EPIB1, EPIB2 acquired.

(f8-3): The function of extracting the entity device certificates EC1, EC2, if described directly in the entity device certificate blocks ECB1, ECB2 acquired from the verification control unit 2, from the entity device certificate blocks ECB1, ECB2.

(f8-4): The function whereby, in the case where the entity certificate specifying information for specifying the entity device certificates EC1, EC2 is described in the entity device certificate blocks ECB1, ECB2 acquired from the verification control unit 2, the entity device certificates EC1, EC2 corresponding to the particular entity certificate specifying information are acquired from a certificate storage unit (such as an external storage unit not shown, or an internal storage unit not shown, of the authentication apparatus 10) for storing the entity certificate specifying information and the entity device certificates EC1, EC2 in correspondence with each other.

(f8-5): The function of extracting the function information block having the function unit identification information of the same value as the extracted function unit identification information from the entity device certificates EC1, EC2 acquired from the verification control unit 2.

(f8-6): The function of verifying whether or not the function information (the corresponding execution device performance information or the execution process performance information) included in the extracted function information block meets the conditions described in the authentication policy AP (the performance criteria information).

(f8-7): The function of sending out the verification result to the verification control unit 2.

In the entity device certificate block verification unit 8, for example, the quality of the capturing sensor included in the function information FI1 (90 points), the quality of the biometric template included in the function information F2 (95 points) and the matching accuracy (99%) included in the function information FI3-1 (or the function information FI3-2) are compared with the criterion value of each item contained in the authentication policy AP, and in the case where the conditions of the authentication policy AP are met, the verification is decided as a success, and otherwise, as a failure. Also, as the entity certificate specifying information, "URI" (uniform resource identifier) can be used as required for the external storage unit, and "file name" or "identification information (ID)" for the internal storage unit of the authentication apparatus 10.

(Client Apparatus 20)

The client apparatus 20 includes an execution step storage unit 21, an authentication subprocess control unit 22, a storage unit 23, a first entity device communication unit 24, a second entity device communication unit 25 and a communication unit 26.

The execution step storage unit 21 has the function of storing the execution steps of the authentication subprocess executed in the entity devices 30, 50. As shown in FIG. 10, for example, the execution step storage unit 21 holds, in correspondence with each other, the information (the entity device identification information) for specifying the entity devices 30, 50 requested to execute a process, a processing request constituting a message to the entity devices, a parameter for designating the function unit for executing the authentication subprocess in the entity devices, the processing result identification information RID1 for identifying the processing result of the authentication subprocess executed in the entity device 30 and transmitted to the other entity device 50 requesting the process, and the processing result identification information RID1, RID2 for identifying the processing result of the authentication subprocess execute in the entity devices 30, 50 requested to execute the process.

The authentication subprocess control unit 22 controls the authentication subprocess based on the execution steps stored in the execution step storage unit 21. The authentication subprocess control unit 22 has the following functions (f22-1) to (f22-4):

(f22-1): The function of transmitting the designated processing request, parameter and the processing result to a designated entity device based on the specifying information described in the execution step storage unit 21.

(f22-2): The function of acquiring the authentication contexts and the processing result through the entity device communication units 24, 25 from the entity devices 30, 50.

(f22-3): The function of managing, by relating to each other, the processing results R1, R2 acquired from the entity devices 30, 50 and the processing result identification information RID1, RID2 corresponding to the entity devices 30, 50 acquired from the execution step storage unit 21.

(f22-4): The function of transmitting the authentication contexts acquired from the entity devices 30, 50 to the authentication apparatus 10 through the communication unit 26.

Specifically, in the case where the authentication process is executed based on the execution steps described in FIG. 10, the authentication subprocess control unit 22 first transmits a processing request PR1 to the first entity device 30. The authentication subprocess control unit 22 then acquires the processing result R1 of the authentication subprocess from the first entity device 30 and stores the acquired processing result R1 in the storage unit 23 in correspondence with the processing result identification information RID1. Next, the authentication subprocess control unit 22 transmits the processing request PR2, the parameter PM1 and the processing result R1 corresponding to the processing result identification information RID1 to the second entity device 50. After that, the authentication subprocess control unit 22 acquires the processing result R3 of the authentication subprocess from the second entity device 50 and stores the acquired processing result R3 in the storage unit 23 in correspondence with the processing result identification information RID2.

The storage unit 23 is adapted to be read from and written into by the authentication subprocess control unit 22, and holds the processing results R1, R2, the processing result identification information RID1, RID2 and the authentication contexts AC1, AC2.

The first entity device communication unit 24, which is for executing the communication between the device associated therewith and the first entity device 30, has the function of transmitting the processing request PR1 acquired from the authentication subprocess control unit 22 to the first entity device 30 and the function of receiving the processing result R1 for the processing request PR1 and the authentication context AC1 from the first entity device 30 and sending them out to the authentication subprocess control unit 22.

The second entity device communication unit 25 is for executing the communication between the device associated therewith and the second entity device 50. The second entity device communication unit 25 has the following functions (f25-1) and (f25-2):

(f25-1): The function of transmitting the processing request PR2 acquired from the authentication subprocess control unit 22 to the second entity device together with the processing result R1 and the parameter PM1 acquired from the authentication subprocess control unit 22.

(f25-2): The function of receiving the processing result R3 for the processing request PR2 and the authentication context AC2 from the second entity device and sending them out to the authentication subprocess control unit 22.

The communication unit 26 is for executing the communication between the device associated therewith and the authentication apparatus 10, and has the function of transmitting the authentication contexts AC1, AC2 generated by the first entity device 30 and the second entity device 50, respectively, to the authentication apparatus 10.

(First Entity Device 30)

The first entity device 30 includes a communication unit 31, a control unit 32, a storage unit 33, an authentication subprocess P1 execution unit 34, a function unit identification information list storage unit 35, an execution process information block generating unit 36, an output information block generating unit 37, an entity device certificate storage unit 38, an entity device certificate block generating unit 39, a confidential information storage unit 40, an authenticator block generating unit 41 and an authentication context generating unit 42.

The communication unit 31 is for conducting the communication between the device associated therewith and the client apparatus 20, and has the following functions (f31-1) to (f31-4):

(f31-1): The function of receiving the processing request PR1 from the client apparatus 20.

(f31-2): The function of sending out the received processing request PR1 to the control unit 32.

(f31-3): The function of acquiring the processing result R1 and the authentication context AC1 from the control unit 32.

(f31-4): The function of transmitting the acquired processing result R1 and the authentication context AC1 to the client apparatus 20. The format of the authentication context capable of being transmitted by the communication unit 31 is not necessarily fixed, and all the formats discriminable from the authentication context can be handled.

The control unit 32 is for controlling the process in the first entity device 30, and has the following functions (f32-1) to (f32-11):

(f32-1): The function of acquiring the processing request PR1 from the communication unit 31.

(f32-2): The function of sending out the processing request to the authentication subprocess P1 execution unit 34.

(f32-3): The function of acquiring the processing request R1 of the authentication subprocess P1 from the authentication subprocess P1 execution unit 34.

(f32-4): The function of acquiring the execution process information block EPIB1 from the execution process information block generating unit 36.

(f32-5): The function of sending out the processing request R1 to the output information block generating unit 37.

(f32-6): The function of acquiring the output information block OB1 from the output information block generating unit 37.

(f32-7): The function of acquiring the entity device certificate block ECB1 from the entity device certificate block generating unit 39.

(f32-8): The function of sending out the execution process information block EPIB1, the output information block OB1 and the entity device certificate block ECB1 to the authenticator block generating unit 41.

(f32-9): The function of acquiring the authenticator block AB1 from the authenticator block generating unit 41.

(f32-10): The function of sending out the execution process information block EPIB1, the output information block OB1, the entity device certificate block ECB1 and the authenticator block AB1 to the authentication context.

(f32-11): The function of acquiring the authentication context AC1 from the authentication context generating unit 42.

The storage unit 33 is capable of being read from and written into by the control unit 32.

The authentication subprocess P1 execution unit 34 has the following functions (f34-1) and (f34-2):

(f34-1): The function of executing the authentication subprocess P1 upon acquisition of the processing request from the control unit 32.

(f34-2): The function of sending out the processing result R1 acquired by execution of the authentication subprocess P1 to the control unit 32.

The function unit identification list storage unit 35, as shown in FIG. 11, has the function of storing the function unit identification information list FL1 in which the function unit identification information FID1 held in the first entity device 30 for specifying all the function units capable of executing the authentication subprocess and the parameter designated for selecting the particular function unit are related to each other.

In the function unit identification information list FL1, the function unit identification information FID1 capable of specifying the authentication subprocess P1 execution unit 34 and the parameter designated for selecting the authentication subprocess P1 execution unit 34 are related to each other and held as a set. In this case, the function unit for executing the authentication subprocess P1 cannot be selected, and therefore, the parameter constitutes the information indicating "no designation".

The execution process information block generating unit 36 has the following functions (f36-1) to (f36-5):

(f36-1): The function of acquiring the parameter from the control unit 32.

(f36-2): The function of acquiring the function unit identification information list FL1 from the function unit identification information list storage unit 35.

(f36-3): The function of selecting the function unit identification information corresponding to the parameter from the acquired function unit identification information list FL1.

(f36-4): The function of generating the execution process information block EPIB1 including the selected function unit identification information.

(f36-5): The function of sending out the generated execution process information block to the control unit 32.

In the first entity device 30, the parameter designation is not required when executing the authentication subprocess P1. In the function unit identification information list FL1, therefore, the information indicating "no designation" of the parameter is described and the function unit identification information FID1 can be selected uniquely. In the second entity device, on the other hand, the parameter designation is required when executing the authentication subprocess P3. Therefore, the execution process information block generating unit 36, upon acquisition of the parameter PM1 from the control unit 32, inserts the function unit identification information FID3-1, and upon acquisition of the parameter PM2, inserts the function unit identification information FID3-2 into the execution process information block EPIB2 together with the function unit identification information FID2.

The output information block generating unit 37 has the following functions (f37-1) to (f37-3):

(f37-1): The function of acquiring all the processing results R1 output by the entity device from the control unit 32.

(f37-2): The function of generating the output information block OB1 for each processing result including the acquired processing result R1.

(f37-3): The function of sending out all the output information blocks OB1 generated to the control unit 32.

The entity device certificate storage unit 38 has the function of storing the entity device certificate EC1 of the first entity device 30. In this case, the entity device certificate storage unit 38 may store, in place of the entity device certificate EC1, the information capable of specifying the entity device certificate EC1.

The entity device certificate block generating unit 39 has the following functions (f39-1) to (f39-3):

(f39-1): The function of acquiring the entity device certificate EC1 from the entity device certificate storage unit 38.

(f39-2): The function of generating the entity device certificate block ECB1 including the acquired entity device certificate EC1.

(f39-3): The function of sending out the generated entity device certificate block ECB1 to the control unit 32. In the case where the entity device certificate storage unit 38 stores, in place of the entity device certificate EC1, the entity certificate specifying information for specifying the entity device certificate EC1, the particular entity certificate specifying information is included in the entity device certificate block ECB1.

The confidential information storage unit 40 can be read from and written into by the authenticator block generating unit 41, and holds the confidential information for generating the authenticator block AB1. In the case where the authenticator AB1 is a digital signature, the private key of the public key encryption system for the entity device 30 is held, while in the case where the authenticator AB1 is a message authentication code, the common key shared by the authentication apparatus 10 is held as the confidential information. The confidential information storage unit 40 preferably has a tamperproof property.

The authenticator block generating unit 41 has the following functions (f41-1) to (f41-4):

(f41-1): The function of acquiring all the information blocks generated in the entity device 30 from the control unit 32.

(f41-2): The function of generating the authenticator for all the acquired information blocks, using the confidential information in the confidential information storage unit 40.

(f41-3): The function of generating the authenticator block AB1 from the authenticator generated.

(f41-4): The function of sending out the generated authenticator block AB1 to the control unit 32.

Specifically, the authenticator block generating unit 41 acquires, for example, the execution process information block EPIB1, the output information block OB1 and the entity device certificate block ECB1 from the control unit 32, and generates an authenticator for the acquired execution process information block EPIB1, the output information block OB1 and the entity certificate block ECB1. In more detail, the authenticator block generating unit 41 generates an authenticator for all the information blocks generated by the entity device and making up the authentication context. The types and quantity of the information blocks are arbitrary.

The authentication context generating unit 42 has the following functions (f42-1) to (f42-4):

(f42-1): The function of acquiring all the information blocks generated in the entity device from the control unit 32.

(f42-2): The function of acquiring the authenticator block AB1 generated by the authenticator block generating unit 41.

(f42-3): The function of generating the authentication context AC1 from all the information blocks acquired.

(f42-4): The function of sending out the generated authentication context AC1 to the control unit 32.

Specifically, the authentication context generating unit 42 acquires, for example, the execution process information block EPIB1, the output information block OB1, the entity device certificate block ECB1 and the authenticator block AB1 from the control unit 32, and generates the authentication context AC1 from the execution process information block EPIB1, the output information block OB1, the entity device certificate block ECB1 and the authenticator block AB1 thus acquired. Incidentally, the authentication context generating unit 42 generates the authentication context AC1 from all the information blocks generated in the entity device 30. Arbitrary types and quantities of the information blocks can be employed.

(Second Entity Device 50)

The second entity device 50 includes a communication unit 51, a control unit 52, a storage unit 53, an authentication subprocess P2 execution unit 54, an authentication subprocess P3 switching unit 55, an authentication subprocess P3-1 execution unit 56, an authentication subprocess P3-2 execution unit 57, a function unit identification information list storage unit 58, an execution process information block generating unit 59, an input information block generating unit 60, an output information block generating unit 61, an entity device certificate storage unit 62, an entity device certificate block generating unit 63, a confidential information storage unit 64, an authenticator block generating unit 65 and an authentication context generating unit 66.

The communication unit 51 carries out the communication between the device associated therewith and the client apparatus 20, and has the following functions (f51-1) to (f51-4):

(f51-1): The function of receiving the processing request PR2, the parameter and the processing result R1 from the client apparatus 20.

(f51-2): The function of sending out the processing request PR2, the parameter and the processing result R1 received to the control unit 52.

(f51-3): The function of acquiring the processing result R3 and the authentication context AC2 from the control unit 52.

(f51-4): The function of transmitting the processing result R3 and the authentication context AC2 acquired to the client apparatus 20. In this case, the format of the authentication context capable of being transmitted by the communication unit 51 is not necessarily fixed, and all the formats discriminable from the authentication context can be handled.

The control unit 52 is for controlling the process in the second entity device 50 and has the following functions (f52-1) to (f52-16):

(f52-1): The function of acquiring the processing request PR2, the parameter and the processing result R1 from the communication unit 51.

(f52-2): The function of sending out the processing request to the authentication subprocess P2 execution unit 54.

(f52-3): The function of acquiring the processing result R2 of the authentication subprocess P2 from the authentication subprocess P2 execution unit 54.

(f52-4): The function of sending out the parameter, the processing result R1 and the processing result R2 to the authentication subprocess P3 switching unit 55.

(f52-5): The function of acquiring, from the authentication subprocess P3 switching unit 55, the processing result R3 of the authentication subprocess executed in the authentication subprocess P3-1 execution unit 56 or the authentication subprocess P3-2 execution unit 57.

(f52-6): The function of sending out the parameter to the execution process information block generating unit 59.

(f52-7): The function of acquiring the execution process information block EPIB2 from the execution process information block generating unit 59.

(f52-8): The function of sending out the processing result R1 to the input information block generating unit 60.

(f52-9): The function of acquiring the input information block IB2 from the input information block generating unit 60.

(f52-10): The function of sending out the processing result R3 to the output information block generating unit 61.

(f52-11): The function of acquiring the output information block OB2 from the output information block generating unit 61.

(f52-12): The function of acquiring the entity device certificate block ECB2 from the entity device certificate block generating unit 63.

(f52-13): The function of sending out the execution process information block EPIB2, the input information block IB2, the output information block OB2 and the entity device certificate block ECB2 to the authenticator block generating unit 65.

(f52-14): The function of acquiring the authenticator block AB2 from the authenticator block generating unit 65.

(f52-15): The function of sending out the execution process information block EPIB2, the input information block IB2, the output information block OB2, the entity device certificate block ECB2 and the authenticator block AB2 to the authentication context generating unit 66.

(f52-16): The function of acquiring the authentication context AC2 from the authentication context generating unit 66.

The storage unit 53 is capable of being read from and written into by the control unit 52.

The authentication subprocess P2 execution unit 54 has the function of executing the authentication subprocess P2 upon acquisition of the processing request from the control unit 52, and the function of sending out the processing result R2 obtained by executing the authentication subprocess P2 to the control unit 52.

The authentication subprocess P3 switching unit 55 has the following functions (f55-1) to (f55-5):

(f55-1): The function of acquiring the processing request, the parameter, the processing result R1 and the processing result R2 from the control unit 52.

(f55-2): The function of determining one function unit for executing the authentication subprocess from two or more function units by referring to the function unit identification information list storage unit 58 in accordance with the value of the acquired parameter.

(f55-3): The function of sending out the processing result R1 and the processing result R2 to the authentication subprocess P3-1 execution unit 56 or the authentication subprocess P3-2 execution unit 57 determined to execute the authentication subprocess.

(f55-4): The function of acquiring the processing result R3 from the authentication subprocess P3-1 execution unit 56 or the authentication subprocess P3-2 execution unit 57 that has executed the authentication subprocess.

(f55-5): The function of sending out the acquired processing result R3 to the control unit 52. In the case where the authentication subprocess P3 switching unit 55 acquires the parameter PM1 from the control unit 52, the authentication subprocess P3-1 execution unit 56 executes the authentication subprocess P3, while in the case where the authentication subprocess P3 switching unit 55 acquires the parameter PM2 from the control unit 52, the authentication subprocess P3-2 execution unit 57 executes the authentication subprocess P3.

Incidentally, the authentication subprocess P3-1 execution unit 56 and the authentication subprocess P3-2 execution unit 57 have performances different from each other and can generate the processing result by executing the same authentication subprocess P3.

The authentication subprocess P3-1 execution unit 56 has the following functions (f56-1) to (f56-3):

(f56-1): The function of acquiring the processing result R1 and the processing result R2 from the authentication subprocess P3 switching unit 55.

(f56-2): The function of executing the authentication subprocess P3-1 by referring to the processing result R1 and the processing result R2 acquired, upon receipt of the request for execution of the authentication subprocess P3-1 from the authentication subprocess P3 switching unit 55.

(f56-3): The function of sending out the processing result R3 acquired by executing the authentication subprocess P3-1 to the authentication subprocess P3 switching unit 55.

The authentication subprocess P3-2 execution unit 57 has the same function as the authentication subprocess P3-1 execution unit 56 except that the authentication subprocess P3-2 instead of the authentication subprocess P3-1 is executed.

The function unit identification information list storage unit 58, as shown in FIG. 12, like the second entity device 50, has the function of storing the function unit identification information (the execution device identification information or the execution process identification information) FID2 for specifying all the function units capable of executing the authentication subprocess and the function unit identification information list FL2 as related to the parameter designated for selecting the particular function unit.

The function unit identification information list FL2 holds, by relating to each other, the function unit identification information FID2 capable of specifying the authentication subprocess P2 execution unit 54, combined as a set with a parameter for selecting the authentication subprocess P2 execution unit 54, the function unit identification information FID3-1 capable of specifying the authentication subprocess P3-1 execution unit 56, combined as a set with a parameter designated for selecting the authentication subprocess P3-1 execution unit 56, and the function unit identification information FID3-2 capable of specifying the authentication subprocess P3-2 execution unit 57, combined as a set with a parameter designated for selecting the authentication subprocess P3-2 execution unit 57. In this case, the function unit for executing the authentication subprocess P2 cannot be selected, and therefore, the parameter is designated as information indicating "no designation". Also, the authentication subprocess P3 is executed by the authentication subprocess P3-1 execution unit 56 or the authentication subprocess P3-2 execution unit 57, and therefore, for which different parameters are designated.

The execution process information block generating unit 59 has the following functions (f59-1) to (f59-5):

(f59-1): The function of acquiring the parameter from the control unit 52.

(f59-2): The function of acquiring the function unit identification information list FL2 from the function unit identification information list storage unit 58.

(f59-3): The function of selecting the function unit identification information corresponding to the parameter from the function unit identification information list FL2 acquired.

(f59-4): The function of generating the execution process information block EPIB2 including the selected function unit identification information.

(f59-5): The function of sending out the execution process information block EPIB2 generated to the control unit 52.

The input information block generating unit 60 has the following functions (f60-1) to (f60-3):

(f60-1): The function of acquiring from the control unit 52 all the processing results R1 received by the entity device 50.

(f60-2): The function of generating the input information block IB2 including the acquired processing result R1 for each processing result.

(f60-3): The function of sending out all the input information blocks IB2 generated to the control unit 52.

The output information block generating unit 61 has the following functions (f61-1) to (f61-3):

(f61-1): The function of acquiring from the control unit 52 all the processing results R3 output by the entity device 50.

(f61-2): The function of generating the output information block OB2 including the acquired processing result R3 for each processing result.

(f61-3): The function of sending out all the output information blocks OB2 generated to the control unit 52.

The entity device certificate storage unit 62 has the function of storing the entity device certificate EC2 of the second entity device 50. In this case, like the entity device certificate storage unit 38 of the first entity device 30, the entity device certificate storage unit 62 may store, in place of the entity device certificate EC2, the information capable of specifying the entity device certificate EC2.

The entity device certificate block generating unit 63 has the following functions (f63-1) to (f63-3):

(f63-1): The function of acquiring the entity device certificate EC2 from the entity device certificate storage unit 62.

(f63-2): The function of generating the entity device certificate block ECB2 including the entity device certificate EC2 acquired.

(f63-3): The function of sending out the generated entity device certificate block ECB2 to the control unit 52. In the case where the entity device certificate storage unit 62 stores the entity certificate specifying information for specifying the entity device certificate EC2 in place of the entity device certificate EC2, the entity certificate specifying information is included in the entity device certificate block.

The confidential information storage unit 64 can be read from and written into by the authenticator block generating unit 65, and holds the confidential information for generating the authenticator block AB2. In the case where the authenticator AB2 is a digital signature, the private key of the entity device 50 for the public key encryption system is held as confidential information, while in the case where authenticator AB2 is a message authentication code, the common key shared with the authentication apparatus 10 is held. In this case, the confidential information storage unit 64 preferably has a tamperproof property.

The authenticator block generating unit 6 has the following functions (f65-1) to (f65-4):

(f65-1): The function of acquiring all the information blocks generated in the entity device 50 from the control unit 52.

(f65-2): The function of generating the authenticator for all the acquired information blocks using the confidential information in the confidential information storage unit 64.

(f65-3): The function of generating the authenticator block AB2 from the authenticator generated.

(f65-4): The function of sending out the generated authenticator block AB2 to the control unit 52.

Specifically, the authenticator block generating unit 65 acquires, for example, the execution process information block EPIB2, the input information block IB2, the output information block OB2 and the entity device certificate block ECB2 from the control unit 52, and generates the authenticator for the acquired execution process information block EPIB2, the input information block IB2, the output information block OB2 and the entity device certificate block ECB2. In this way, the authenticator block generating unit 65, like the authenticator block generating unit 65 of the second entity device 50, generates the authenticator for all the information blocks making up the authentication context generated in the entity device. The types and the quantities of the information blocks are arbitrary.

The authentication context generating unit 66 has the following functions (f66-1) to (f66-4):

(f66-1): The function of acquiring all the information blocks generated in the entity device from the control unit 52.

(f66-2): The function of acquiring the authenticator block AB2 generated by the authenticator block generating unit 65.

(f66-3): The function of generating the authentication context AC2 from all the information blocks acquired.

(f66-4): The function of sending out the generated authentication context AC2 to the control unit 52. Specifically, the authentication context generating unit 66 acquires the execution process information block EPIB2, the input information block IB2, the output information block OB2, the entity device certificate block ECB2 and the authenticator block AB2 from the control unit 52, and generates the authentication context AC2 from the execution process information block EPIB2, the input information block IB2, the output information block OB2, the entity device certificate block ECB2 and authenticator block AB2 acquired. Incidentally, the authentication context generating unit 66, like the authentication context generating unit 66 of the second entity device 50, generates the authentication context AC2 from all the information blocks generated by the entity device 50. The information blocks of any type can be employed in any number.

Figure 13:
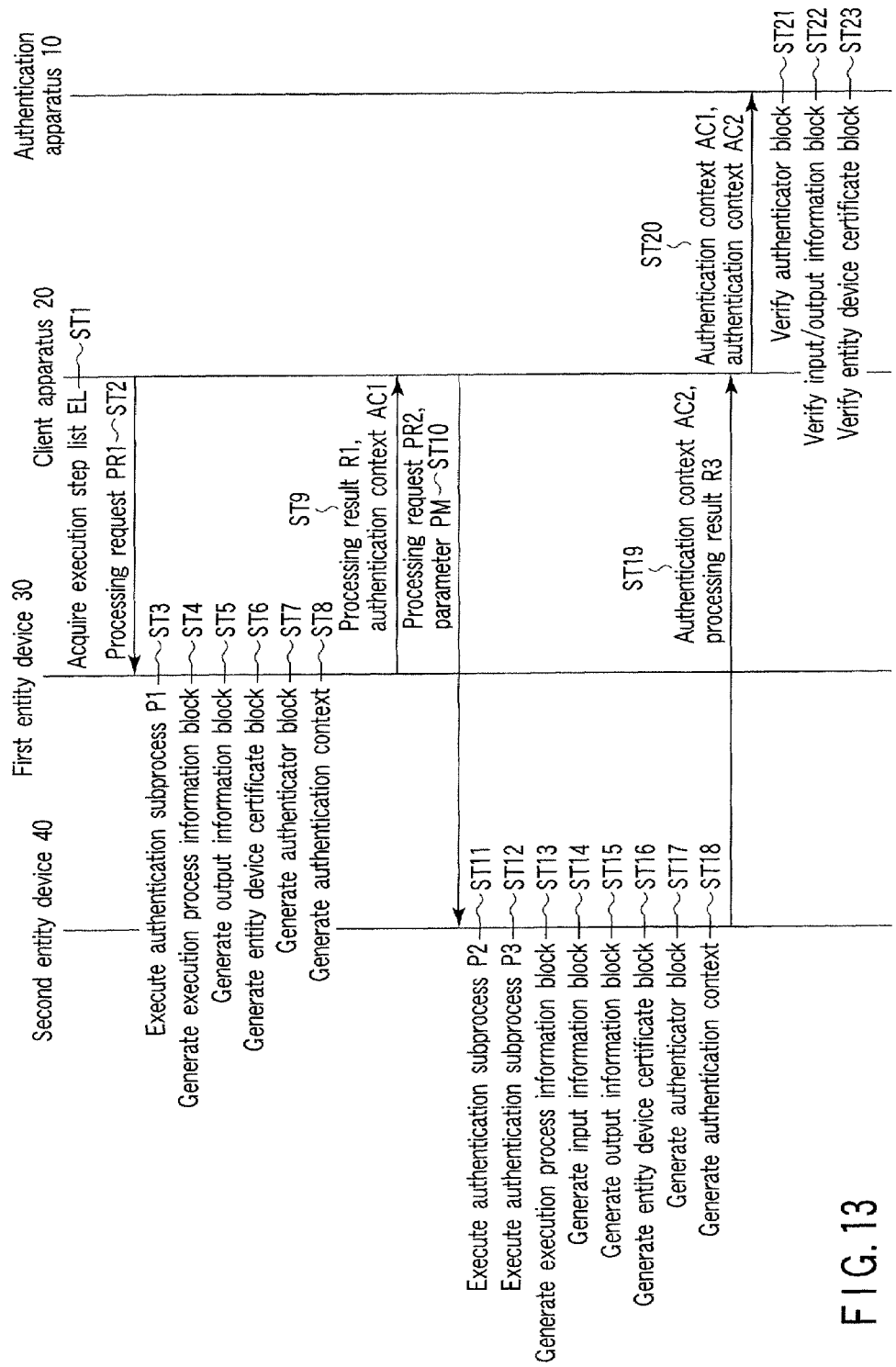
FIG. 13 is a sequence chart for explaining the operation according to the same embodiment.

Next, the operation of the authentication system configured as described above will be explained with reference to FIG. 13.

(General Operation)

In the client apparatus 20, the authentication subprocess control unit 22 acquires the execution step list EL from the execution step storage unit 21 (ST1). Then, based on the execution step list EL thus acquired, the processing request is transmitted to the corresponding entity device.

In the case where the execution step list EL shown in FIG. 10 is used, for example, the authentication subprocess control unit 22 first transmits the processing request PR1 to the first entity device 30, and then determines from the information on the first line to attach the processing result identification information RID2 to the processing result R1 acquired from the first entity device 30. Thus, the client apparatus 20 first transmits the processing request PR1 to the first entity device 30 (ST2). In the case where neither the parameter nor the transmission information is designated on the first line of the execution step list EL, but the parameter and the transmission information are designated on the second line of the execution step list EL, these pieces of information are also transmitted to the entity device 30 together with the processing request.

In the first entity device 30, the communication unit 31 receives the processing request PR1 from the client apparatus 20 and sends it out to the control unit 32. The control unit 32, upon acquisition of the processing request PR1, sends out the processing request to the authentication subprocess P1 execution unit 34.

The authentication subprocess P1 execution unit 34, based on the processing request, executes the authentication subprocess P1 and sends the processing request R1 obtained to the control unit 32 (ST3).

The control unit 32 stores the processing result R1 in the storage unit 33. Then, the control unit 32 sends out the processing request to the execution process information block generating unit 36.

The execution process information block generating unit 36, based on this processing request, acquires the function unit identification information list FL1 from the function identification information list storage unit 35. Then, the execution process information block generating unit 36 generates the execution process information block EPIB1 including the function unit identification information FID1 described in the function unit identification information list FL1, and sends this execution process information block EPIB1 to the control unit 32 (ST4).

The control unit 32 holds the acquired execution process information block EPIB1 in the storage unit 33. Then, the control unit 32 sends out the processing result R1 in the storage unit 33 to the output information block generating unit 37.

The output information block generating unit 37 generates the output information block OB1 including this processing result R1, and sends out the output information block OB1 to the control unit 32 (ST5). In this case, the output information block OB1 may not contain the processing result R1 as it is, and may include the hash value of the processing result R1.

The control unit 32 holds the acquired output information block OB1 in the storage unit 33. Then, the control unit 32 sends out the processing request to the entity device certificate block generating unit 39.

The entity device certificate block generating unit 39, based on this processing request, acquires the entity device certificate EC1 from the entity device certificate storage unit 38. Then, the entity device certificate block generating unit 39 generates the entity device certificate block ECB1 including the acquired entity device certificate EC1, and sends out this entity device certificate block ECB1 to the control unit 32 (ST6). In this case, the entity device certificate block ECB1 need not contain the entity device certificate EC1, and instead may contain the entity certificate specifying information capable of specifying the entity device certificate EC1. In this case, the entity device certificate storage unit 38 is also required to store the entity certificate specifying information capable of specifying the entity device certificate EC1 in place of the entity device certificate EC1.

The control unit 32 holds the acquired entity device certificate block ECB1 in the storage unit 33. Then, the control unit 32 sends out the execution process information block EPIB1, the output information block OB1 and the entity device certificate block ECB1 in the storage unit 33 to the authenticator block generating unit 41.

The authenticator block generating unit 41, upon acquisition of the blocks EPIB1, OB1, ECB1, generates an authenticator for all the blocks EPIB1, OB1, ECB1 using the confidential information stored beforehand in the confidential information storage unit 40. Then, the authenticator block generating unit 41 generates the authenticator block AB1 including the generated authenticator, and sends out the authenticator block AB1 to the control unit 32 (ST7).

The control unit 32 holds the acquired authenticator block AB1 in the storage unit 33. Then, the control unit 32 sends out the execution process information block EPIB2, the output information block OB1, the entity device certificate block ECB1 and the authenticator block AB1 in the storage unit 33 to the authentication context generating unit 42.

The authentication context generating unit 42, upon acquisition of the blocks EPIB1, OB1, ECB1, AB1, generates the authentication context AC1 including the blocks EPIB1, OB1, ECB1, AB1, and sends out the generated authentication context AC1 to the control unit 32 (ST8).

The control unit 32 transmits the authentication context AC1 to the client apparatus 20 through the communication unit 31. Also, the control unit 32 transmits the processing result R1 in the storage unit 33 to the client apparatus 20 through the communication unit 31 (ST9). In this case, the control unit 32 may transmit the processing result R1 to the client apparatus 20 together with the authentication context AC1, or may transmit the processing result R1 separately to the client apparatus 20 before or after transmitting the authentication context AC1.

In the client apparatus 20, the authentication subprocess control unit 22 receives the authentication context AC1 and the processing result R1 from the first entity device 30 through the first entity device communication unit 24. The authentication context AC1 and processing result R1 are stored in the storage unit 23. Then, the authentication subprocess control unit 22, based on the execution step list acquired from the execution step storage unit 21, transmits the processing result PR2 and the parameter PM1 (or the parameter PM2) to the second entity device 50 together with the processing result R1 in the storage unit 23 (ST10). A case using the parameter PM1 will be described below as an example.

In the second entity device 50, the communication unit 51 receives the processing request PR2, the parameter PM1 and the processing result R1 from the client apparatus 20, and sends out the processing request PR2, the parameter PM1 and the processing result R1 to the control unit 52.

Of the processing request PR2, the parameter PM1 and the processing result R1, the control unit 52 holds the parameter PM1 and the processing result R1 in the storage unit 53. Then, the control unit 52 sends out the processing request to the authentication subprocess P2 execution unit 54.

The authentication subprocess P2 execution unit 54, based on the processing request, executes the authentication subprocess P2, and sends out the processing result R2 to the control unit 52 (ST11).

The control unit 52 holds this processing result R2 in the storage unit 53. Then, the control unit 53 sends out the parameter PM1 and the two processing results R1, R2 in the storage unit 53 to the authentication subprocess P3 switching unit 55.

The authentication subprocess P3 switching unit 55, upon acquisition of the parameter PM1 and the processing results R1, R2, accesses the function unit identification information list storage unit 58, and in accordance with the parameter value, selects the authentication subprocess P3-1 execution unit 56 or the authentication subprocess P3-2 execution unit 57 for execution of the authentication subprocess P3, and sends out the processing results R1, R2 to the selected execution unit 56 or 57. In this case, the authentication subprocess P3 switching unit 55 selects the authentication subprocess P3-1 execution unit 56 related to the parameter PM1.

The authentication subprocess P3-1 execution unit 56, by accessing the acquired processing results R1, R2, executes the authentication subprocess P3, and sends out the processing result R3 to the authentication subprocess P3 switching unit 55 (ST12).

The authentication subprocess P3 switching unit 55 sends out the acquired processing result R3 to the control unit 52.

The control unit 52 holds the processing result R3 in the storage unit 53. Then, the control unit 52 sends out the parameter PM1 in the storage unit 53 to the execution process information block generating unit 59.

The execution process information block generating unit 59, based on this parameter PM1, acquires the function unit identification information list FL2 from the function unit identification information list storage unit 58. Then, the execution process information block generating unit 59 selects the function unit identification information indicating the function unit that has executed the authentication subprocess, from the function unit identification information FID2, FID3-1, FID3-2 described in the function unit identification information list FL2. In this case, the execution process information block generating unit 59 selects, from the function unit identification information list FL2, the function unit identification information FID2 with no parameter designated and the function unit identification information FID3-1 with the parameter PM1 designated. Then, the execution process information block generating unit 59 generates the execution process information block EPIB2 including the function unit identification information FID2 and the function unit identification information FID3-1 selected, and sends out this execution process information block EPIB2 to the control unit 52 (ST13).

The control unit 52 holds this execution process information block EPIB2 in the storage unit 53. Then, the control unit 52 sends out the processing result R1 in the storage unit 53 to the input information block generating unit 60. In this case, the processing result R1 is not included as it is in the input information block IB2, but the hash value of the processing result R1 may be included therein.

The input information block generating unit 60 generates the input information block IB2 including the acquired processing result R1 and sends out this input information block IB2 to the control unit 52 (ST14).

The control unit 52 holds this input information block IB2 in the storage unit 53. Then, the control unit 52 sends out the processing result R3 in the storage unit 53 to the output information block generating unit 61.

The output information block generating unit 61 generates the output information block OB2 including the acquired processing result R3, and sends out the output information block OB2 to the control unit 52 (ST15). In this case, the processing result R3 is not included as it is in the output information block OB2, but the hash value of the processing result R3 may be included therein.

The control unit 52 holds the acquired output information block OB2 in the storage unit 53. Then, the control unit sends out the processing request to the entity device certificate block generating unit 63.

The entity device certificate block generating unit 63, based on this processing request, acquires the entity device certificate EC2 from the entity device certificate storage unit 62. Then, the entity device certificate block generating unit 63 generates the entity device certificate block ECB2 including the acquired entity device certificate EC2, and sends out this entity device certificate block ECB2 to the control unit 52 (ST16). In this case, the entity device certificate EC2 need not be included in the entity device certificate block ECB2, and the entity certificate specifying information for specifying the entity device certificate EC2 may be included therein alternatively. In such a case, the entity device certificate storage unit 62 may also store, in place of the entity device certificate EC2, the entity certificate specifying information for specifying the entity device certificate EC2.

The control unit 52 holds the acquired entity device certificate block ECB2 in the storage unit 53. Then, the control unit 52 sends out the execution process information block EPIB2, the input information block IB2, the output information block OB2 and the entity device certificate block ECB2 in the storage unit 53 to the authenticator block generating unit 65.

The authenticator block generating unit 65, upon acquisition of the blocks EPIB2, IB2, OB2, ECB2, generates an authenticator for all of the blocks EPIB2, IB2, OB2, ECB2 using the confidential information stored in advance in the confidential information storage unit 64. Then, the authenticator block AB2 including the generated authenticator is generated and sent out to the control unit 52 (ST17).

The control unit 52 holds the acquired authenticator block AB2 in the storage unit 53. Then, the control unit 52 sends out the execution process information block EPIB2, the input information block IB2, the output information block OB2, the entity device certificate block ECB2 and the authenticator block AB2 in the storage unit 53 to the authentication context generating unit 66.

The authentication context generating unit 66, upon acquisition of the blocks EPIB2, IB2, OB2, ECB2, AB2, generates the authentication context AC2 including all of the acquired blocks EPIB2, IB2, OB2, ECB2, AB2 and sends out the authentication context AC2 to the control unit 52 (ST18).

The control unit 66 transmits the authentication context AC2 to the client apparatus 20 through the communication unit 51. Also, the control unit 52 transmits the processing result R3 in the storage unit 53 through the communication unit 51 to the client apparatus 20 (ST19). In this case, the control unit 52 may transmit the processing result R3 together with the authentication context AC2 or transmit the processing result R3 to the client apparatus 20 before or after transmitting the authentication context AC2.

In the client apparatus 20, the authentication subprocess control unit 22 receives the authentication context AC2 and the processing result R3 from the second entity device 50 through the communication unit 25 of the second entity device 50 (ST19), and holds the received authentication context AC2 and the processing result R3 in the storage unit 23. In this case, the authentication subprocess control unit 22, by referring to the execution step list acquired from the execution step storage unit 21, and upon confirmation that all the authentication subprocesses are executed, transmits the two authentication contexts AC1, AC2 in the storage unit 23 to the authentication apparatus 10 through the communication unit 26 (ST20). Nevertheless, the authentication subprocess control unit 22 may transmit the processing result R3 to the authentication apparatus 10.

In the authentication apparatus 10, the verification control unit 2 receives the two authentication contexts AC1, AC2 through the communication unit 1, and holds them in the storage unit 3. Then, the verification control unit 2 sends out all the authentication contexts AC1, AC2 in the storage unit 3 to the authenticator block verification unit 5.

The authenticator block verification unit 5 verifies the authenticators included in the authentication blocks AB1, AB2 of all the authentication contexts AC1, AC2 thus sent out, based on the confidential information in the confidential information storage unit 4, and sends out the verification result to the verification control unit 2.

The verification control unit 2 confirms the acquired verification result (ST21). In the case where the verification result is "verification failure", the verification control unit 2 decides that the verification has failed and may end the process or request the client apparatus 20 to execute the authentication process again.

Then, the verification control unit 2 extracts all the input information blocks IB2 and the output information blocks OB2, OB2 included in the authentication contexts AC1, AC2 from all the authentication contexts AC1, AC2 in the storage unit 3 and sends out all the input information block IB2 and the output information blocks OB1, OB2 extracted, to the input/output information block verification unit 6.

The input/output information block verification unit 6 that has acquired the input information block IB2 and the output information blocks OB1, OB2 verifies that the processing result R1 included in all the acquired input information block IB2 coincides with any one of the processing results R1, R2 included in the acquired output information blocks OB1, OB2, and sends out the verification result to the verification control unit 2.

The verification control unit 2 confirms the acquired verification result (ST22). In the case where the verification result is "verification failure", the verification control unit 2 may end the process by deciding that the verification has failed or request the client apparatus 20 to execute the authentication process again.

Then, the verification control unit 2 sends out the entity device certificate blocks ECB1, ECB2 included in the authentication contexts AC1, AC2 in the storage unit 3, the execution process information blocks EPIB1, EPIB2 and the authentication policy AP stored in advance in the authentication policy storage unit 7 to the entity device certificate block verification unit 8.

The entity device certificate block verification unit 8, upon acquisition of the blocks ECB1, ECB2, EPIB1, EPIB2 and the authentication policy AP, extracts the entity device certificates EC1, EC2 included in the entity device certificate blocks ECB1, ECB2 and the function unit identification information FID1, FID2, FID3-1 (or FID3-2) included in the execution process information blocks EPIB1, EPIB2. In the case where the entity certificate specifying information for specifying the entity device certificates EC1, EC2 is described in the entity device certificate blocks ECB1, ECB2, the entity device certificates EC1, EC2 corresponding to the entity certificate specifying information are acquired from an external storage unit or a storage unit (not shown) in the authentication apparatus 10 for managing the entity certificate specifying information and the entity device certificates EC1, EC2 in correspondence with each other.

Then, the entity device certificate block verification unit 8 extracts the function information blocks FIB1, FIB2, FIB3-1 having the function unit identification information of the same value as the function unit identification information FID1, FID2, FID3-1 from the entity device certificates EC1, EC2. Then, the entity device certificate block verification unit 8 verifies whether the function information FI1, FI2, FI3-1 included in the extracted function information blocks FIB1, FIB2, FIB3-1 (or FIB3-2) meet the conditions described in the acquired authentication policy AP, and sends out the verification result to the verification control unit 2.

The verification control unit 2 confirms the verification result (ST23). In the case where the verification result is "verification failure", the verification control unit 2 may end the process by deciding that the authentication has failed or request the client apparatus 20 to execute the authentication process again.

Also, the order in which the authenticator block verification unit 5, the input/output information block verification unit 6 and the entity device certificate block verification unit 8 are executed is not specified. Specifically, the verification control unit 2 is required only to confirm that the verification result of the authenticator block verification unit 5, the verification result of the input/output information block verification unit 6 and the verification result of the entity device certificate block verification unit 8 are each "successful verification".

As described above, according to this embodiment, the function unit identification information FID1, FID2, FID3-1 (or FID3-1) unique to the function unit that has executed the authentication subprocess in the entity devices 30, 50 is included in the authentication contexts AP1, AP2. In this way, the function unit that has executed the authentication subprocess in the entity devices 30, 50 can be specified.

Even in the case where a plurality of function units capable of executing the same authentication subprocess exist in the entity devices 30, 50, therefore, the verifier can verify the legitimacy of the authentication subprocess from the authentication context, thereby improving the accuracy of principal confirmation.

(Second Embodiment)

Figure 15:
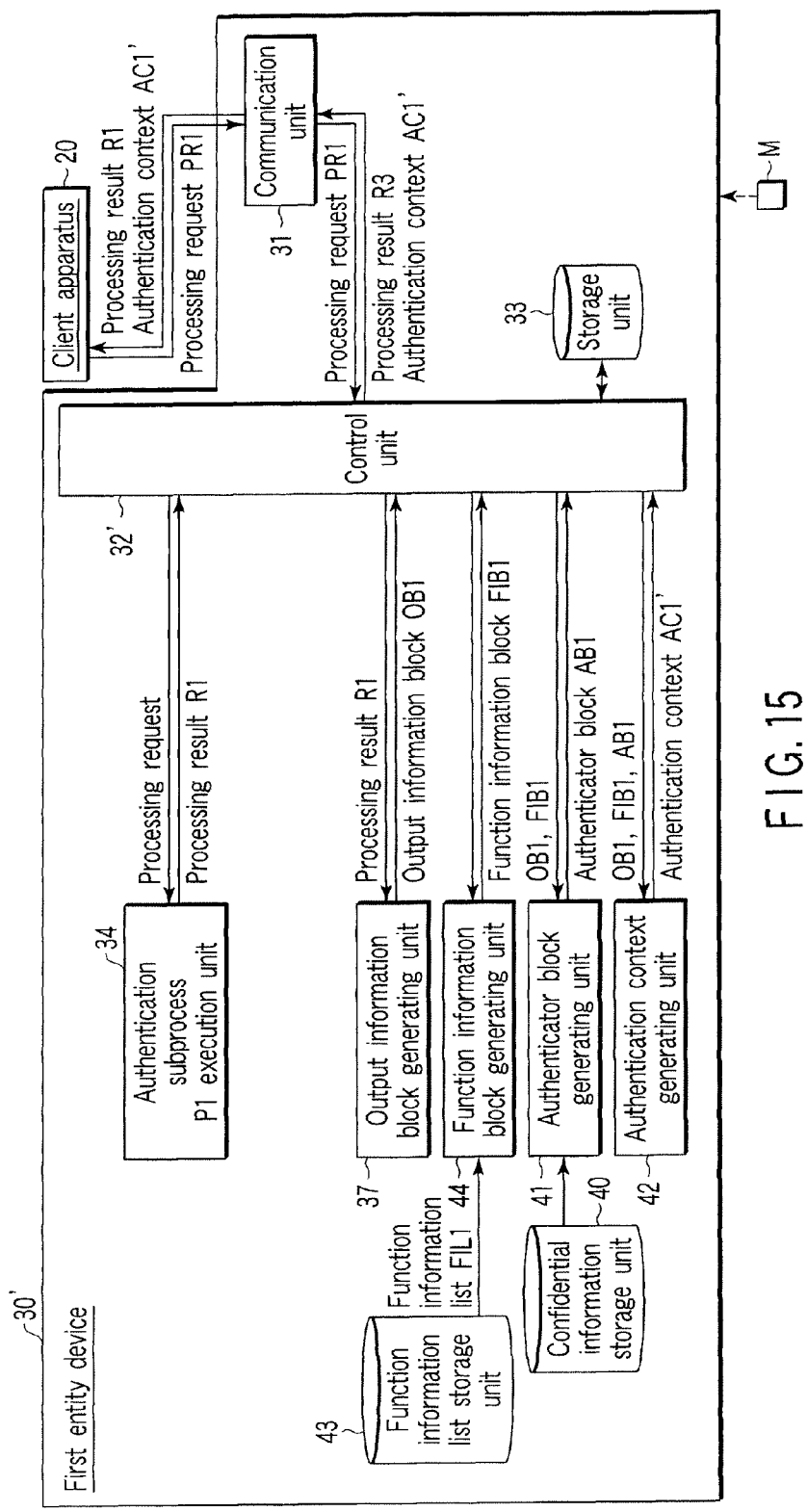
FIG. 15 is a schematic diagram showing the configuration of a first entity device according to the same embodiment.

FIG. 14 is a schematic diagram showing the configuration of an authentication system according to a second embodiment of the invention, FIG. 15 a schematic diagram showing the configuration of a first entity device of the same system, and FIG. 16 a schematic diagram showing the configuration of a second entity device of the same system. In these diagrams, the same component parts as those in FIGS. 1 to 3 are designated by the same reference numerals, respectively, and not described in detail, and only different component parts will be mainly described below. In a similar fashion, the same component parts will not be explained two times in the embodiments described below.

Figure 17:
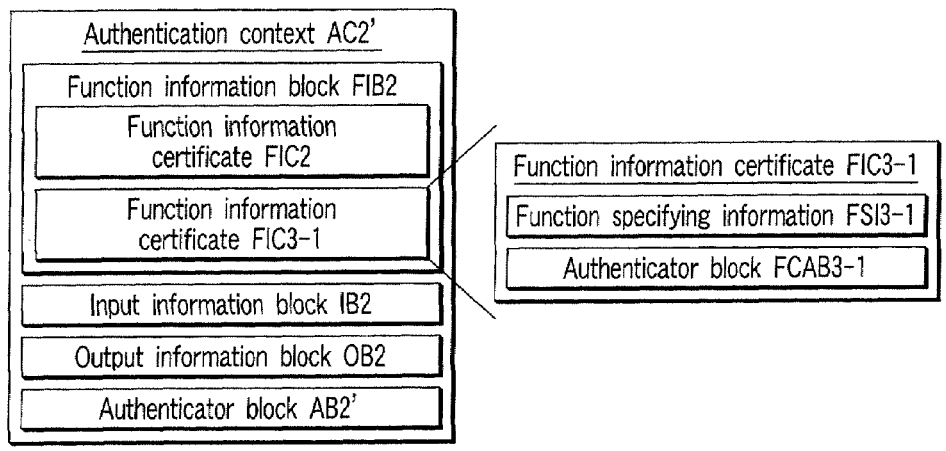
FIG. 17 is a schematic diagram showing function specifying information according to the same embodiment.

Generally, according to the second embodiment which is a modification of the first embodiment, the function specifying information FSI3-1 (FIG. 17) is used in place of the function unit identification information FID3-1 (FIG. 6B) as the information for specifying the function unit that has executed the authentication subprocess.

Specifically, as shown in FIGS. 14, 15, 16, the authentication contexts AC1, AC2 are replaced by authentication contexts AC1', AC2' in this authentication system. This authentication system is configured of first and second entity devices 30', 50', a client apparatus 20 and an authentication apparatus 10'.

The first and second entity devices 30', 50', which are equivalent to the first and second entity devices 30, 50 according to the first embodiment and lack the function unit identification information list storage units 35, 58, the execution process information block generating units 36, 59, the entity device certificate storage units 38, 62 and the entity device certificate block generating units 39, 63, additionally include function information list storage units 43, 67 and function information block generating units 44, 68, and use control units 32', 52' in place of the control units 32, 52.

The client apparatus 20 is identical with the client apparatus 20 according to the first embodiment.

The authentication apparatus 10', which is equivalent to the authentication apparatus 10 according to the first embodiment and lacks the entity device certificate block verification unit 8, additionally includes a function information block verification unit 11, and uses a verification control unit 2' in place of the verification control unit 2.

Only the function units different from those of the first embodiment will be described below.

(Client Apparatus 20)

The client apparatus 20 according to this embodiment is identical with the client apparatus 20 according to the first embodiment except that the authentication contexts AC1, AC2 are replaced by the authentication contexts AC1', AC2'.

Figure 18A:
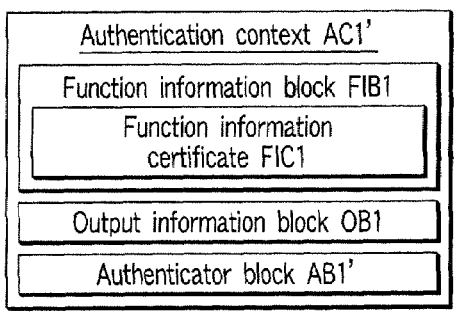
FIGS. 18A and 18B are schematic diagrams showing a format of an authentication context according to the same embodiment.
Figure 18B:
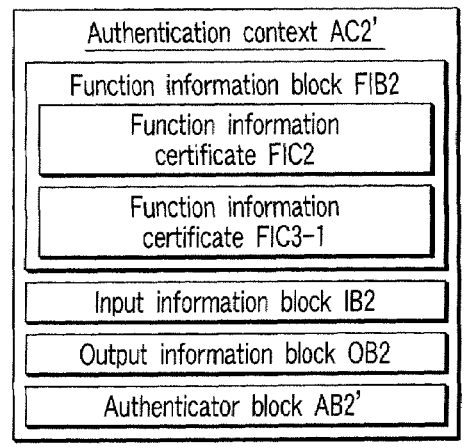

The authentication contexts AC1', AC2', as shown in FIGS. 18A and 18B, are configured of one function information block FIB1, FIB2, an input information block IB2, an output information block OB1, OB2 and one authenticator block AB1', AB2'. Each block will be described in detail later.

(First Entity Device 30')

The first entity device 30' includes a communication unit 31, a control unit 32', a storage unit 33, an authentication subprocess P1 execution unit 34, an output information block generating unit 37, a confidential information storage unit 40, an authenticator block generating unit 41, an authentication context generating unit 42, a function information list storage unit 43 and a function information block generating unit 44.

The communication unit 31 according to this embodiment is similar to the communication unit 31 of the first entity device 30 according to the first embodiment except that the authentication context AC1 is replaced by the authentication context AC1'. The storage unit 33 is also similar to the storage unit 33 of the first entity device 30 according to the first embodiment except for the contents read from or written into the storage unit 33.

The authentication subprocess P1 execution unit 34, the output information block generating unit 37 and the confidential information storage unit 40 are identical with the authentication subprocess P1 execution unit 34, the output information block generating unit 37 and the confidential information storage unit 40, respectively, of the first entity device 30 according to the first embodiment.

The authenticator block generating unit 41 and the authentication context generating unit 42 are identical with the authenticator block generating unit 41 and the authentication context generating unit 42, respectively, of the first entity device 30 according to the first embodiment, except that the execution process information block and the entity device certificate block are removed from the input side and the function information block is added.

The control unit 32' is for controlling the process in the first entity device 30', and has the following functions (f32'-1) to (f32'-11):

(f32'-1): The function of acquiring the processing request PR1 from the communication unit 31.

(f32'-2): The function of sending out the processing request to the authentication subprocess P1 execution unit 34.

(f32'-3): The function of acquiring the processing result R1 of the authentication subprocess P1 from the authentication subprocess P1 execution unit 34.

(f32'-4): The function of sending out the processing result R1 to the output information block generating unit 37.

(f32'-5): The function of acquiring the output information block OB1 from the output information block generating unit 37.

(f32'-6): The function of sending out the processing request to the function information block generating unit 44.

(f32'-7): The function of acquiring the function information block FIB1 from the function information block generating unit 44.

(f32'-8): The function of sending out the output information block OB1 and the function information block FIB1 to the authenticator block generating unit 41.

(f32'-9): The function of acquiring the authenticator block AB1' from the authenticator block generating unit 41.

(f32'-10): The function of sending out the output information block OB1, the function information block FIB1 and the authenticator block AB1' to the authentication context generating unit 42.

(f32'-11): The function of acquiring the authentication context AC1' from the authentication context generating unit 42.

Figure 19:
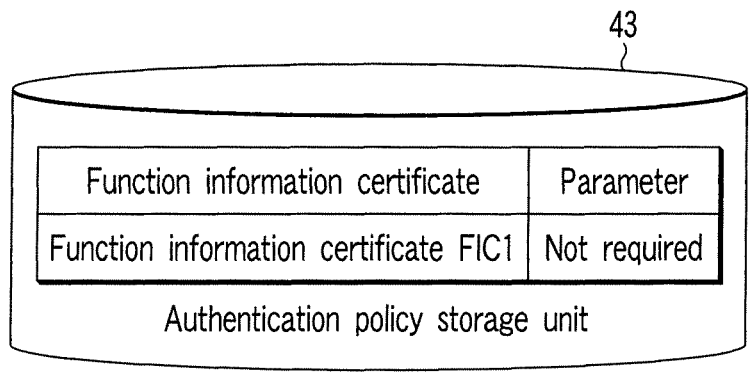
FIG. 19 is a schematic diagram showing the configuration of a function information list storage unit according to the same embodiment.
Figure 20:
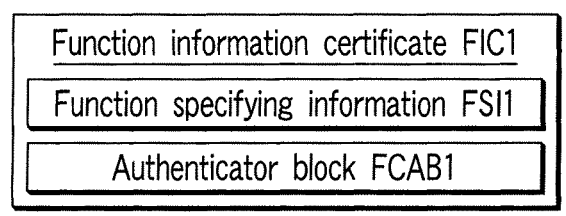
FIG. 20 is a schematic diagram showing the configuration of a function information certificate according to the same embodiment.

The function information list storage unit 43, as shown in FIG. 19, has the function of storing a function information list FILL including at least one set of the function information certificate FIC1 corresponding to the function unit capable of executing the authentication subprocess in the entity device 30' and a parameter designated for executing the particular function unit. In this case, the function information list FIL1 includes the information on all the function units of the entity device 30' capable of executing the authentication subprocesses, and lists up, for example, the function information certificate FIC1 and a parameter as a set. In the case where the entity device 30' can uniquely determine the function unit for executing the authentication subprocess without designating the parameter, the value of the parameter in the function information list may indicate "no designation". Also, the function information certificate FIC1, as shown in FIG. 20, includes the function specifying information FSIL and an authenticator block FCAB1 generated by a reliable third party organization with the aim of detecting an illegal alteration. The function specifying information FSI1 is the information on the function unit capable of executing the authentication subprocess that specifies the function unit, and includes the accuracy or the like accessorial information (the execution device performance information or the execution processing performance information). Any function specifying information may be used such as the process name or the function name or the information equivalent to the process name/function name (such as the input/output information name), as long as the function can be finally specified. Also, any accessorial information (the execution device performance information or the execution process performance information) can be employed, such as the accuracy (security evaluation information), safety, FAR (false acceptance rate), FRR (false rejection rate), sensor resolution or algorithm.

Also, the function information list FILL need not necessarily contain the description of the function information certificate FIC1, and may contain the function certificate specifying information for specifying the function information certificate FIC1. Also, as in the case described above, the "function certificate specifying information for specifying the function information certificate FIC" may also be read as the "function certificate acquisition information for acquiring the function information certificate FIC".

The function information block generating unit 44 has the following functions (f44-1) to (f44-5):

(f44-1): The function of acquiring the parameter from the control unit 32'.

(f44-2): The function of acquiring the function information list FIL1 from the function information list storage unit 43.

(f44-3): The function of extracting only the function information certificate included in the acquired function information list FIL1 that corresponds to the acquired parameter.

(f44-4): The function of generating the function information block FIB1 including the extracted function information certificate.

(f44-5): The function of sending out the generated function information block FIB1 to the control unit 32'. The function certificate specifying information for specifying the function information certificate, if described in the function information list FILL, is also described in the function information block FIB1.

(Second Entity Device 50')

The second entity device 50' is configured of a communication unit 51, a control unit 52', a storage unit 53, an authentication subprocess P2 execution unit 54, an authentication subprocess P3 switching unit 55, an authentication subprocess P3-1 execution unit 56, an authentication subprocess P3-2 execution unit 57, an input information block generating unit 60, an output information block generating unit 61, a confidential information storage unit 64, an authenticator block generating unit 65, an authentication context generating unit 66, a function information list storage unit 67 and a function information block generating unit 68.

The communication unit 51 is the same as the communication unit 51 of the second entity device 50 according to the first embodiment except that the authentication context AC2' is used in place of the authentication context AC2. The storage unit 53 is also identical with the storage unit 53 of the second entity device 50 according to the first embodiment except for the contents read from/written into the storage unit 53.

The authentication subprocess P2 execution unit 54, the authentication subprocess P3 switching unit 55, the authentication subprocess P3-1 execution unit 56, the authentication subprocess P3-2 execution unit 57, the input information block generating unit 60, the output information block generating unit 61 and the confidential information storage unit 64 are identical with the authentication subprocess P2 execution unit 54, the authentication subprocess P3 switching unit 55, the authentication subprocess P3-1 execution unit 56, the authentication subprocess P3-2 execution unit 57, the input information block generating unit 60, the output information block generating unit 61 and the confidential information storage unit 64, respectively, of the second entity device 50 according to the first embodiment.

The authenticator block generating unit 65 and the authentication context generating unit 66 are identical with the authenticator block generating unit 65 and the authentication context generating unit 66, respectively, of the second entity device 50 according to the first embodiment, except that the execution process information block EPIB2 and the entity device certificate block ECB2 are removed from the input side and the function information block FIB2 is added.

The control unit 52' is for controlling the process in the second entity device 50' and has the following functions (f52'-1) to (f52'-15):

(f52'-1): The function of acquiring the processing request PR2, the parameter and the processing result R1 from the communication unit 51.

(f52'-2): The function of sending out the processing request to the authentication subprocess P2 execution unit 54.

(f52'-3): The function of acquiring the processing result R2 of the authentication subprocess P2 from the authentication subprocess P2 execution unit 54.

(f52'-4): The function of sending out the parameter PM1, the processing result R1 and the processing result R2 to the authentication subprocess P3 switching unit 55.

(f52'-5): The function of acquiring, from the authentication subprocess P3 switching unit 55, the processing result R3 of the authentication subprocess executed by the authentication subprocess P3-1 execution unit 56 or the authentication subprocess P3-2 execution unit 57.

(f52'-6): The function of sending out the processing result R1 to the input information block generating unit 60.

(f52'-7): The function of acquiring the input information block IB2 from the input information block generating unit 60.

(f52'-8): The function of sending out the processing result R3 to the output information block generating unit 61.

(f52'-9): The function of acquiring the output information block OB2 from the output information block generating unit 61.

(f52'-10): The function of sending out the parameter to the function information block generating unit 68.

(f52'-11): The function of acquiring the function information block from the function information block generating unit 68.

(f52'-12): The function of sending out the input information block IB2, the output information block OB2 and the function information blocks FIB2, FIB3-1 to the authenticator block generating unit 65.

(f52'-13): The function of acquiring the authenticator block AB2' from the authenticator block generating unit 65.

(f52'-14): The function of sending out the input information block IB2, the output information block OB2, the function information block and the authenticator block AB2' to the authentication context generating unit 66.

(f52'-15): The function of acquiring the authentication context AC2' from the authentication context generating unit 66.

Figure 21:
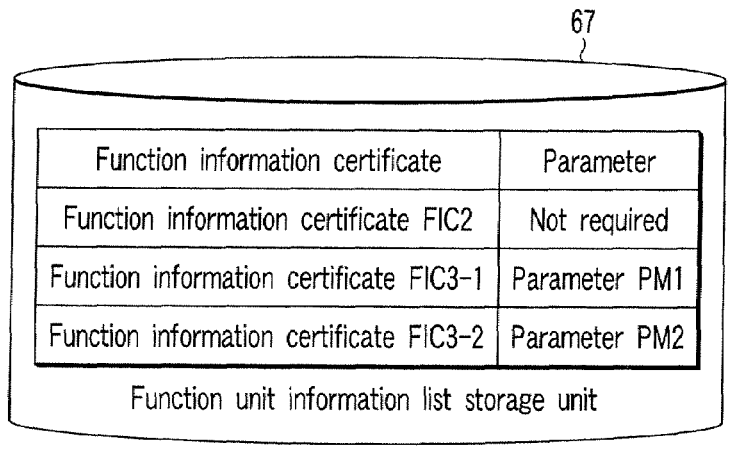
FIG. 21 is a schematic diagram showing the configuration of a function information list storage unit according to the same embodiment.

The function information list storage unit 67, as shown in FIG. 21, has the function of storing the function information list FIL2 including at least one set of the function information certificate corresponding to the function unit capable of executing the authentication subprocess in the entity device 50' and the parameter designated for executing the particular function unit.

Figure 22A:
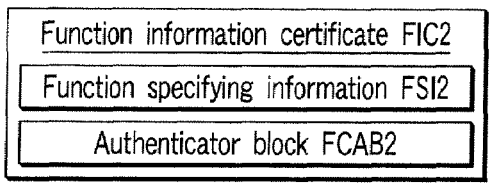
FIGS. 22A, 22B and 22C are schematic diagrams showing the configuration of a function information certificate according to the same embodiment.
Figure 22B:
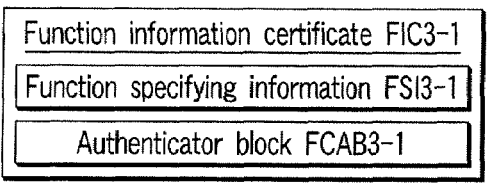
Figure 22C:
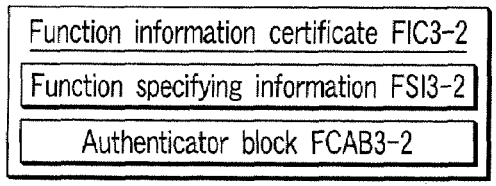

The function information list FIL2 includes the information concerning all the function units included in the entity device 50' capable of executing the authentication subprocess, including a set of the function information certificate FIC2, FIC3-1, FIC3-2 and a parameter in a list form. In the case where the entity device 50' can uniquely determine the function unit for executing the authentication subprocess without parameter designation, the parameter in the function information list may be set to a value indicating "no designation". Also, the function information certificates FIC2, FIC3-1, FIC3-2, as shown in FIGS. 22A, 22B and 22C, include the function specifying information FSI2, FSI3-1, FSI3-2 and the authenticator blocks FCAB2, FCAB3-1, FCAB3-2 generated by a reliable third-party organization for detection of an illegal alteration. The function specifying information FSI2, FSI3-1, FSI3-2 is the information for specifying the function unit that is included in the information on the function unit capable of executing the authentication subprocess and includes the accessorial information (the execution device performance information or the execution process performance information) such as accuracy. The example of the function specifying information and the accessorial information is similar to the case of the aforementioned function specifying information FSI1.

Also, the function information list FIL2 need not necessarily contain the description of the function information certificates FIC2, FIC3-1, FIC3-2, and may contain the description of the function certificate specifying information for specifying the function information certificates FIC2, FIC3-1, FIC3-2.

The function information block generating unit 68 has the following functions (f68-1) to (f68-5):

(f68-1): The function of acquiring the parameter from the control unit 52'.

(f68-2): The function of acquiring the function information list FIL2 from the function information list storage unit 67.

(f68-3): The function of extracting only the function information certificate included in the acquired function information list FIL2 that corresponds to the acquired parameter.

(f68-4): The function of generating the function information block FIB2 including the extracted function information certificate.

(f68-5): The function of sending out the function information block FIB2 generated to the control unit 52'. In the case where the function information list FIL2 contains the description of the function certificate specifying information for specifying the function information certificate, the particular function certificate specifying information is described in the function information block FIB2.

(Authentication apparatus 10')

The authentication apparatus 10' is configured of a communication unit 1, a verification control unit 2', a storage unit 3, a confidential information storage unit 4, an authenticator block verification unit 5, an input/output information block verification unit 6, an authentication policy storage unit 7, a confidential information storage unit 9 and a function information block verification unit 11.

The communication unit 1 is identical with the communication unit 1 of the authentication apparatus 10 according to the first embodiment, except that the authentication contexts AC1, AC2 are replaced by the authentication contexts AC1', AC2'. Also, the storage unit 3 is the same as the storage unit 3 of the authentication apparatus 10 according to the first embodiment except for the contents read from/written into the storage unit 3.

The authenticator block verification unit 5 is identical with the authenticator block verification unit 5 of the authentication apparatus 10 according to the first embodiment except that the authentication contexts AC1, AC2 and the authenticator blocks AB1, AB2 are replaced by the authentication contexts AC1', AC2' and the authenticator blocks AB1', AB2', respectively.

The confidential information storage unit 4, the input/output information block verification unit 6 and the authentication policy storage unit 7 are identical with the confidential information storage unit 4, the input/output information block verification unit 6 and the authentication policy storage unit 7, respectively, of the authentication apparatus 10 according to the first embodiment.

The verification control unit 2' has the following functions (f2'-1) to (f2'-8):

(f2'-1): The function of acquiring the authentication contexts AC1', AC2' from the communication unit 1.

(f2'-2): The function of sending out the acquired authentication contexts AC1', AC2' to the authenticator block verification unit 5.

(f2'-3): The function of acquiring the result of verifying the authenticator included in the authentication contexts AC1', AC2' from the authentication block verification unit 5.

(f2'-4): The function of extracting all of the input information block IB2 and the output information blocks OB1, OB2 included in the authentication contexts AC1', AC2' and sending them out to the input/output information block verification unit 6.

(f2'-5): The function of acquiring the result of verifying the input information block IB2 and the output information blocks OB1, OB2 from the input/output information block verification unit 6.

(f2'-6): The function of acquiring the authentication policy AP from the authentication policy storage unit 7.

(f2'-7): The function of extracting the function information block included in the authentication contexts AC1', AC2' and sending it out together with the authentication policy AP to the function information block verification unit 11.

(f2'-8): The function of acquiring the result of verifying the legitimacy of the executed authentication process from the function information block verification unit 11.

The confidential information storage unit 9 is adapted to be read from/written into by the function information block verification unit 11, and holds the confidential information for verifying the authenticator blocks FCAB1, FCAB2, FCAB3-1, FCAB3-2. In the case where the authenticator in the authenticator blocks FCAB1, FCAB2, FCAB3-1, FCAB3-2 is a digital signature made by a function information certificate issuer, the public key of the function information certificate issuer for the public key encryption system is held as confidential information, while in the case where the authenticator is a message authentication code, on the other hand, the common key shared with the function information certificate issuer is held.

The function information block verification unit 11 has the following functions (f11-1) to (f11-5):

(f11-1): The function of acquiring the function information block and the authentication policy AP from the verification control unit 2'.

(f11-2): The function of extracting the function information certificate, if described in the acquired function information block, from the function information block, and the function of acquiring the function information certificate corresponding to the function certificate specifying information from the certificate storage unit (such as the external storage unit not shown, or the storage unit not shown in the authentication apparatus 10') for managing the function certificate specifying information and the function information certificate in correspondence with each other in the case where the function certificate specifying information for specifying the function information certificate is described in the acquired function information block.

(f11-3): The function of verifying the authenticator of each authenticator block included in the extracted function information certificate based on the confidential information in the confidential information storage unit 9.

(f11-4): The function of verifying whether the function specifying information included in the extracted function information certificate meets the conditions described in the authentication policy AP.

(f11-5): The function of sending out the verification result to the verification control unit 2.

Specifically, in the function information block verification unit 11, for example, the quality (90 points) of the capturing sensor included in the function specifying information FSI1, the quality (95 points) of the biometric template included in the function specifying information FSI2 and the matching accuracy (99%) included in the function specifying information FSI3-1 (or the function specifying information FSI3-2) are compared with the criterion value of each item included in the authentication policy AP. In the case where the conditions of the authentication policy AP are met, the verification is decided as a success, while in the case where the conditions of the authentication policy AP are not met, the verification is decided as a failure. Also, the function certificate specifying information, like the entity certificate specifying information described above, is usable appropriately with "URI (uniform resource identifier)" for an external storage device, and "file name" or "identification information (ID)" for the storage device in the authentication apparatus 10'.

Next, the operation of the authentication system configured as described above will be explained with reference to FIG. 23.

(General Operation)

The process of steps ST1 to ST5 is the same as the corresponding process of the first embodiment except that the control unit 32' is used in place of the control unit 32 and step ST4 is not executed in the first entity device 30'.

After step ST5, the control unit 32' that has acquired the output information block OB1 holds the acquired output information block OB1 in the storage unit 33. Then, the control unit 32' sends out the processing request to the function information block generating unit 44.

The function information block generating unit 44 acquires the function information list FIL1 from the function information list storage unit 43. Then, the function information block generating unit 44 extracts the function information certificate FIC1 from the acquired function information list FILL. In this case, the function information block generating unit 44 has not acquired the parameter, and therefore, the item of which the parameter is not designated in the function information list FIL1, i.e., the function information certificate FIC1, is selected. The function information block generating unit 44 generates the function information block FIB1 including the extracted function information certificate FIC1 and sends out the generated function information block FIB1 to the control unit 32' (ST6'). In this case, not the function information certificate FIC1 but the function certificate specifying information capable of specifying the function information certificate FIC1 may be included in the function information block FIB1.

In such a case, the function information list storage unit 43 is also required to store the function certificate specifying information capable of specifying the function information certificate FIC1 in place of the function information certificate FIC1.

The control unit 32' holds the acquired function information block FIB1 in the storage unit 33.

The operation of steps ST7 to ST15 is the same as the operation of steps ST7 to ST15 according to the first embodiment except that the execution process information block EPIB1 is not handled, that the function information block FIB1 is used in place of the entity device certificate block ECB1, that the authenticator block AB1 is replaced by the authenticator block AB1', that the authentication context AC1 is replaced by the authentication context AC1', that the control unit 52 of the second entity device 50' is replaced by the control unit 52' and that step ST13 is not executed.

In the second entity device 50', the control unit 52' that has acquired the output information block OB2 holds the output information block OB2 in the storage unit 53. Then, the control unit 52' sends out the parameter PM1 to the function information block generating unit 68.

The function information block generating unit 68, based on the parameter PM1, acquires the function information list FIL2 from the function information list storage unit. Then, the function information block generating unit 68 extracts the function information certificate FIC2 and the function information certificate FIC3-1 from the function information list FIL2. In this case, the function information block generating unit 68 selects the item of which the parameter PM1 is designated in the function information list FIL2, i.e. the function information certificate FIC3-1. Also, the function information block generating unit 68 selects the item of which the parameter is not designated in the function information list FIL2, i.e., the function information certificate FIC2. The function information block generating unit 68 generates the function information block FIB2 including the extracted function information certificate FIC2 and the function information certificate FIC3-1 and sends out the function information block FIB2 to the control unit 52' (ST16').

The operation of steps ST17 to ST22 is the same as the operation of steps ST17 to ST22 according to the first embodiment except that the execution process information block EPIB2 is not handled, that the function information block FIB2 is used in place of the entity device certificate block ECB2, that the authenticator blocks AB1, AB2 are replaced by the authenticator blocks AB1', AB2', that the authentication contexts AC1, AC2 are replaced by the authentication context AC1' and that the verification control unit 2 in the authentication apparatus 10 is replaced by the verification control unit 2'.

In the authentication apparatus 10', the verification control unit 2' that has confirmed the verification result acquired from the input/output information block verification unit 6 sends out the function information blocks FIB1, FIB2, FIB3-1 included in the authentication contexts AC1', AC2' and the authentication policy AP stored in advance in the authentication policy storage unit 7 to the function information block verification unit 11 from all the authentication contexts AC1', AC2' held in the storage unit 3.

The function information block verification unit 11 extracts all the function information certificates FIC1, FIC2, FIC3-1 included in the function information blocks FIB1, FIB2, FIB3-1 upon acquisition of the function information blocks FIB1, FIB2, FIB3-1 and the authentication policy AP. In the case where the function certificate specifying information for specifying the function information certificate FIC1, FIC2, FIC3-1 is described in the acquired function information blocks FIB1, FIB2, FIB3-1, the function information certificates FIC1, FIC2, FIC3-1 corresponding to the particular function certificate specifying information are acquired from a certificate storage device (not shown) for managing the function certificate specifying information and the function information certificates FIC1, FIC2, FIC3-1 in correspondence with each other. Then, the function information block verification unit 11 verifies all the authenticator blocks included in the extracted function information certificates FIC1, FIC2, FIC3-1 based on the confidential information stored in the confidential information storage unit 9. After that, the function information block verification unit 11 verifies whether the function specifying information FSI1, FSI2, FSI3-1 included in the extracted function information certificates FIC1, FIC2, FIC3-1 meets the conditions described in the acquired authentication policy AP, and sends out the verification result to the verification control unit 2'.

The verification control unit 2' confirms the acquired verification result (ST23'). In the case where the verification result is a "verification failure", the verification control unit 2' may end the process by deciding the "authentication as a failure" or may request the client apparatus 20' to execute the authentication process again.

The order in which the authenticator block verification unit 5, the input/output information block verification unit 6 and the function information block verification unit 11 are executed is not defined. Specifically, the verification control unit 2' is simply required to confirm a "successful verification" of the verification result in the authenticator block verification unit 5, the verification result in the input/output information block verification unit 6 and the verification result in the function information block verification unit 11.

As described above, according to this embodiment, the function unit that has executed the authentication subprocess in the entity devices 30, 50 can be specified by including, in the authentication context, the function information certificate corresponding to the function unit that has executed the authentication subprocess in the entity devices 30', 50'.

The verifier, therefore, can verify the legitimacy of the authentication subprocess from the authentication context and thereby improve the accuracy of the principal confirmation even in the case where the entity device 30, 50 has a plurality of function units capable of executing the same authentication subprocess.

(Third Embodiment)

FIG. 24 is a schematic diagram showing the configuration of an authentication system according to a third embodiment of the invention. FIG. 25 is a schematic diagram showing the configuration of a first entity device of the same system, and FIG. 26 a schematic diagram showing the configuration of a second entity device of the same system.

Specifically, the third embodiment is a modification of the first embodiment, and generally speaking, the information for specifying the function unit that has executed the authentication subprocess is used as an input/output identification information block IOB3-1 (FIG. 27B) in place of the function unit identification information FID3-1 (FIG. 6B).

Figure 26:
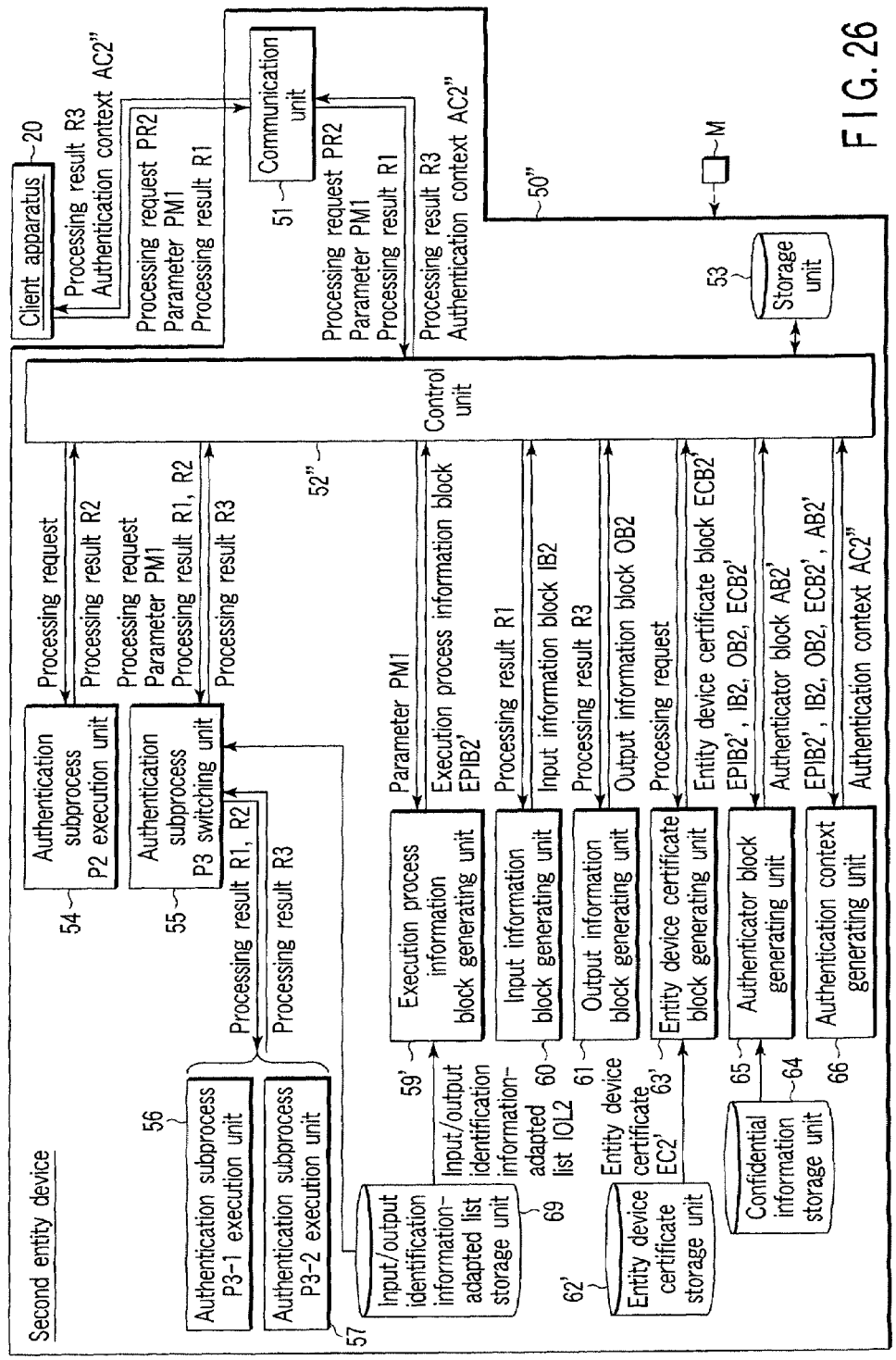
FIG. 26 is a schematic diagram showing the configuration of a second entity device according to the same embodiment.

More specifically, as shown in FIGS. 24, 25, 26, this authentication system handles authentication contexts AC1", AC2" in place of the authentication contexts AC1, AC2. This authentication system is configured of first and second entity devices 30", 50", a client apparatus 20 and an authentication apparatus 10".

The first and second entity devices 30", 50" are equivalent to the first and second entity devices 30, 50, respectively, according to the first embodiment, except that the function unit identification information list storage units 35, 58 are absent, that the input/output identification information-adapted list storage units 45, 69 are added, and that the control units 32, 52, the execution process information block generating units 37, 59, the entity device certificate storage units 38, 62 and the entity device certificate block generating units 39, 63 are replaced by control units 32", 52", execution process information block generating units 37', 59', entity device certificate storage units 38', 62' and entity device certificate block generating units 39', 63', respectively.

The client apparatus 20 is identical with the client apparatus 20 according to the first embodiment.

The authentication apparatus 10" is equivalent to the authentication apparatus 10 according to the first embodiment, except that the verification control unit 2 and the entity device certificate block verification unit 8 are replaced by a verification control unit 2" and an entity device certificate block verification unit 8', respectively.

Only the function units different from those of the first embodiment will be described below.

(Client Apparatus 20)

The client apparatus 20 is identical with the client apparatus 20 according to the first embodiment except that the authentication contexts AC1, AC2 are replaced by the authentication contexts AC1", AC2", respectively.

Figure 27A:
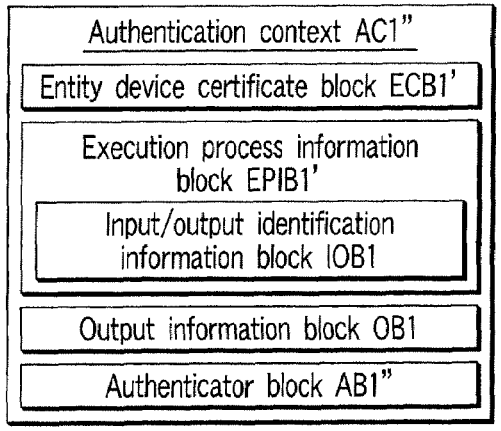
FIGS. 27A and 27B are schematic diagrams showing a format of an authentication context according to the same embodiment.
Figure 27B:
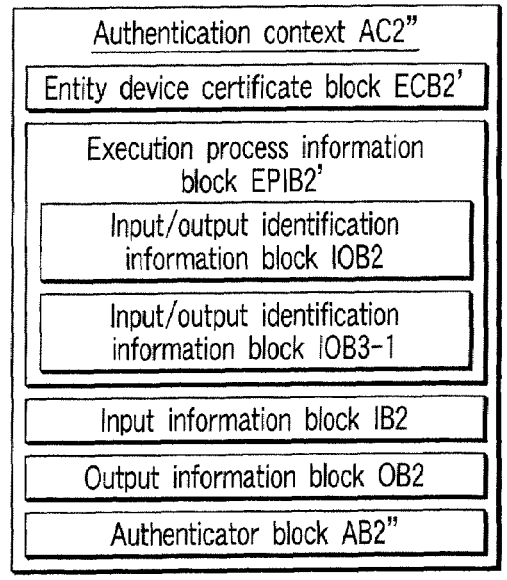

In this case, the authentication contexts AC1", AC2", as shown in FIGS. 27A, 27B, are configured of entity device certificate blocks ECB1', ECB2', execution process information blocks EPIB1', EPIB2', an input information block IB2, output information blocks OB1, OB2 and authenticator blocks AB1", AB2". Each block will be described in detail later.

(First Entity Device 30")

The first entity device 30" includes a communication unit 31, a control unit 32", a storage unit 33, an authentication subprocess P1 execution unit 34, an execution process information block generating unit 36', an output information block generating unit 37, an entity device certificate storage unit 38', an entity device certificate block generating unit 39', a confidential information storage unit 40, an authenticator block generating unit 41, an authentication context generating unit 42 and an input/output identification information-adapted list storage unit 45.

The communication unit 31 is the same as the communication unit 31 of the first entity device 30 according to the first embodiment except that the authentication context AC1 is replaced by the authentication context AC1". The storage unit 33 is also the same as the storage unit 33 of the first entity device 30 according to the first embodiment except that the contents read from/written into the storage unit 33 are different.

The authentication subprocess P1 execution unit 34, the output information block generating unit 37 and the confidential information storage unit 40 are identical with the authentication subprocess P1 execution unit 34, the output information block generating unit 37 and the confidential information storage unit 40, respectively, of the first entity device 30 according to the first embodiment.

The authenticator block generating unit 41 and the authentication context generating unit 42 are identical with the authenticator block generating unit 41 and the authentication context generating unit 42, respectively, of the first entity device 30 according to the first embodiment, except that the execution process information block EPIB1 and the entity device certificate block ECB1 are replaced by an execution process information block EPIB1' and an entity device certificate block ECB1', respectively.

The control unit 32" is for controlling the process of the first entity device 30" and has the following functions (f32"-1) to (f32"-11):

(f32"-1): The function of acquiring the processing request PR1 from the communication unit 31.

(f32"-2): The function of sending out the processing request to the authentication subprocess P1 execution unit 34.

(f32"-3): The function of acquiring the processing result R1 of the authentication subprocess P1 from the authentication subprocess P1 execution unit 34.

(f32"-4): The function of acquiring the execution process information block EPIB1' from the execution process information block generating unit 36'.

(f32"-5): The function of sending out the processing result R1 to the output information block generating unit 37.

(f32"-6): The function of acquiring the output information block OB1 from the output information block generating unit 37.

(f32"-7): The function of acquiring the entity device certificate block ECB1' from the entity device certificate block generating unit 39'.

(f32"-8): The function of sending out the processing request to the execution process information block generating unit 36'.

(f32"-9): The function of sending out the output information block OB1, the execution process information block EPIB1' and the entity device certificate block ECB1' to the authenticator block generating unit 41, and the function of acquiring the authenticator block AB1" from the authenticator block generating unit 41.

(f32"-10): The function of sending out the output information block OB1, the execution process information block EPIB1', the entity device certificate block ECB1' and the authenticator block AB1" to the authentication context generating unit 42.

(f32"-11): The function of acquiring the authentication context AC1" from the authentication context generating unit 42.

Figure 28:
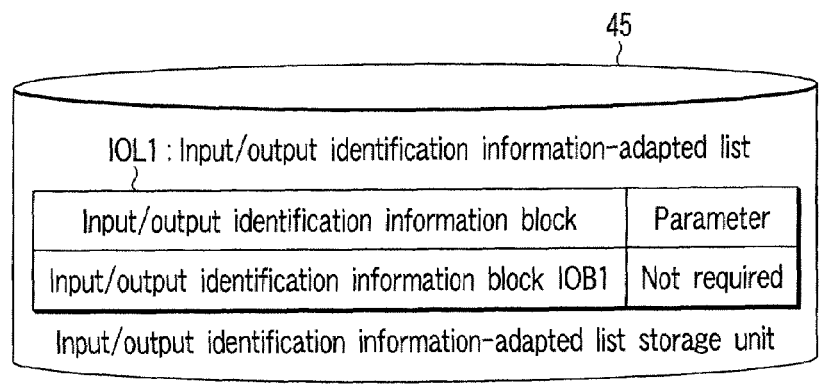
FIG. 28 is a schematic diagram showing the configuration of an input/output identification information-adapted list storage unit according to the same embodiment.

The input/output identification information-adapted list storage unit 45, as shown in FIG. 28, has the function of storing an input/output identification information-adapted list IOL1 including, in at least one set, the input/output identification information block IOB1 constituting the information for identifying the function unit capable of executing the authentication subprocess in the entity device 30" and the parameter designated for executing the particular function unit. In this case, the input/output identification information-adapted list includes the information on all the function units of the entity device 30" capable of executing the authentication subprocess, which information is described in the form of a list, for example, including the input/output identification information block and parameter sets. In the case where the entity device can uniquely determine the function unit for executing the authentication subprocess without designating the parameter, the value of the parameter in the input/output identification information-adapted list may indicate "no designation".

The input/output identification information block IOB1, as shown in FIG. 29, is the information to identify each function unit of the entity device 30" capable of executing the authentication subprocess, and is configured of at least one input identification information block indicating the data input to each function unit and at least one output identification information block indicating the data output from each function unit.

The input identification information block includes the identification information of all the data likely to be input to each function unit, but is not described in the case of the entity device 30' in the absence of the data input to the function unit capable of executing the authentication subprocess.

The output identification information block OIB1, on the other hand, includes the identification information of all the data likely to be output from each function unit. Specifically, in the case where the data output from the function unit is not uniquely determined (in the case where such data is determined by designating the parameter), the identification information of all the data likely to be output from the function unit is listed. In the case where the function unit outputs plural data, the identification information of the plural data is not included in one output identification information block but in different output identification information blocks.

The execution process information block generating unit 36 has the following functions (f36'-1) to (f36'-5):

(f36'-1): The function of acquiring the parameter from the control unit 32".

(f36'-2): The function of acquiring the input/output identification information-adapted list from the input/output identification information-adapted list storage unit 45.

(f36'-3): The function of extracting only the input/output identification information block included in the acquired input/output identification information-adapted list that corresponds to the acquired parameter.

(f36'-4): The function of generating the execution process information block EPIB1' including the extracted input/output identification information block.

(f36'-5): The function of sending out the generated execution process information block EPIB1' to the control unit 32".

The entity device certificate storage unit 38' has the function of storing the entity device certificate EC1' of the first entity device 30". In this case, the entity device certificate storage unit 38', as in the aforementioned case, may store the entity certificate specifying information for specifying the entity device certificate EC1' in place of the entity device certificate EC1'. Incidentally, in the entity device certificates EC1', EC2', as shown in FIG. 30, the function unit identification information FID1 included in the function information block FIB1 of the entity device certificate EC1 according to the first embodiment is replaced by the input/output identification information block IOB1.

The entity device certificate block generating unit 39' has the following functions (f39'-1) to (f39'-5):

(f39'-1): The function of acquiring the entity device certificate EC1' from the entity device certificate storage unit 38'.

(f39'-2): The function of generating the entity device certificate block ECB1' including the acquired entity device certificate EC1'.

(f39'-3): The function of sending out the generated entity device certificate block ECB1' to the control unit 32". In the case where the entity device certificate storage unit 38' stores the entity device certificate specifying information for specifying the entity device certificate EC1' instead of the entity device certificate EC1', the entity certificate specifying information is included in the entity device certificate block ECB1'.

(Second Entity Device 50")

The second entity device 50" includes a communication unit 51, a control unit 52", a storage unit 53, an authentication subprocess P2 execution unit 54, an authentication subprocess P3 switching unit 55, an authentication subprocess P3-1 execution unit 56, an authentication subprocess P3-2 execution unit 57, an execution process information block generating unit 59', an input information block generating unit 60, an output information block generating unit 61, an entity device certificate storage unit 62', an entity device certificate block generating unit 63', a confidential information storage unit 64, an authenticator block generating unit 65, an authentication context generating unit 66 and an input/output identification information-adapted list storage unit 69.

The communication unit 51 is the same as the communication unit 51 of the second entity device 50 according to the first embodiment except that the authentication context AC2 is replaced by the authentication context AC2". The storage unit 53 is the same as the storage unit 53 of the second entity device 50 according to the first embodiment except that the contents read from/written into the storage unit 53 are different.

The authentication subprocess P2 execution unit 54, the authentication subprocess P3 switching unit 55, the authentication subprocess P3-1 execution unit 56, the authentication subprocess P3-2 execution unit 57, the input information block generating unit 60, the output information block generating unit 61 and the confidential information storage unit 64 are identical with the authentication subprocess P2 execution unit 54, the authentication subprocess P3 switching unit 55, the authentication subprocess P3-1 execution unit 56, the authentication subprocess P3-2 execution unit 57, the input information block generating unit 60, the output information block generating unit 61 and the confidential information storage unit 64, respectively, of the second entity device 50 according to the first embodiment. Nevertheless, the authentication subprocess P3 switching unit 55 is different in that the input/output identification information-adapted list storage unit 69 is accessed at the time of switching the authentication subprocess P3-1 execution unit 56 and the authentication subprocess P3-2 execution unit 57 in accordance with the value of the parameter.

The authenticator block generating unit 65 and the authentication context generating unit 66 are identical with the authenticator block generating unit 65 and the authentication context generating unit 66, respectively, of the second entity device 50 according to the first embodiment except that the execution process information block EPIB2 and the entity device certificate block ECB2 are replaced by the execution process information block EPIB2' and the entity device certificate block ECB2', respectively.

The control unit 52" is for controlling the process in the second entity device 50" and has the following functions (f52"-1) to (f52"-16):

(f52"-1): The function of acquiring the processing request PR2, the parameter PM1 and the processing request R1 from the communication unit.

(f52"-2): The function of sending out the processing request to the authentication subprocess P2 execution unit 54.

(f52"-3): The function of acquiring the processing result R2 of the authentication subprocess P2 from the authentication subprocess P2 execution unit 54.

(f52"-4): The function of sending out the parameter PM1, the processing result R1 and the processing result R2 to the authentication subprocess P3 switching unit 55.

(f52"-5): The function of acquiring, from the authentication subprocess P3 switching unit 55, the processing result R3 of the authentication subprocess executed by the authentication subprocess P3-1 execution unit 56 or the authentication subprocess P3-2 execution unit 57.

(f52"-6): The function of sending out the parameter PM1 to the execution process information block generating unit 59'.

(f52"-7): The function of acquiring the execution process information block EPIB2' from the execution process information block generating unit 59'.

(f52"-8): The function of sending out the processing result R1 to the input information block generating unit 60.

(f52"-9): The function of acquiring the input information block IB2 from the input information block generating unit 60.

(f52"-10): The function of sending out the processing result R3 to the output information block generating unit 61.

(f52"-11): The function of acquiring the output information block OB2 from the output information block generating unit 61.

(f52"-12): The function of acquiring the entity device certificate block ECB2' from the entity device certificate block generating unit 63.

(f52"-13): The function of sending out the execution process information block EPIB2', the input information block IB2, the output information block OB2 and the entity device certificate block ECB2' to the authenticator block generating unit 65.

(f52"-14): The function of acquiring the authenticator block AB2" from the authenticator block generating unit 65.

(f52"-15): The function of sending out the execution process information block EPIB2', the input information block IB2, the output information block OB2, the entity device certificate block ECB2' and the authenticator block AB2" to the authentication context generating unit 66.

(f52"-16): The function of acquiring the authentication context AC2" from the authentication context generating unit 66.

As shown in FIG. 31, the input/output identification information-adapted list storage unit 69, like the input/output identification information-adapted list of the first entity device 30", has the function of storing the input/output identification information-adapted list.

The input/output identification information-adapted list includes the information on all the function units of the entity device 50" capable of executing the authentication subprocess, for example, in the form of a list of sets each including the input/output identification information block and the corresponding parameter. In the case where the entity device can uniquely determine the function unit for executing the authentication subprocess without parameter designation, the value of the parameter in the input/output identification information-adapted list may indicate "no designation".

Figure 32A:
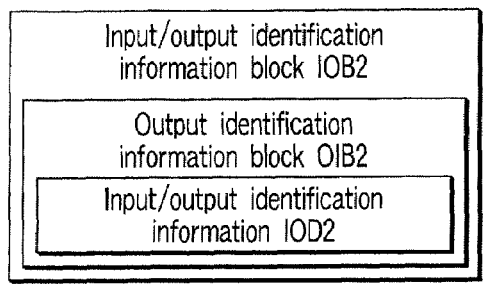
FIGS. 32A, 32B and 32C are schematic diagrams showing the configuration of an input/output identification information block according to the same embodiment.
Figure 32B:
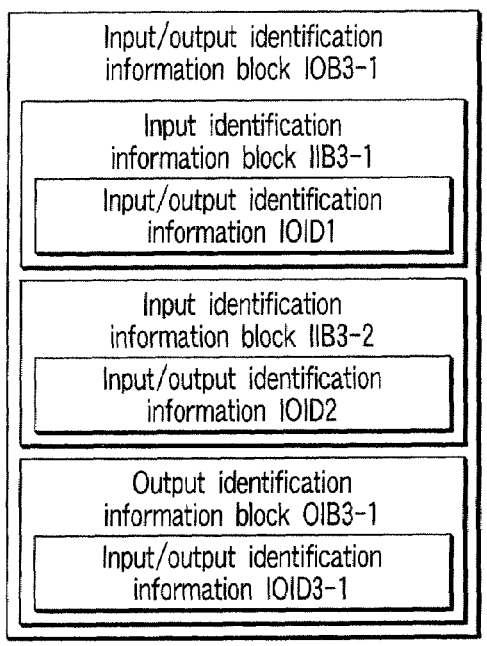
Figure 32C:
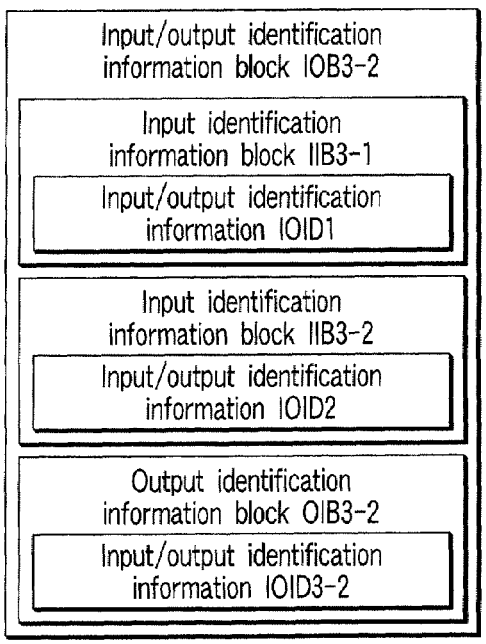

The input/output identification information blocks IOB2, IOB3-1, IOB3-2, as shown in FIGS. 32A, 32B and 32C, are the information for identifying each function unit of the entity device 50" capable of executing the authentication subprocess, and are configured of at least one input identification information block indicating the data input to each function unit and at least one output identification information block indicating the data output by each function unit.

The input identification information blocks IIB3-1, IIB3-2 include the identification information of all the data likely to be input to each function unit. Specifically, in the case where the data input to the function unit is not determined uniquely (in the case where it is determined by parameter designation), the identification information of all the data likely to be input to the function unit is listed. In the case where plural data are input to the function unit, the identification information of the plural data is not included in one input identification information block but in different input identification information blocks.

The output identification information blocks OIB2, OIB3-1, OIB3-2 include the identification information of all the data likely to be output by each function unit. Specifically, in the case where the data output from the function unit is not determined uniquely (in the case where it is determined by parameter designation), the identification information of all the data likely to be output from the function unit is listed. In the case where plural data are output from the function unit, the identification information of the plural data is not included in one output identification information block but in different output identification information blocks.

Figure 33:
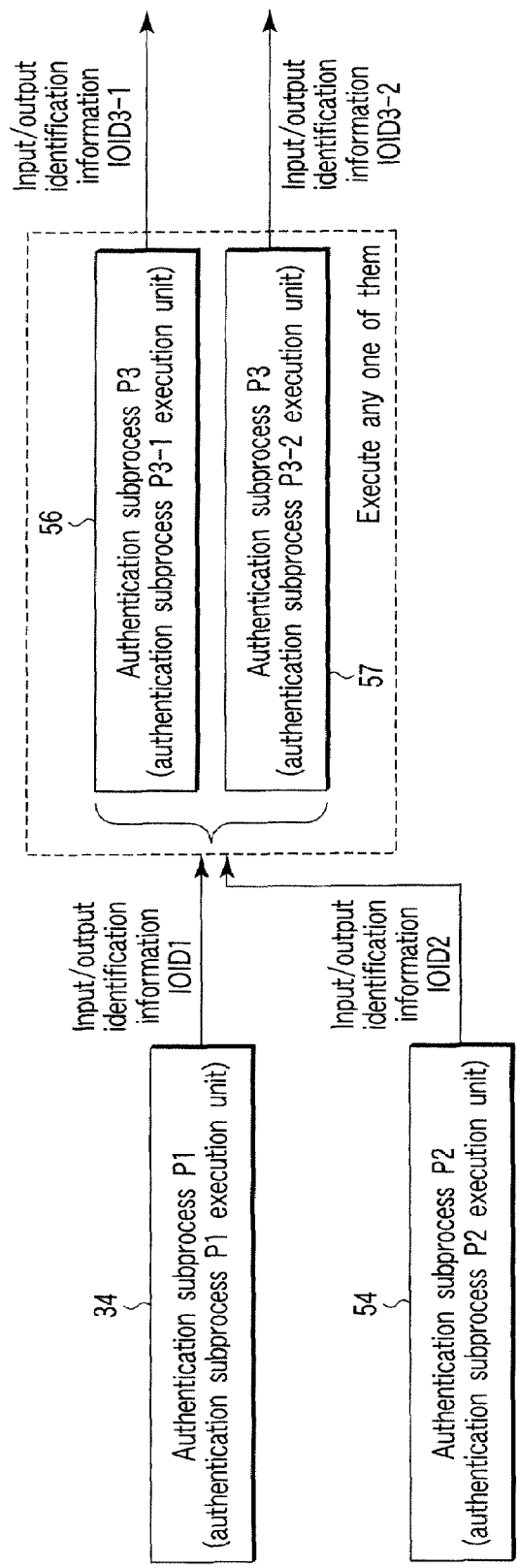
FIG. 33 is a schematic diagram for explaining the relation between the authentication subprocess and the input/output identification information according to the same embodiment.

More specifically, as shown in FIG. 33, for example, consider a case in which the authentication subprocess P1 is executed by the authentication subprocess P1 execution unit 34, the authentication subprocess P2 by the authentication subprocess P2 execution unit 54, and with reference to the processing result of the authentication subprocess P1 and the authentication subprocess P2 executed, the authentication subprocess P3 is executed by the function unit of the authentication subprocess P3-1 execution unit 56 or the authentication subprocess P3-2 execution unit 57.

In this case, the output to the authentication subprocess P1 execution unit 34 and the authentication subprocess P2 execution unit 54 are determined uniquely, and therefore, the corresponding input/output identification information blocks IOB1, IOB2 each include one input/output identification information IOID1, IOID2 in one output identification information block OIB1, OIB2. On the other hand, the authentication subprocess P3-1 execution unit 56 and the authentication subprocess P3-2 execution unit 57, supplied with the processing result of the authentication subprocess P1 and the processing result of the authentication subprocess P2, output one processing result. The corresponding input/output identification information blocks IOB3-1, IOB3-2, therefore, include two input identification information blocks IIB3-1, IIB3-2 and one output identification information block OIB3-1 or OIB3-2.

The execution process information block generating unit 59' has the following functions (f59'-1) to (f59'-5):

(f59'-1): The function of acquiring the parameter from the control unit 52".

(f59'-2): The function of acquiring the input/output identification information-adapted list from the input/output identification information-adapted list storage unit 69.

(f59'-3): The function of extracting only the input/output identification information block included in the acquired input/output identification information-adapted list that corresponds to the acquired parameter.

(f59'-4): The function of generating the execution process information block EPIB including the extracted input/output identification information block.

(f59'-5): The function of sending out the generated execution process information block EPIB2' to the control unit 52".

The entity device certificate storage unit 62', like in the first entity device 30", has the function of storing the entity device certificate EC2' (or the entity certificate specifying information) of the second entity device 50". Incidentally, as shown in FIG. 34, in the entity device certificate EC2', the function unit identification information FIDEI, FID3-1, FID3-2 included in the function information blocks FIB2, FIB3-1, FIB3-2 of the entity device certificate EC2 according to the first embodiment is replaced by the input/output identification information blocks IOB2, IOB3-1, IOB3-2, respectively.

(Authentication Apparatus 10")

The authentication apparatus 10" includes a communication unit 1, a verification control unit 2", a storage unit 3, a confidential information storage unit 4, an authenticator block verification nit 5, an input/output information block verification unit 6, an authentication policy storage unit 7 and an entity device certificate block verification unit 8'.

The communication unit 1 is identical with the communication unit 1 of the authentication apparatus 10 according to the first embodiment except that the authentication contexts AC1, AC2 are replaced by the authentication contexts AC1", AC2". The storage unit 3 is also the same as the storage unit 3 of the authentication apparatus 10 according to the first embodiment except that the contents read from/written into the storage unit 3 are different.

The authenticator block verification unit 5 is the same as the authenticator block verification unit 5 according to the first embodiment except that the authentication contexts AC1, AC2 and the authenticator blocks AB1, AB2 are replaced by the authentication contexts AC1", AC2" and the authenticator blocks AB1", AB2", respectively.

The authentication policy storage unit 7 and the input/output information block verification unit 6 are identical with the authentication policy storage unit 7 and the input/output information block verification unit 6, respectively, of the authentication apparatus 10 according to the first embodiment.

The verification control unit 2" has the following functions (f2"-1) to (f2"-8):

(f2"-1): The function of acquiring the authentication contexts AC1", AC2" from the communication unit 1.

(f2"-2): The function of sending out the acquired authentication contexts AC1", AC2" to the authenticator block verification unit 5.

(f2"-3): The function of acquiring the result of verification of the authenticator included in the authentication contexts AC1", AC2" from the authenticator block verification unit 5.

(f2"-4): The function of extracting all of the input information block IB2 and the output information blocks OB1, OB2 included in the authentication contexts AC1", AC2" and sending them out to the input/output information block verification unit 6.

(f2"-5): The function of acquiring the result of verification of the input information block IB2 and the output information blocks OB1, OB2 from the input/output information block verification unit 6.

(f2"-6): The function of acquiring the authentication policy AP from the authentication policy storage unit 7.

(f2"-7): The function of extracting the entity device certificate blocks ECB1', ECB2' and the execution process information blocks EPIB1', EPIB2' included in the authentication contexts AC1", AC2" and sending them out together with the authentication policy AP to the entity device certificate block verification unit 8'.

(f2"-8): The function of acquiring the result of verification of the legitimacy of the executed authentication process from the entity device certificate block verification unit 8'.

The entity device certificate block verification unit 8' has the following functions (f8'-1) to (f8'-6):

(f8'-1): The function of acquiring the entity device certificate blocks ECB1', ECB2', the execution process information blocks EPIB1', EPIB2' and the authentication policy AP from the verification control unit 2".

(f8'-2): The function of extracting all the input/output identification information blocks IOB1, IOB2, IOB3-1 included in all the execution process information blocks EPIB1', EPIB2' acquired.

(f8'-3): The function of extracting the entity device certificates EC1', EC2' from the acquired entity device certificate blocks ECB1', ECB2'.

(f8'-4): The function of extracting the function information blocks FIB1', FIB2', FIB3-1' having the same input/output identification information blocks as the extracted input/output identification information blocks IOB1, IOB2, IOB3-1 from the entity device certificates EC1', EC2'.

(f8'-5): The function of verifying whether the function information FI1, FI2, FI3-1 included in the extracted function information blocks FIB1', FIB2', FIB3-1' meets the conditions described in the authentication policy AP.

(f8'-6): The function of sending out the verification result to the verification control unit 2". As in the aforementioned case, the entity device certificate block verification unit 8' also has such a function that in the case where the entity certificate specifying information for specifying the entity device certificates EC1', EC2' is described in the entity device certificate blocks ECB1', ECB2', the entity device certificates EC1', EC2' corresponding to the entity device certificate specifying information are acquired from the certificate storage unit (such as the external storage device not shown, or the storage device, not shown, in the authentication apparatus 10) for storing the entity certificate specifying information and the entity device certificates EC1', EC2' in correspondence with each other. Also, with regard to the entity certificate specifying information, as described above, "URI" can be used as required for the external storage device, while "file name", "identification information (ID)", etc. can be used appropriately for the storage device in the authentication apparatus 10".

Figure 35:
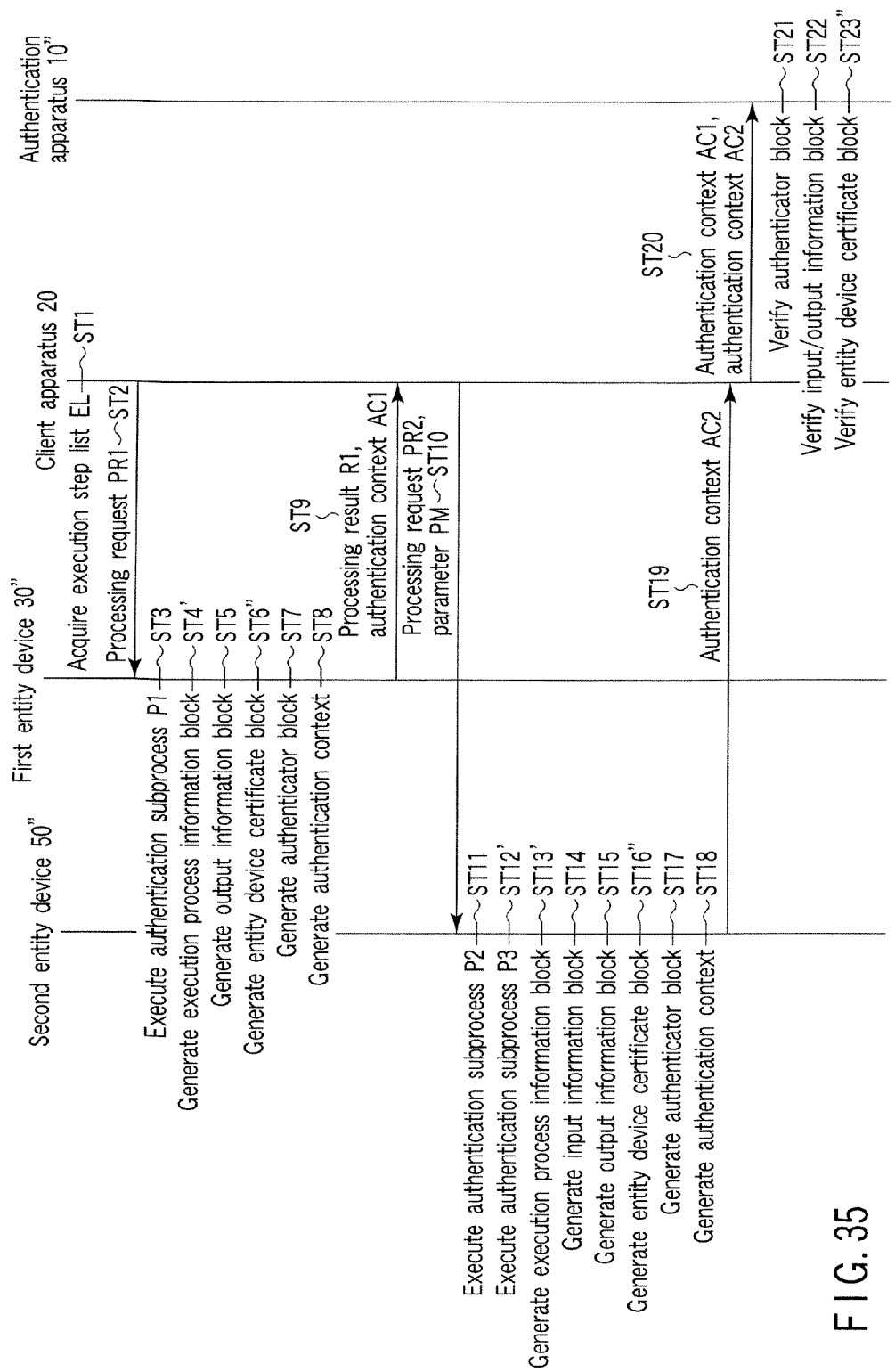
FIG. 35 is a sequence chart for explaining the operation according to the same embodiment.

Next, the operation of the authentication system configured as described above will be explained with reference to FIG. 35.

(General Operation)

The general operation according to the third embodiment is similar to the operation according to the first embodiment. Therefore, steps ST4', ST6", ST12', ST13', ST16", ST23" different in operation from the corresponding steps ST4, ST6, ST12, ST13, ST16, ST23, respectively, in the first embodiment will be explained below.

(ST4')

In the first entity device 30", the control unit 32" that has acquired the processing result R1 holds the processing result R1 in the storage unit 33. Then, the control unit 32" sends out the processing request to the execution process information block generating unit 36'.

The execution process information block generating unit 36', based on the processing request, acquires the input/output identification information-adapted list from the input/output identification information-adapted list storage unit 45. Then, the execution process information block generating unit 36' generates the execution process information block EPIB1' including the input/output identification information bloc IOBI described in the input/output identification information-adapted list, and sends out the execution process information block EPIB1' to the control unit 32".

(ST6")

In the First Entity Device 30", the Control Unit 32" holds the acquired output information block OB1 in the storage unit 33. Then, the control unit 32" sends out the processing request to the entity device certificate block generating unit 39'.

The entity device certificate block generating unit 39', based on the processing request, acquires the entity device certificate EC1' from the entity device certificate storage unit 38'. Then, the entity device certificate block generating unit 39' generates the entity device certificate block ECB1' including the acquired entity device certificate EC1', and sends out this entity device certificate block ECB1' to the control unit 32".

(ST12')

The Control Unit 52 holds the Processing Result R2 in the storage unit 53. Then, the control unit 53 sends out the parameter PM1 and the two processing results R1, R2 in the storage unit 53 to the authentication subprocess P3 switching unit 55.

The authentication subprocess P3 switching unit 55, upon acquisition of the parameter PM1 and the processing results R1, R2, accesses the input/output identification information-adapted list storage unit 69 in accordance with the value of the parameter and selects the authentication subprocess P3-1 execution unit 56 or the authentication subprocess P3-2 execution unit 57 to execute the authentication subprocess P3. Then, the processing results R1, R2 are sent out to the selected execution unit 56 or 60. In this case, the authentication subprocess P3 switching unit 55 selects the authentication subprocess P3-1 execution unit 56 related to the parameter PM1.

The authentication subprocess P3-1 execution unit 56, by accessing the acquired processing results R1, R2, executes the authentication subprocess P3 and sends out the processing result R3 to the authentication subprocess P3 switching unit 55.

(ST13')

In the Second Entity Device 50", the Control Unit 32" holds the acquired processing result R3 in the storage unit 33. Then, the control unit 32" sends out the parameter PM1 in the storage unit 33 to the execution process information block generating unit 59'.

The execution process information block generating unit 59', upon acquisition of the parameter PM1, acquires the input/output identification information-adapted list from the input/output identification information-adapted list storage unit 69. Then, the execution process information block generating unit 59' selects the input/output identification information block indicating the function unit that has executed the authentication subprocess, from the input/output identification information blocks IOB2, IOB3-1, IOB3-2 described in the input/output identification information-adapted list. In the case under consideration, the execution process information block generating unit 59' selects the input/output identification information block IOB2 with the parameter not designated and the input/output identification information block IOB3-1 with the parameter designated in the input/output identification information-adapted list. Then, the execution process information block generating unit 59' generates the execution process information block EPIB2' including the two selected input/output identification information blocks IOB2, IOB3-1, and sends out this execution process information block EPIB2' to the control unit 32".

(ST16")

In the Second Entity Device 50, the Control Unit 32" holds the acquired output information block OB2 in the storage unit 33. Then, the control unit 32" sends out the processing request to the entity device certificate block generating unit 63'.

The entity device certificate block generating unit 63', upon acquisition of the processing request, acquires the entity device certificate EC2' from the entity device certificate storage unit 38'. Then, the entity device certificate block generating unit 63' generates the entity device certificate block ECB2' including the acquired entity device certificate EC2', and sends out the entity device certificate block ECB2' to the control unit 32".

(ST23")

In the Authentication Apparatus 10", the verification control unit 2" sends out the entity device certificate blocks ECB1', ECB2' and the execution process information blocks EPIB1', EPIB2' included in the authentication contexts AC1", AC2" and the authentication policy AP stored in advance in the authentication policy storage unit 7, from all the authentication contexts AC1", AC2" held in the storage unit 3 to the entity device certificate block verification unit 8'.

The entity device certificate block verification unit 8, upon acquisition of the blocks ECB1', ECB2', EPIB1', EPIB2' and the authentication policy AP, extracts all the input/output identification information blocks IOB1, IOB2, IOB3-1 included in the acquired execution process information blocks EPIB1', EPIB2'. Then, the entity device certificate block verification unit 8' extracts the function information blocks FIB1', FIB2', FIB3-1' having the same input/output identification information block as the extracted input/output identification information blocks IOB1, IOB2, IOB3-1, from the entity device certificates EC1', EC2' in the acquired entity device certificate blocks ECB1', ECB2'. After that, the entity device certificate block verification unit 8' verifies whether the function information FI1, FI2, FI3-1 included in the extracted function information blocks FIB1', FIB2', FIB3-1' meets the conditions described in the acquired authentication policy AP, and sends out the verification result to the verification control unit 2".

The verification control unit 2" confirms the acquired verification result.

As described above, according to this embodiment, the input/output identification information capable of uniquely specifying the data input to/output from each function unit is included in the authentication contexts, so that the entity devices 30, 50 can specify the function unit that has executed the authentication subprocess.

Even in the case where a plurality of function units capable of executing the same authentication subprocess exist in the entity devices 30, 50, therefore, the verifier can verify the legitimacy of the authentication subprocess from the authentication context, thereby improving the accuracy of the principal confirmation.

The technique described above for the embodiment can be stored as a program to be executed by a computer in memory mediums including magnetic disks (Floppy™ disks, hard disks, etc.), optical disks (CD-ROMs, DVDs, etc.), magneto-optical disks (MOs) and semiconductor memories for distribution.

Memory mediums that can be used for the purpose of the present invention are not limited to those listed above and memory mediums of any type can also be used for the purpose of the present invention so long as they are computer-readable ones.

Additionally, the OS (operating system) operating on a computer according to the instructions of a program installed in the computer from a memory medium, data base management software and/or middleware such as network software may take part in each of the processes for realizing the above embodiment.

Still additionally, memory mediums that can be used for the purpose of the present invention are not limited to those independent from computers but include memory mediums adapted to download a program transmitted by LANs and/or the Internet and permanently or temporarily store it.

It is not necessary that a single memory medium is used with the above described embodiment. In other words, a plurality of memory mediums may be used with the above-described embodiment to execute any of the above described various processes. Such memory mediums may have any configuration.

For the purpose of the present invention, a computer executes various processes according to one or more than one programs stored in the memory medium or mediums as described above for the preferred embodiment. More specifically, the computer may be a stand alone computer or a system realized by connecting a plurality of computers by way of a network.

For the purpose of the present invention, computers include not only personal computers but also processors and microcomputers contained in information processing apparatus. In other words, computers generally refer to apparatus and appliances that can realize the functional features of the present invention by means of a computer program.

The present invention is by no means limited to the above described embodiment, which may be modified in various different ways without departing from the spirit and scope of the invention. Additionally, any of the components of the above described embodiment may be combined differently in various appropriate ways for the purpose of the present invention. For example, some of the components of the above described embodiment may be omitted. Alternatively, components of different embodiments may be combined appropriately in various different ways for the purpose of the present invention.

The technique described in each embodiment can be expressed also as described below.

1. An authentication system comprising: an authentication apparatus (10) capable of verifying a plurality of authentication contexts each including a processing result of a plurality of authentication subprocesses making up a biometric authentication process; a client apparatus (20) capable of transmitting said each authentication context to the authentication apparatus; and a plurality of entity devices (30, 50) each capable of generating and transmitting said each authentication context to the client apparatus, wherein at least one entity device (50) includes: a confidential information storage device (64) configured to store confidential information for verification by the authentication apparatus; a plurality of authentication subprocess execution devices (56, 57) having different performances and capable of generating a processing result by executing the same authentication subprocess; An entity device certificate storage device (62) configured to store an entity device certificate including execution device performance information and execution device identification information on said each authentication subprocess execution device; an execution device identification information storage device (58) configured to store the execution device identification information and a parameter related to each other for each authentication subprocess execution device; an execution device switching device (55) configured to execute, upon receipt of a processing request and a parameter from the client apparatus, the authentication subprocess by accessing the execution device identification information storage device and switching to the authentication subprocess execution device corresponding to the parameter; an authenticator generating device (65) configured to generate an authenticator based on the confidential information in the confidential information storage device from the entity device certificate, the processing result of the authentication subprocess and the execution device identification information indicating the authentication subprocess execution device that has executed the authentication subprocess; an Authentication context generating device (66) configured to generate an authentication context including the authenticator, the execution device identification information used for generating the authenticator, the processing result and the entity device certificate; and an authentication context transmission device (51) configured to transmit the authentication context to the client apparatus, the client apparatus (20) includes: an execution step storage device (21) configured to store at least the entity device identification information and the processing request related to each other in accordance with an execution step, and in the case where the entity device identification information indicates the entity device having said plurality of authentication subprocess execution devices, store the parameter as related to the entity device identification information and the processing request; a processing request transmission device (22, 24, 25) configured to transmit the processing request and the parameter to the entity device based on contents stored in the execution step storage device; and a device (26) configured to transmit each authentication context received from said each entity device to the authentication apparatus, and the authentication apparatus (10) includes: an Authentication apparatus confidential information storage device (4) configured to store confidential information identical with or corresponding to the first confidential information; an authenticator verification device (5) configured to verify, upon receipt of each authentication context from the client apparatus, the authenticator of the authentication context based on the confidential information in the authentication apparatus confidential information storage device; a performance information extraction device (8) configured to extract, for each received authentication context, the corresponding execution device performance information in the entity device certificate based on the execution device identification information used to generate the authenticator; a performance criteria information storage device (7) configured to store, in advance, performance criteria information indicating the performance to be satisfied by the authentication subprocess execution device; and a performance information verification device (8) configured to verify, based on the performance criteria information, the execution device performance information extracted by the performance information extraction device.

2. An authentication system comprising: an authentication apparatus (10) capable of verifying a plurality of authentication contexts each including a processing result of a plurality of authentication subprocesses making up a biometric authentication process; a client apparatus (20) capable of transmitting said each authentication context to the authentication apparatus; and a plurality of entity devices (30, 50) each capable of generating and transmitting said each authentication context to the client apparatus, wherein at least one entity device (50) includes: a confidential information storage device (64) configured to store confidential information for verification by the authentication apparatus; a plurality of authentication subprocess execution devices (56, 57) having different performances and capable of generating a processing result by executing the same authentication subprocess; An entity certificate specifying information storage device (62) configured to store entity certificate specifying information for specifying the entity device certificate including the execution device performance information and the execution device identification information concerning said each authentication subprocess execution device; an execution device identification information storage device (58) configured to store the execution device identification information and a parameter related to each other for each authentication subprocess execution device; an execution device switching device (55) configured to execute, upon receipt of a processing request and a parameter from the client apparatus, the authentication subprocess by accessing the execution device identification information storage device and switching to the authentication subprocess execution device corresponding to the parameter; an authenticator generating device (65) configured to generate an authenticator based on the confidential information in the confidential information storage device from the entity certificate specifying information, the processing result of the authentication subprocess and the execution device identification information indicating the authentication subprocess execution device that has executed the authentication subprocess; An authentication context generating device (66) configured to generate an authentication context including the authenticator, the execution device identification information used for generating the authenticator, the processing result and the entity certificate specifying information; and an authentication context transmission device (51) configured to transmit the authentication context to the client apparatus, the client apparatus (20) includes: an execution step storage device (21) configured to store at least the entity device identification information and the processing request related to each other in accordance with an execution step, and in the case where the entity device identification information indicates the entity device having said plurality of authentication subprocess execution devices, store the parameter as related to the entity device identification information and the processing request; a processing request transmission device (22, 24, 25) configured to transmit the processing request and the parameter to the entity device based on contents stored in the execution step storage device; and a device (26) configured to transmit each authentication context received from said each entity device to the authentication apparatus, and the authentication apparatus (10) includes: an authentication apparatus confidential information storage device (4) configured to store confidential information identical with or corresponding to the first confidential information; an authenticator verification device (5) configured to verify, upon receipt of each authentication context from the client apparatus, the authenticator of the authentication context based on the confidential information in the authentication apparatus confidential information storage device; a certificate acquisition device (8) configured to acquire an entity device certificate from a certificate storage device having stored the entity certificate specifying information and the entity device certificate in correspondence with each other in advance, based on the entity certificate specifying information used for generating the authenticator, for each authentication context received; a performance information extraction device (8) configured to extract the corresponding execution device performance information in the acquired entity device certificate, based on the execution device identification information used for generating the authenticator, for each authentication context received; a performance criteria information storage device (7) configured to store, in advance, performance criteria information indicating the performance to be satisfied by the authentication subprocess execution device; and a performance information verification device (8) configured to verify, based on the performance criteria information, the execution device performance information extracted by the performance information extraction device.

3. An authentication system comprising: an authentication apparatus (10) capable of verifying a plurality of authentication contexts each including a processing result of a plurality of authentication subprocesses making up a biometric authentication process; a client apparatus (20) capable of transmitting said each authentication context to the authentication apparatus; and a plurality of entity devices (30, 50) each capable of generating and transmitting said each authentication context to the client apparatus, wherein at least one entity device (50) includes: a confidential information storage device (64) configured to store confidential information for verification by the authentication apparatus; a plurality of authentication subprocess execution devices (56, 57) having different performances and capable of generating a processing result by executing the same authentication subprocess; An entity device certificate storage device (62) configured to store an entity device certificate including execution device performance information and input/output identification information on said each authentication subprocess execution device; an input/output identification information storage device (58) configured to store the input/output identification information and a parameter related to each other for each authentication subprocess execution device; an execution device switching device (55) configured to execute, upon receipt of a processing request and a parameter from the client apparatus, the authentication subprocess by accessing the input/output identification information storage device and switching to the authentication subprocess execution device corresponding to the parameter; an authenticator generating device (65) configured to generate an authenticator based on the confidential information in the confidential information storage device from the entity device certificate, the processing result of the authentication subprocess and the input/output identification information indicating the authentication subprocess execution device that has executed the authentication subprocess; an Authentication context generating device (66) configured to generate an authentication context including the authenticator, the input/output identification information used for generating the authenticator, the processing result and the entity device certificate; and an authentication context transmission device (51) configured to transmit the authentication context to the client apparatus, the client apparatus (20) includes: an execution step storage device (21) configured to store at least the entity device identification information and the processing request related to each other in accordance with an execution step, and in the case where the entity device identification information indicates the entity device having said plurality of authentication subprocess execution devices, store the parameter as related to the entity device identification information and the processing request; a processing request transmission device (22, 24, 25) configured to transmit the processing request and the parameter to the entity device based on contents stored in the execution step storage device; and a device (26) configured to transmit each authentication context received from said each entity device to the authentication apparatus, and the authentication apparatus (10) includes: an Authentication apparatus confidential information storage device (4) configured to store confidential information identical with or corresponding to the first confidential information; an authenticator verification device (5) configured to verify, upon receipt of each authentication context from the client apparatus, the authenticator of the authentication context based on the confidential information in the authentication apparatus confidential information storage device; a performance information extraction device (8) configured to extract, for each received authentication context, the corresponding execution device performance information in the entity device certificate based on the input/output identification information used to generate the authenticator; a performance criteria information storage device (7) configured to store, in advance, performance criteria information indicating the performance to be satisfied by the authentication subprocess execution device; and A performance information verification device (8) configured to verify, based on the performance criteria information, the execution device performance information extracted by the performance information extraction device.

4. An authentication system comprising: an authentication apparatus (10) capable of verifying a plurality of authentication contexts each including a processing result of a plurality of authentication subprocesses making up a biometric authentication process; a client apparatus (20) capable of transmitting said each authentication context to the authentication apparatus; and a plurality of entity devices (30, 50) each capable of generating and transmitting said each authentication context to the client apparatus, wherein at least one entity device (50) includes: a confidential information storage device (64) configured to store confidential information for verification by the authentication apparatus; a plurality of authentication subprocess execution devices (56, 57) having different performances and capable of generating a processing result by executing the same authentication subprocess; An entity certificate specifying information storage device (62) configured to store entity certificate specifying information for specifying the entity device certificate including the execution device performance information and the input/output identification information concerning said each authentication subprocess execution device; an input/output identification information storage device (58) configured to store the input/output identification information and a parameter related to each other for each authentication subprocess execution device; an execution device switching device (55) configured to execute, upon receipt of a processing request and a parameter from the client apparatus, the authentication subprocess by accessing the input/output identification information storage device and switching to the authentication subprocess execution device corresponding to the parameter; an authenticator generating device (65) configured to generate an authenticator based on the confidential information in the confidential information storage device from the entity certificate specifying information, the processing result of the authentication subprocess and the input/output identification information indicating the authentication subprocess execution device that has executed the authentication subprocess; an Authentication context generating device (66) configured to generate an authentication context including the authenticator, the input/output identification information used for generating the authenticator, the processing result and the entity certificate specifying information; and an authentication context transmission device (51) configured to transmit the authentication context to the client apparatus, the client apparatus (20) includes: an execution step storage device (21) configured to store at least the entity device identification information and the processing request related to each other in accordance with an execution step, and in the case where the entity device identification information indicates the entity device having said plurality of authentication subprocess execution devices, store the parameter as related to the entity device identification information and the processing request; a processing request transmission device (22, 24, 25) configured to transmit the processing request and the parameter to the entity device based on contents stored in the execution step storage device; and a device (26) configured to transmit each authentication context received from said each entity device to the authentication apparatus, and the authentication apparatus (10) includes: an authentication apparatus confidential information storage device (4) configured to store confidential information identical with or corresponding to the first confidential information; an authenticator verification device (5) configured to verify, upon receipt of each authentication context from the client apparatus, the authenticator of the authentication context based on the confidential information in the authentication apparatus confidential information storage device; a certificate acquisition device (8) configured to acquire an entity device certificate from a certificate storage device having stored the entity certificate specifying information and the entity device certificate in correspondence with each other in advance, based on the entity certificate specifying information used for generating the authenticator, for each authentication context received; a performance information extraction device (8) configured to extract the corresponding execution device performance information in the acquired entity device certificate, based on the input/output identification information used for generating the authenticator, for each authentication context received; a performance criteria information storage device (7) configured to store, in advance, performance criteria information indicating the performance to be satisfied by the authentication subprocess execution device; and a performance information verification device (8) configured to verify, based on the performance criteria information, the execution device performance information extracted by the performance information extraction device.

5. An authentication system comprising: an authentication apparatus (10') capable of verifying a plurality of authentication contexts each including a processing result of a plurality of authentication subprocesses making up a biometric authentication process; a client apparatus (20) capable of transmitting said each authentication context to the authentication apparatus; and a plurality of entity devices (30', 50') each capable of generating and transmitting said each authentication context to the client apparatus, wherein at least one entity device (50') includes: a confidential information storage device (64) configured to store confidential information for verification by the authentication apparatus; a plurality of authentication subprocess execution devices (56, 57) having different performances and capable of generating a processing result by executing the same authentication subprocess; a function information storage device (67) configured to store "a function information certificate including the execution device performance information" and a parameter as related to each other, for each authentication subprocess execution device; an execution device switching device (55) configured to execute, upon receipt of a processing request and a parameter from the client apparatus, the authentication subprocess by accessing the execution device identification information storage device and switching to the authentication subprocess execution device corresponding to the parameter; an authenticator generating device (65) configured to generate an authenticator based on the confidential information in the confidential information storage device from the function information certificate corresponding to the authentication subprocess execution device that has executed the authentication subprocess and the processing result of the authentication subprocess; an Authentication context generating device (66) configured to generate an authentication context including the authenticator, the function information certificate used for generating the authenticator and the processing result; and an authentication context transmission device (51) configured to transmit the authentication context to the client apparatus, the client apparatus (20) includes: an execution step storage device (21) configured to store at least the entity device identification information and the processing request related to each other in accordance with an execution step, and in the case where the entity device identification information indicates the entity device having said plurality of authentication subprocess execution devices, store the parameter as related to the entity device identification information and the processing request; a processing request transmission device (22, 24, 25) configured to transmit the processing request and the parameter to the entity device based on contents stored in the execution step storage device; and a device (26) configured to transmit each authentication context received from said each entity device to the authentication apparatus, and the authentication apparatus (10') includes: an Authentication apparatus confidential information storage device (4) configured to store confidential information identical with or corresponding to the first confidential information; an authenticator verification device (5) configured to verify, upon receipt of each authentication context from the client apparatus, the authenticator of the authentication context based on the confidential information in the authentication apparatus confidential information storage device; a performance information extraction device (11) configured to extract the execution device performance information from the function information certificate in the authentication context received; a performance criteria information storage device (7) configured to store, in advance, performance criteria information indicating the performance to be satisfied by the authentication subprocess execution device; and A performance information verification device (8) configured to verify, based on the performance criteria information, the execution device performance information extracted by the performance information extraction device.

6. An authentication system comprising: an authentication apparatus (10') capable of verifying a plurality of authentication contexts each including a processing result of a plurality of authentication subprocesses making up a biometric authentication process; a client apparatus (20) capable of transmitting said each authentication context to the authentication apparatus; and a plurality of entity devices (30', 50') each capable of generating and transmitting said each authentication context to the client apparatus, wherein at least one entity device (50') includes: a confidential information storage device (64) configured to store confidential information for verification by the authentication apparatus; a plurality of authentication subprocess execution devices (56, 57) having different performances and capable of generating a processing result by executing the same authentication subprocess; a function information storage device (67) configured to store, as related to each other, "function certificate specifying information for specifying the function information certificate including the execution device performance information" and a parameter, for each authentication subprocess execution device; an execution device switching device (55) configured to execute, upon receipt of a processing request and a parameter from the client apparatus, the authentication subprocess by accessing the execution device identification information storage device and switching to the authentication subprocess execution device corresponding to the parameter; an authenticator generating device (65) configured to generate an authenticator based on the confidential information in the confidential information storage device from the function certificate specifying information corresponding to the authentication subprocess execution device that has executed the authentication subprocess and the processing result of the particular authentication subprocess; an authentication context generating device (66) configured to generate an authentication context including the authenticator, the function certificate specifying information used for generating the authenticator and the processing result; and an authentication context transmission device (51) configured to transmit the authentication context to the client apparatus, the client apparatus (20) includes: an execution step storage device (21) configured to store at least the entity device identification information and the processing request related to each other in accordance with an execution step, and in the case where the entity device identification information indicates the entity device having said plurality of authentication subprocess execution devices, store the parameter as related to the entity device identification information and the processing request; a processing request transmission device (22, 24, 25) configured to transmit the processing request and the parameter to the entity device based on contents stored in the execution step storage device; and a device (26) configured to transmit each authentication context received from said each entity device to the authentication apparatus, and the authentication apparatus (10') includes: an Authentication apparatus confidential information storage device (4) configured to store confidential information identical with or corresponding to the first confidential information; an authenticator verification device (5) configured to verify, upon receipt of each authentication context from the client apparatus, the authenticator of the authentication context based on the confidential information in the authentication apparatus confidential information storage device; a certificate acquisition device (11) configured to acquire the function information certificate from the certificate storage device having stored the function certificate specifying information and the function information certificate in correspondence with each other in advance, based on the function certificate specifying information in each authentication context received; a performance information extraction device (11) configured to extract the execution device performance information from the acquired function information certificate; a performance criteria information storage device (7) configured to store, in advance, performance criteria information indicating the performance to be satisfied by the authentication subprocess execution device; and A performance information verification device (8) configured to verify, based on the performance criteria information, the execution device performance information extracted by the performance information extraction device.

7. An authentication apparatus (10') communicable with a client apparatus (20) capable of transmitting each authentication context received from a plurality of entity devices (30', 50') which generate, based on confidential information, a plurality of authentication contexts each including a processing result of a plurality of authentication subprocesses making up a biometric authentication process, the authentication apparatus comprising: an authentication apparatus confidential information storage device (4) configured to store confidential information identical with or corresponding to the aforementioned confidential information; an authenticator verification device (5) configured to verify an authenticator of each authentication context based on the confidential information in the authentication apparatus confidential information storage device upon receipt, from the client apparatus, of the authentication context configured of "a function information certificate including the execution device performance information corresponding to that one of a plurality of the authentication subprocess execution devices of the entity device which has executed the authentication subprocess", "the processing result of the authentication subprocess", and "the authenticator generated based on the confidential information"; a performance information extraction device (11) configured to extract the execution device performance information from the function information certificate in each authentication context received; a performance criteria information storage device (7) configured to store, in advance, performance criteria information indicating the performance to be satisfied by the authentication subprocess execution device; and a performance information verification device (11) configured to verify, based on the performance criteria information, the execution device performance information extracted by the performance information extraction device.

8. At least one entity device (50) among a plurality of entity devices, used for an authentication system comprising an authentication apparatus (10) capable of verifying a plurality of authentication contexts each including a processing result of a plurality of authentication subprocesses making up a biometric authentication process, a client apparatus (20) capable of transmitting said each authentication context to the authentication apparatus, and a plurality of entity devices (30, 50) capable of individually generating and transmitting said each authentication context to the client apparatus, the entity device comprising: a confidential information storage device (64) configured to store confidential information for verification by the authentication apparatus; a plurality of authentication subprocess execution devices (56, 57) having different performances and capable of generating a processing result by executing the same authentication subprocess; an entity certificate specifying information storage device (62) configured to store entity certificate specifying information for specifying the entity device certificate including the execution device performance information and the execution device identification information concerning said each authentication subprocess execution device; an execution device identification information storage device (58) configured to store the execution device identification information and a parameter related to each other for each authentication subprocess execution device; an execution device switching device (55) configured to execute, upon receipt of a processing request and a parameter from the client apparatus, the authentication subprocess by accessing the execution device identification information storage device and switching to the authentication subprocess execution device corresponding to the parameter; an authenticator generating device (65) configured to generate an authenticator based on the confidential information in the confidential information storage device from the entity certificate specifying information, the processing result of the authentication subprocess and the execution device identification information indicating the authentication subprocess execution device that has executed the authentication subprocess; An authentication context generating device (66) configured to generate an authentication context including the authenticator, the execution device identification information used for generating the authenticator, the processing result and the entity certificate specifying information; and an authentication context transmission device (51) configured to transmit the authentication context to the client apparatus, wherein the authentication context transmitted by the authentication context transmission device is such that the authentication apparatus is capable of verifying the authenticator based on the confidential information identical with or corresponding to the aforementioned confidential information, the corresponding execution device performance information in the entity device certificate acquired from the entity certificate specifying information is extracted based on the execution device identification information used for generating the authenticator, and the execution device performance information is capable of being verified based on predetermined performance criteria information.

9. At least one entity device (50) among a plurality of entity devices, used for an authentication system comprising an authentication apparatus (10) capable of verifying a plurality of authentication contexts each including a processing result of a plurality of authentication subprocesses making up a biometric authentication process, a client apparatus (20) capable of transmitting said each authentication context to the authentication apparatus, and a plurality of entity devices (30, 50) capable of individually generating and transmitting said each authentication context to the client apparatus, the entity device comprising: a confidential information storage device (64) configured to store confidential information for verification by the authentication apparatus; a plurality of authentication subprocess execution devices (56, 57) having different performances and capable of generating a processing result by executing the same authentication subprocess; An entity certificate specifying information storage device (62) configured to store entity certificate specifying information for specifying the entity device certificate including the execution device performance information and the input/output identification information concerning said each authentication subprocess execution device; an input/output identification information storage device (58) configured to store the input/output identification information and a parameter related to each other for each authentication subprocess execution device; an execution device switching device (55) configured to execute, upon receipt of a processing request and a parameter from the client apparatus, the authentication subprocess by accessing the input/output identification information storage device and switching to the authentication subprocess execution device corresponding to the parameter; an authenticator generating device (65) configured to generate an authenticator based on the confidential information in the confidential information storage device from the entity certificate specifying information, the processing result of the authentication subprocess and the input/output identification information indicating the authentication subprocess execution device that has executed the authentication subprocess; an Authentication context generating device (66) configured to generate an authentication context including the authenticator, the input/output identification information used for generating the authenticator, the processing result and the entity certificate specifying information; and an authentication context transmission device (51) configured to transmit the authentication context to the client apparatus, wherein the authentication context transmitted by the authentication context transmission device is such that the authentication apparatus is capable of verifying the authenticator based on the confidential information identical with or corresponding to the aforementioned confidential information, the corresponding execution device performance information in the entity device certificate acquired from the entity certificate specifying information is extracted based on the input/output identification information used for generating the authenticator, and the execution device performance information is capable of being verified based on predetermined performance criteria information.

10. At least one entity device (50') among a plurality of entity devices, used for an authentication system comprising an authentication apparatus (10') capable of verifying a plurality of authentication contexts each including a processing result of a plurality of authentication subprocesses making up a biometric authentication process, a client apparatus (20)

capable of transmitting said each authentication context to the authentication apparatus, and a plurality of entity devices (30', 50') capable of individually generating and transmitting said each authentication context to the client apparatus, the entity device comprising: a confidential information storage device (64) configured to store confidential information for verification by the authentication apparatus; a plurality of authentication subprocess execution devices (56, 57) having different performances and capable of generating a processing result by executing the same authentication subprocess; a function information storage device (67) configured to store, as related to each other, "function certificate specifying information for specifying the function information certificate including the execution device performance information" and a parameter, for each authentication subprocess execution device; an execution device switching device (55) configured to execute, upon receipt of a processing request and a parameter from the client apparatus, the authentication subprocess by accessing the execution device identification information storage device and switching to the authentication subprocess execution device corresponding to the parameter; an authenticator generating device (65) configured to generate an authenticator based on the confidential information in the confidential information storage device from the function certificate specifying information corresponding to the authentication subprocess execution device that has executed the authentication subprocess and the processing result of the particular authentication subprocess; an authentication context generating device (66) configured to generate an authentication context including the authenticator, the function certificate specifying information used for generating the authenticator and the processing result; and an authentication context transmission device (51) configured to transmit the authentication context to the client apparatus, wherein the authentication context transmitted by the authentication context transmission device is such that the authentication apparatus is capable of verifying the authenticator based on the confidential information identical with or corresponding to the aforementioned confidential information, the execution device performance information is extracted from the function information certificate acquired from the function certificate specifying information used for generating the authenticator, and the execution device performance information is capable of being verified based on predetermined performance criteria information.

11. A client apparatus (20) communicable with: an authentication apparatus (10) capable of verifying, based on confidential information, a plurality of authentication contexts each including a processing result of a plurality of authentication subprocesses making up a biometric authentication process; at least one entity device (50) which switches and executes, in accordance with a parameter, "a plurality of authentication subprocess execution devices having different performances and capable of generating the processing result by executing the same authentication subprocess", and is adapted to, based on the acquired processing result and "confidential information identical with or corresponding to the aforementioned confidential information", generate and transmit the authentication context; and at least one entity device capable of generating and transmitting the authentication context based on the processing result obtained by executing the authentication subprocess and "the confidential information identical with or corresponding to the confidential information of the authentication apparatus", the client apparatus comprising: an execution step storage device (21) having stored at least the entity device identification information and the processing request, as related to each other and in accordance with the execution step, and in the case where the entity device identification information indicates the entity device having said plurality of authentication subprocess execution devices, further having stored the parameter as related to the entity device identification information and the processing request; a processing request transmission device (22, 24, 25) configured to transmit the processing request and the parameter to the corresponding entity device based on contents stored in the execution step storage device; and a device (26) configured to transmit each authentication context received from said each entity device to the authentication apparatus.

12. A program stored in a computer-readable storage medium used for an authentication apparatus (10) communicable with a client apparatus (20) capable of transmitting each authentication context received from a plurality of entity devices (30, 50) which generate, based on confidential information, a plurality of authentication contexts each including a processing result of a plurality of authentication subprocesses making up a biometric authentication process, the program comprising: a first program code (10) to cause the computer to execute a process of writing confidential information identical with or corresponding to the aforementioned confidential information into a first storage device (4) of the computer of the authentication apparatus; a second program code (5) to cause the computer to execute a process of verifying an authenticator of each authentication context based on the confidential information in the first storage device upon receipt, from the client apparatus, of the authentication context including "an entity device certificate including execution device performance information and execution device identification information on a plurality of authentication subprocess execution devices held in the entity device", "the execution device identification information indicating the authentication subprocess execution device that has executed the authentication subprocess", "the processing result of the authentication subprocess", and "the authenticator generated based on the confidential information"; a third program code (8) to cause the computer to execute a process of extracting, for each authentication context received, the corresponding execution device performance information in the entity device certificate based on the execution device identification information used for generating the authenticator; a fourth program code (2) to cause the computer to execute a process of writing performance criteria information indicating the performance to be satisfied by the authentication subprocess execution device, into a second storage device (7) of the computer; and a fifth program code (8) to cause the computer to execute a process of verifying the extracted execution device performance information based on the performance criteria information.

13. A program stored in a computer-readable storage medium used for an authentication apparatus (10) communicable with a client apparatus (20) capable of transmitting each authentication context received from a plurality of entity devices (30, 50) which generate, based on confidential information, a plurality of authentication contexts each including a processing result of a plurality of authentication subprocesses making up a biometric authentication process, the program comprising: a first program code (10) to cause the computer to execute a process of writing confidential information identical with or corresponding to the aforementioned confidential information into a first storage device (4) of the computer of the authentication apparatus; a second program code (5) to cause the computer to execute a process of verifying an authenticator of each authentication context based on the confidential information in the first storage device upon receipt, from the client apparatus, of the authentication context including "an entity device certificate including execution device performance information and input/output identification information on a plurality of authentication subprocess execution devices held in the entity device", "the input/output identification information indicating the authentication subprocess execution device that has executed the authentication subprocess", "the processing result of the authentication subprocess", and "the authenticator generated based on the confidential information"; a third program code (8) to cause the computer to execute a process of extracting, for each authentication context received, the corresponding execution device performance information in the entity device certificate based on the input/output identification information used for generating the authenticator; a fourth program code (2) to cause the computer to execute a process of writing performance criteria information indicating the performance to be satisfied by the authentication subprocess execution device, into a second storage device (7) of the computer; and a fifth program code (8) to cause the computer to execute a process of verifying the extracted execution device performance information based on the performance criteria information.

14. A program stored in a computer-readable storage medium used for an authentication apparatus (10) communicable with a client apparatus (20) capable of transmitting each authentication context received from a plurality of entity devices (30', 50') which generate, based on confidential information, a plurality of authentication contexts each including a processing result of a plurality of authentication subprocesses making up a biometric authentication process, the program comprising: a first program code (10) to cause the computer to execute a process of writing the confidential information identical with or corresponding to the aforementioned confidential information into a first storage device (4) of the computer of the authentication apparatus; a second program code (5) to cause the computer to execute a process of verifying an authenticator of each authentication context based on the confidential information in the first storage device upon receipt, from the client apparatus, of the authentication context including "a function information certificate including execution device performance information corresponding to that one of a plurality of authentication subprocess execution devices included in the entity device which has executed the authentication subprocess", "the processing result of the authentication subprocess", and "the authenticator generated based on the confidential information"; a third program code (11) to cause the computer to execute a process of extracting the execution device performance information from the function information certificate in each authentication context received; a fourth program code (2) to cause the computer to execute a process of writing performance criteria information indicating the performance to be satisfied by the authentication subprocess execution device, into a second storage device (7) of the computer; and a fifth program code (11) to cause the computer to execute a process of verifying the extracted execution device performance information based on the performance criteria information.

15. A program used for an authentication system including an authentication apparatus (10) capable of verifying a plurality of authentication contexts each including a processing result of a plurality of authentication subprocesses making up a biometric authentication process, a client apparatus (20) capable of transmitting said each authentication context to the authentication apparatus and a plurality of entity devices (30, 50) adapted to individually generate said each authentication context and transmit it to the client apparatus, the program being stored in a computer-readable storage medium used for at least one entity device (50) and comprising: a first program code (50) to cause the computer to execute a process of writing confidential information for verification by the authentication apparatus into a first storage device (64) of the computer of said at least one entity device; a second program code (56, 57) to cause the computer to execute any one of authentication subprocess execution processes among a plurality of authentication subprocess execution processes having different performances and capable of generating the processing result by executing the same authentication subprocess; a third program code (50) to cause the computer to execute a process of writing an entity device certificate including execution process performance information and execution process identification information concerning said each authentication subprocess execution process into a second storage device (62) of the computer; a fourth program code (50) to cause the computer to execute a process of writing the execution process identification information and the parameter, as related to each other, into a third storage device (58) of the computer for each execution of the authentication subprocess; a fifth program code (55) to cause the computer to switch to and execute a process of executing the authentication subprocess corresponding to the parameter with reference to the third storage device upon receipt of the processing request and the parameter from the client apparatus; a sixth program code (65) to cause the computer to execute a process of generating an authenticator based on the confidential information in the first storage device from the execution process identification information indicating the authentication subprocess execution process for execution of the authentication subprocess, the processing result of the authentication subprocess and the entity device certificate; a seventh program code (66) to cause the computer to execute a process of generating an authentication context including the authenticator, the execution process identification information used for generating the authenticator, the processing result and the entity device certificate; and an eighth program code (51) to cause the computer to execute a process of transmitting the authentication context to the client apparatus, wherein the transmitted authentication context is such that the authentication apparatus is capable of verifying the authenticator based on confidential information identical with or corresponding to the aforementioned confidential information, and while extracting the corresponding execution process performance information in the entity device certificate based on the execution process identification information used for generating the authenticator, capable of verifying the execution process performance information based on predetermined performance criteria information.

16. A program used for an authentication system including an authentication apparatus (10) capable of verifying a plurality of authentication contexts each including a processing result of a plurality of authentication subprocesses making up a biometric authentication process, a client apparatus (20) capable of transmitting said each authentication context to the authentication apparatus and a plurality of entity devices (30, 50) adapted to individually generate said each authentication context and transmit it to the client apparatus, the program being stored in a computer-readable storage medium used for at least one entity device (50) and comprising: a first program code (50) to cause the computer to execute a process of writing confidential information for verification by the authentication apparatus into a first storage device (64) of the computer of said at least one entity device; a second program code (56, 57) to cause the computer to execute any one of authentication subprocess execution processes among a plurality of authentication subprocess execution processes having different performances and capable of generating the processing result by executing the same authentication subprocess; a third program code (50) to cause the computer to execute a process of writing entity certificate specifying information for specifying the entity device certificate including execution process performance information and execution process identification information concerning said each authentication subprocess execution process into a second storage device (62) of the computer; a fourth program code (50) to cause the computer to execute a process of writing the execution process identification information and the parameter, as related to each other, into a third storage device (58) of the computer for each execution of the authentication subprocess; a fifth program code (55) to cause the computer to switch to and execute a process of executing the authentication subprocess corresponding to the parameter with reference to the third storage device upon receipt of the processing request and the parameter from the client apparatus; a sixth program code (65) to cause the computer to execute a process of generating an authenticator based on the confidential information in the first storage device from the execution process identification information indicating the authentication subprocess execution process for execution of the authentication subprocess, the processing result of the authentication subprocess and the entity certificate specifying information; a seventh program code (66) to cause the computer to execute a process of generating an authentication context including the authenticator, the execution process identification information used for generating the authenticator, the processing result and the entity certificate specifying information; and an eighth program code (51) to cause the computer to execute a process of transmitting the authentication context to the client apparatus, wherein the transmitted authentication context is such that the authentication apparatus is capable of verifying the authenticator based on confidential information identical with or corresponding to the aforementioned confidential information, and while extracting the corresponding execution process performance information in the entity device certificate acquired from the entity certificate specifying information based on the execution process identification information used for generating the authenticator, capable of verifying the execution process performance information based on predetermined performance criteria information.

17. A program used for an authentication system including an authentication apparatus (10) capable of verifying a plurality of authentication contexts each including a processing result of a plurality of authentication subprocesses making up a biometric authentication process, a client apparatus (20) capable of transmitting said each authentication context to the authentication apparatus and a plurality of entity devices (30, 50) adapted to individually generate said each authentication context and transmit it to the client apparatus, the program being stored in a computer-readable storage medium used for at least one entity device (50) and comprising: a first program code (50) to cause the computer to execute a process of writing confidential information for verification by the authentication apparatus into a first storage device (64) of the computer of said at least one entity device; a second program code (56, 57) to cause the computer to execute any one of authentication subprocess execution processes among a plurality of authentication subprocess execution processes having different performances and capable of generating the processing result by executing the same authentication subprocess; a third program code (50) to cause the computer to execute a process of writing an entity device certificate including execution process performance information and input/output identification information concerning said each authentication subprocess execution process into a second storage device (62) of the computer; a fourth program code (50) to cause the computer to execute a process of writing the input/output identification information and the parameter, as related to each other, into a third storage device (58) of the computer for each execution of the authentication subprocess; a fifth program code (55) to cause the computer to switch to and execute a process of executing the authentication subprocess corresponding to the parameter with reference to the third storage device upon receipt of the processing request and the parameter from the client apparatus; a sixth program code (65) to cause the computer to execute a process of generating an authenticator based on the confidential information in the first storage device from the input/output identification information indicating the authentication subprocess execution process for execution of the authentication subprocess, the processing result of the authentication subprocess and the entity device certificate; a seventh program code (66) to cause the computer to execute a process of generating an authentication context including the authenticator, the input/output identification information used for generating the authenticator, the processing result and the entity device certificate; and an eighth program code (51) to cause the computer to execute a process of transmitting the authentication context to the client apparatus, wherein the transmitted authentication context is such that the authentication apparatus is capable of verifying the authenticator based on confidential information identical with or corresponding to the aforementioned confidential information, and while extracting the corresponding execution process performance information in the entity device certificate based on the input/output identification information used for generating the authenticator, capable of verifying the execution process performance information based on predetermined performance criteria information.

18. A program used for an authentication system including an authentication apparatus (10) capable of verifying a plurality of authentication contexts each including a processing result of a plurality of authentication subprocesses making up a biometric authentication process, a client apparatus (20) capable of transmitting said each authentication context to the authentication apparatus and a plurality of entity devices (30, 50) adapted to individually generate said each authentication context and transmit it to the client apparatus, the program being stored in a computer-readable storage medium used for at least one entity device (50) and comprising: a first program code (50) to cause the computer to execute a process of writing confidential information for verification by the authentication apparatus into a first storage device (64) of the computer of said at least one entity device; a second program code (56, 57) to cause the computer to execute any one of authentication subprocess execution processes among a plurality of authentication subprocess execution processes having different performances and capable of generating the processing result by executing the same authentication subprocess; a third program code (50) to cause the computer to execute a process of writing entity certificate specifying information for specifying the entity device certificate including execution process performance information and input/output identification information concerning said each authentication subprocess execution process into a second storage device (62) of the computer; a fourth program code (50) to cause the computer to execute a process of writing the input/output identification information and the parameter, as related to each other, into a third storage device (58) of the computer for each execution of the authentication subprocess; a fifth program code (55) to cause the computer to switch to and execute a process of executing the authentication subprocess corresponding to the parameter with reference to the third storage device upon receipt of the processing request and the parameter from the client apparatus; a sixth program code (65) to cause the computer to execute a process of generating an authenticator based on the confidential information in the first storage device from the input/output identification information indicating the authentication subprocess execution process for execution of the authentication subprocess, the processing result of the authentication subprocess and the entity certificate specifying information; a seventh program code (66) to cause the computer to execute a process of generating an authentication context including the authenticator, the input/output identification information used for generating the authenticator, the processing result and the entity certificate specifying information; and an eighth program code (51) to cause the computer to execute a process of transmitting the authentication context to the client apparatus, wherein the transmitted authentication context is such that the authentication apparatus is capable of verifying the authenticator based on confidential information identical with or corresponding to the aforementioned confidential information, and while extracting the corresponding execution process performance information in the entity device certificate acquired from the entity certificate specifying information based on the input/output identification information used for generating the authenticator, capable of verifying the execution process performance information based on predetermined performance criteria information.

19. A program used for an authentication system including an authentication apparatus (10') capable of verifying a plurality of authentication contexts each including a processing result of a plurality of authentication subprocesses making up a biometric authentication process, a client apparatus (20) capable of transmitting said each authentication context to the authentication apparatus and a plurality of entity devices (30', 50') adapted to individually generate said each authentication context and transmit it to the client apparatus, the program being stored in a computer-readable storage medium used for at least one entity device (50') and comprising: a first program code (50) to cause the computer to execute a process of writing confidential information for verification by the authentication apparatus into a first storage device (64) of the computer of said at least one entity device; a second program code (56, 57) to cause the computer to execute any one of authentication subprocess execution processes among a plurality of authentication subprocess execution processes having different performances and capable of generating the processing result by executing the same authentication subprocess; a third program code (50) to cause the computer to execute a process of writing an entity device certificate including execution process performance information and execution process identification information concerning said each authentication subprocess execution process into a second storage device (62) of the computer; a fourth program code (50') to cause the computer to execute a process of writing "a function information certificate including the execution process performance information" and the parameter, as related to each other, into a second storage device (67) of the computer for each execution of the authentication subprocess; a fifth program code (55) to cause the computer to switch to and execute a process of executing the authentication subprocess corresponding to the parameter with reference to the third storage device upon receipt of the processing request and the parameter from the client apparatus; a sixth program code (65) to cause the computer to execute a process of generating an authenticator based on the confidential information in the first storage device from the function information certificate corresponding to the authentication subprocess execution process for execution of the authentication subprocess and the processing result of the authentication subprocess; a seventh program code (66) to cause the computer to execute a process of generating an authentication context including the authenticator, the function information certificate used for generating the authenticator and the processing result; and an eighth program code (51) to cause the computer to execute a process of transmitting the authentication context to the client apparatus, wherein the transmitted authentication context is such that the authentication apparatus is capable of verifying the authenticator based on confidential information identical with or corresponding to the aforementioned confidential information, and while extracting the execution process performance information from the function information certificate used for generating the authenticator, capable of verifying the execution process performance information based on predetermined performance criteria information.

20. A program used for an authentication system including an authentication apparatus (10') capable of verifying a plurality of authentication contexts each including a processing result of a plurality of authentication subprocesses making up a biometric authentication process, a client apparatus (20) capable of transmitting said each authentication context to the authentication apparatus and a plurality of entity devices (30', 50') adapted to individually generate said each authentication context and transmit it to the client apparatus, the program being stored in a computer-readable storage medium used for at least one entity device (50') and comprising: a first program code (50) to cause the computer to execute a process of writing confidential information for verification by the authentication apparatus into a first storage device (64) of the computer of said at least one entity device; a second program code (56, 57) to cause the computer to execute any one of authentication subprocess execution processes among a plurality of authentication subprocess execution processes having different performances and capable of generating the processing result by executing the same authentication subprocess; a third program code (50) to cause the computer to execute a process of writing an entity device certificate including execution process performance information and execution process identification information concerning said each authentication subprocess execution process into a second storage device (62) of the computer; a fourth program code (50) to cause the computer to execute a process of writing "function certificate specifying information for specifying the function information certificate including the execution process performance information" and the parameter, as related to each other, into a second storage device (58) of the computer, for each execution of the authentication subprocess; a fifth program code (55) to cause the computer to switch to and execute a process of executing the authentication subprocess corresponding to the parameter with reference to the third storage device upon receipt of the processing request and the parameter from the client apparatus; a sixth program code (65) to cause the computer to execute a process of generating an authenticator based on the confidential information in the first storage device from the function certificate specifying information corresponding to the authentication subprocess execution process for execution of the authentication subprocess and the processing result of the authentication subprocess; a seventh program code (66) to cause the computer to execute a process of generating an authentication context including the authenticator, the function certificate specifying information used for generating the authenticator and the processing result; and an eighth program code (51) to cause the computer to execute a process of transmitting the authentication context to the client apparatus, wherein the transmitted authentication context is such that the authentication apparatus is capable of verifying the authenticator based on confidential information identical with or corresponding to the confidential information, and while extracting the execution process performance information from the function information certificate acquired from the function certificate specifying information used for generating the authenticator, capable of verifying the execution process performance information based on predetermined performance criteria information.

What is claimed is:

1. An authentication apparatus capable of communicating with a client apparatus capable of transmitting each authentication context received from a plurality of entity devices which generates, based on confidential information, a plurality of authentication contexts each including a processing result of a plurality of authentication subprocesses making up a biometric authentication process, the authentication apparatus comprising:

an authentication apparatus confidential information storage device configured to store confidential information identical with or corresponding to the aforementioned confidential information;

an authenticator verification device configured to verify an authenticator of each authentication context based on the confidential information in the authentication apparatus confidential information storage device upon receipt, from the client apparatus, of the authentication context, the authentication context including:

an entity device certificate including execution device performance information and execution device identification information on a plurality of authentication subprocess execution devices of at least one of the entity devices, the execution device identification information indicating the authentication subprocess execution device that has executed the authentication subprocess, the execution device performance information indicating a plurality of evaluation items for performance of the authentication subprocess execution device and an evaluation result in correspondence with the evaluation items, a processing result of the authentication subprocess execution device, and an authenticator generated based on the confidential information;

a performance information extraction device configured to extract, for each authentication context received, the corresponding execution device performance information in the entity device certificate based on the execution device identification information used for generating the authenticator, the corresponding execution device performance information indicating the evaluation item for the performance of the authentication subprocess execution device identified by the execution device identification information and the evaluation result in correspondence with the evaluation item;

a performance criteria information storage device configured to store, in advance, performance criteria information indicating the performance to be satisfied by the authentication subprocess execution device, the performance criteria information indicating an authentication policy; and a performance information verification device configured to verify, based on the performance criteria information, the execution device performance information extracted by the performance information extraction device.

2. An authentication apparatus capable of communicating with a client apparatus capable of transmitting each authentication context received from a plurality of entity devices which generates, based on confidential information, a plurality of authentication contexts each including a processing result of a plurality of authentication subprocesses making up a biometric authentication process, the authentication apparatus comprising:

an authentication apparatus confidential information storage device configured to store confidential information identical with or corresponding to the aforementioned confidential information;

an authenticator verification device configured to verify an authenticator of each authentication context based on the confidential information in the authentication apparatus confidential information storage device upon receipt, from the client apparatus, of the authentication context, the authentication context including:

an entity device certificate including execution device performance information and input/output identification information on a plurality of authentication subprocess execution devices of at least one of the entity devices, the input/output identification information indicating the authentication subprocess execution device that has executed the authentication subprocess, the execution device performance information indicating a plurality of evaluation items for performance of the authentication subprocess execution device and an evaluation result in correspondence with the evaluation items, a processing result of the authentication subprocess execution device, and an authenticator generated based on the confidential information;

a performance information extraction device configured to extract, for each authentication context received, the corresponding execution device performance information in the entity device certificate based on the input/output identification information used for generating the authenticator, the corresponding execution device performance information indicating the evaluation item for the performance of the authentication subprocess execution device identified by the execution device identification information and the evaluation result in correspondence with the evaluation item;

a performance criteria information storage device configured to store, in advance, performance criteria information indicating the performance to be satisfied by the authentication subprocess execution device, the performance criteria information indicating an authentication policy; and a performance information verification device configured to verify, based on the performance criteria information, the execution device performance information extracted by the performance information extraction device.

3. At least one entity device among a plurality of entity devices, used for an authentication system comprising an authentication apparatus capable of verifying a plurality of authentication contexts each including a processing result of a plurality of authentication subprocesses making up a biometric authentication process, a client apparatus capable of transmitting said each authentication context to the authentication apparatus, and a plurality of entity devices capable of individually generating and transmitting said each authentication context to the client apparatus, the entity device comprising:

a confidential information storage device configured to store confidential information for verification by the authentication apparatus;

a plurality of authentication subprocess execution devices having different performances and capable of generating a processing result by executing the same authentication subprocess;

an entity device certificate storage device configured to store an entity device certificate including execution device performance information and execution device identification information on said each authentication subprocess execution device, the execution device performance information indicating a plurality of evaluation items for performance of the authentication subprocess execution devices and an evaluation result in correspondence with the evaluation items;

an execution device identification information storage device configured to store the execution device identification information and a parameter related to each other for each authentication subprocess execution device;

an execution device switching device configured to execute, upon receipt of a processing request and a parameter from the client apparatus, the authentication subprocess by accessing the execution device identification information storage device and switching to the authentication subprocess execution device corresponding to the parameter;

an authenticator generating device configured to generate an authenticator based on the confidential information in the confidential information storage device from the entity device certificate, the processing result of the authentication subprocess and the execution device identification information indicating the authentication subprocess execution device that has executed the authentication subprocess;

an authentication context generating device configured to generate an authentication context including the authenticator, the execution device identification information used for generating the authenticator, the processing result and the entity device certificate; and an authentication context transmission device configured to transmit the authentication context to the client apparatus, wherein the authentication context transmitted by the authentication context transmission device is such that the authentication apparatus is capable of verifying the authenticator based on the confidential information identical with or corresponding to the aforementioned confidential information, the corresponding execution device performance information in the entity device certificate is extracted based on the execution device identification information used for generating the authenticator, and the execution device performance information is capable of being verified based on predetermined performance criteria information, the corresponding execution device performance information indicating the evaluation item for the performance of the authentication subprocess execution device identified by the execution device identification information and the evaluation result in correspondence with the evaluation item; and wherein the performance criteria information indicates an authentication policy.

4. At least one entity device among a plurality of entity devices, used for an authentication system comprising an authentication apparatus capable of verifying a plurality of authentication contexts each including a processing result of a plurality of authentication subprocesses making up a biometric authentication process, a client apparatus capable of transmitting said each authentication context to the authentication apparatus, and a plurality of entity devices capable of individually generating and transmitting said each authentication context to the client apparatus, the entity device comprising:

a confidential information storage device configured to store confidential information for verification by the authentication apparatus;

a plurality of authentication subprocess execution devices having different performances and capable of generating a processing result by executing the same authentication subprocess;

an entity device certificate storage device configured to store an entity device certificate including execution device performance information and input/output identification information on said each authentication subprocess execution device, the execution device performance information indicating a plurality of evaluation items for performance of the authentication subprocess execution devices and an evaluation result in correspondence with the evaluation items;

an input/output identification information storage device configured to store the input/output identification information and a parameter related to each other for each authentication subprocess execution device;

an execution device switching device configured to execute, upon receipt of a processing request and a parameter from the client apparatus, the authentication subprocess by accessing the input/output identification information storage device and switching to the authentication subprocess execution device corresponding to the parameter;

an authenticator generating device configured to generate an authenticator based on the confidential information in the confidential information storage device from the entity device certificate, the processing result of the authentication subprocess and the input/output identification information indicating the authentication subprocess execution device that has executed the authentication subprocess;

an authentication context generating device configured to generate an authentication context including the authenticator, the input/output identification information used for generating the authenticator, the processing result and the entity device certificate; and an authentication context transmission device configured to transmit the authentication context to the client apparatus, wherein the authentication context transmitted by the authentication context transmission device is such that the authentication apparatus is capable of verifying the authenticator based on the confidential information identical with or corresponding to the aforementioned confidential information, the corresponding execution device performance information in the entity device certificate is extracted based on the input/output identification information used for generating the authenticator, and the execution device performance information is capable of being verified based on predetermined performance criteria information, the corresponding execution device performance information indicating the evaluation item for the performance of the authentication subprocess execution device identified by the execution device identification information and the evaluation result in correspondence with the evaluation item; and wherein the performance criteria information indicates an authentication policy.

5. At least one entity device among a plurality of entity devices, used for an authentication system that includes an authentication apparatus capable of verifying a plurality of authentication contexts each including a processing result of a plurality of authentication subprocesses making up a biometric authentication process, a client apparatus capable of transmitting said each authentication context to the authentication apparatus, and a plurality of entity devices capable of individually generating and transmitting said each authentication context to the client apparatus, the entity device comprising:

a confidential information storage device configured to store confidential information for verification by the authentication apparatus;

a plurality of authentication subprocess execution devices having different performances and capable of generating a processing result by executing the same authentication subprocess;

a function information storage device configured to store a function information certificate including execution device performance information and a parameter related to the execution device performance information, for each authentication subprocess execution device, the execution device performance information indicating a plurality of evaluation items for performance of the authentication subprocess execution devices and an evaluation result in correspondence with the evaluation items;

an execution device switching device configured to execute, upon receipt of a processing request and a parameter from the client apparatus, the authentication subprocess by accessing the execution device identification information storage device and switching to the authentication subprocess execution device corresponding to the parameter;

an authenticator generating device configured to generate an authenticator based on the confidential information in the confidential information storage device from the function information certificate corresponding to the authentication subprocess execution device that has executed the authentication subprocess and the processing result of the authentication subprocess;

an authentication context generating device configured to generate an authentication context including the authenticator, the function information certificate used for generating the authenticator and the processing result; and an authentication context transmission device configured to transmit the authentication context to the client apparatus, wherein the authentication context transmitted by the authentication context transmission device is such that the authentication apparatus is capable of verifying the authenticator based on the confidential information identical with or corresponding to the aforementioned confidential information, the execution device performance information is extracted from the function information certificate used for generating the authenticator, and the execution device performance information is capable of being verified based on predetermined performance criteria information, the corresponding execution device performance information indicating the evaluation item for the performance of the authentication subprocess execution device identified by the execution device identification information and the evaluation result in correspondence with the evaluation item; and wherein the performance criteria information indicates an authentication policy.

6. An authentication apparatus communicable with a client apparatus capable of transmitting each authentication context received from a plurality of entity devices which generates, based on confidential information, a plurality of authentication contexts each including a processing result of a plurality of authentication subprocesses making up a biometric authentication process, the authentication apparatus comprising:

an authentication apparatus confidential information storage device configured to store confidential information identical with or corresponding to the aforementioned confidential information;

an authenticator verification device configured to verify an authenticator of each authentication context based on the confidential information in the authentication apparatus confidential information storage device upon receipt, from the client apparatus, of the authentication context, the authentication context including:

a function information certificate including the execution device performance information corresponding to one of a plurality of the authentication subprocess execution devices of at least one of the entity devices which has executed the authentication subprocess, the execution device performance information indicating an evaluation item for performance of the authentication subprocess execution device and evaluation result in correspondence with the evaluation item, a processing result of the authentication subprocess, and the authenticator generated based on the confidential information;

a performance information extraction device configured to extract the execution device performance information from the function information certificate in each authentication context received;

a performance criteria information storage device configured to store, in advance, performance criteria information indicating the performance to be satisfied by the authentication subprocess execution device, the performance criteria information indicating an authentication policy; and a performance information verification device configured to verify, based on the performance criteria information, the execution device performance information extracted by the performance information extraction device.

7. At least one entity device among a plurality of entity devices, used for an authentication system that includes an authentication apparatus capable of verifying a plurality of authentication contexts each including a processing result of a plurality of authentication subprocesses making up a biometric authentication process, a client apparatus capable of transmitting said each authentication context to the authentication apparatus, and a plurality of entity devices capable of individually generating and transmitting said each authentication context to the client apparatus, the entity device comprising:

a confidential information storage device configured to store confidential information for verification by the authentication apparatus;

a plurality of authentication subprocess execution devices having different performances and capable of generating a processing result by executing the same authentication subprocess;

an entity certificate specifying information storage device configured to store entity certificate specifying information for specifying the entity device certificate including the execution device performance information and the execution device identification information concerning said each authentication subprocess execution device, the execution device performance information indicating a plurality of evaluation items for performance of the authentication subprocess execution devices and an evaluation result in correspondence with the evaluation items;

an execution device identification information storage device configured to store the execution device identification information and a parameter related to each other for each authentication subprocess execution device;

an execution device switching device configured to execute, upon receipt of a processing request and a parameter from the client apparatus, the authentication subprocess by accessing the execution device identification information storage device and switching to the authentication subprocess execution device corresponding to the parameter;

an authenticator generating device configured to generate an authenticator based on the confidential information in the confidential information storage device from the entity certificate specifying information, the processing result of the authentication subprocess and the execution device identification information indicating the authentication subprocess execution device that has executed the authentication subprocess;

an authentication context generating device configured to generate an authentication context including the authenticator, the execution device identification information used for generating the authenticator, the processing result and the entity certificate specifying information; and an authentication context transmission device configured to transmit the authentication context to the client apparatus, wherein the authentication context transmitted by the authentication context transmission device is such that the authentication apparatus is capable of verifying the authenticator based on the confidential information identical with or corresponding to the aforementioned confidential information, the corresponding execution device performance information in the entity device certificate acquired from the entity certificate specifying information is extracted based on the execution device identification information used for generating the authenticator, and the execution device performance information is capable of being verified based on predetermined performance criteria information, the corresponding execution device performance information indicating the evaluation item for the performance of the authentication subprocess execution device identified by the execution device identification information and the evaluation result in correspondence with the evaluation item; and wherein the performance criteria information indicates an authentication policy.

8. At least one entity device among a plurality of entity devices, used for an authentication system that includes an authentication apparatus capable of verifying a plurality of authentication contexts each including a processing result of a plurality of authentication subprocesses making up a biometric authentication process, a client apparatus capable of transmitting said each authentication context to the authentication apparatus, and a plurality of entity devices capable of individually generating and transmitting said each authentication context to the client apparatus, the entity device comprising:

a confidential information storage device configured to store confidential information for verification by the authentication apparatus;

a plurality of authentication subprocess execution devices having different performances and capable of generating a processing result by executing the same authentication subprocess;

a function information storage device configured to store, as related to each other, function certificate specifying information for specifying the function information certificate including the execution device performance information and a parameter, and for each authentication subprocess execution device, the execution device performance information indicating an evaluation item for performance of the authentication subprocess execution devices and an evaluation result in correspondence with the evaluation items;

an execution device switching device configured to execute, upon receipt of a processing request and a parameter from the client apparatus, the authentication subprocess by accessing the execution device identification information storage device and switching to the authentication subprocess execution device corresponding to the parameter;

an authenticator generating device configured to generate an authenticator based on the confidential information in the confidential information storage device from the function certificate specifying information corresponding to the authentication subprocess execution device that has executed the authentication subprocess and the processing result of the particular authentication subprocess;

an authentication context generating device configured to generate an authentication context including the authenticator, the function certificate specifying information used for generating the authenticator and the processing result; and an authentication context transmission device configured to transmit the authentication context to the client apparatus, wherein the authentication context transmitted by the authentication context transmission device is such that the authentication apparatus is capable of verifying the authenticator based on the confidential information identical with or corresponding to the aforementioned confidential information, the execution device performance information is extracted from the function information certificate acquired from the function certificate specifying information used for generating the authenticator, and the execution device performance information is capable of being verified based on predetermined performance criteria information, the corresponding execution device performance information indicating the evaluation item for the performance of the authentication subprocess execution device identified by the execution device identification information and the evaluation result in correspondence with the evaluation item; and wherein the performance criteria information indicates an authentication policy.

9. A client apparatus comprising:

an execution step storage device having stored at least the entity device identification information of an entity device and a processing request, as related to each other and in accordance with an execution step, the entity device configured to switch and execute, in accordance with a parameter, a plurality of authentication subprocess execution devices having different performances and capable of generating a processing result by executing a same authentication subprocess, and adapted to, based on an acquired processing result and confidential information identical with or corresponding to confidential information of an authentication apparatus, generate and transmit an authentication context, and in a case where the entity device identification information indicates the entity device having said plurality of authentication subprocess execution devices, further having stored the parameter as related to the entity device identification information and the processing request, wherein the authentication apparatus is capable of verifying, based on the confidential information, a plurality of the authentication contexts each including the processing result of a plurality of the authentication subprocesses making up a biometric authentication process;

a processing request transmission device configured to transmit the processing request and the parameter to the corresponding entity device based on contents stored in the execution step storage device; and a device configured to transmit each authentication context received from said each entity device to the authentication apparatus;

wherein at least one entity device is capable of generating and transmitting the authentication context based on the processing result obtained by executing the authentication subprocess and the confidential information identical with or corresponding to the confidential information of the authentication apparatus, the authentication context including an authenticator, a function certificate specifying information used for generating the authenticator and the processing result, the authenticator generated based on the confidential information.

* * * * *